US009684109B2

(12) United States Patent
Shimizu

(10) Patent No.: US 9,684,109 B2
(45) Date of Patent: Jun. 20, 2017

(54) LIGHT GUIDE PLATE, LIGHTING DEVICE, DISPLAY DEVICE, AND TELEVISION DEVICE

(71) Applicant: SHARP KABUSHIKI KAISHA, Osaka (JP)

(72) Inventor: Takaharu Shimizu, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 72 days.

(21) Appl. No.: 14/747,751

(22) Filed: Jun. 23, 2015

(65) Prior Publication Data

US 2015/0316699 A1 Nov. 5, 2015

Related U.S. Application Data

(63) Continuation of application No. PCT/JP2014/063702, filed on May 23, 2014.

(30) Foreign Application Priority Data

May 31, 2013 (JP) .................... 2013-115935

(51) Int. Cl.
 G09F 13/04 (2006.01)
 G09F 13/08 (2006.01)
 (Continued)

(52) U.S. Cl.
 CPC .......... G02B 6/002 (2013.01); G02B 6/0031 (2013.01); G02B 6/0043 (2013.01);
 (Continued)

(58) Field of Classification Search
 CPC .... G02B 6/002; G02B 6/0031; G02B 6/0043; G02B 6/0061; G02B 6/0073; G02B 6/0036; G02B 6/0038; G02B 6/0055; G09G 3/36
 (Continued)

(56) References Cited

U.S. PATENT DOCUMENTS

| 5,134,549 A | 7/1992 | Yokoyama |
| 5,619,351 A * | 4/1997 | Funamoto ............... F21S 9/02 349/5 |

(Continued)

FOREIGN PATENT DOCUMENTS

| JP | 4-40268 U | 4/1992 |
| JP | 2005-276453 A | 10/2005 |

(Continued)

*Primary Examiner* — Andrew Coughlin
*Assistant Examiner* — Jessica M Apenteng
(74) *Attorney, Agent, or Firm* — Birch, Stewart, Kolasch & Birch, LLP

(57) ABSTRACT

A light guide plate having a rectangular plate-like shape includes a light entrance surface, a light exit surface, an opposite plate surface, and a light reflection pattern. The light entrance surface is a peripheral surface. The light exit surface is a plate surface. The opposite plate surface is opposite from the light exit surface. The light reflection pattern includes light reflection portions having distribution densities different from section to section of the opposite plate surface. The distribution densities are defined such that a difference between the distribution density in a section in the middle row and each end column and the distribution density in a section in the middle row and the middle column is larger than a difference between the distribution density in a section in the end row and each end column and the distribution density in the section in the end row and the middle column.

14 Claims, 31 Drawing Sheets

(51) Int. Cl.
*F21V 8/00* (2006.01)
*G09G 3/36* (2006.01)

(52) U.S. Cl.
CPC ......... *G02B 6/0061* (2013.01); *G02B 6/0073* (2013.01); *G09G 3/36* (2013.01); *G02B 6/0036* (2013.01); *G02B 6/0038* (2013.01); *G02B 6/0055* (2013.01)

(58) Field of Classification Search
USPC ...................................................... 362/97.2
See application file for complete search history.

(56) References Cited

U.S. PATENT DOCUMENTS

| | | |
|---|---|---|
| 8,602,629 B2 | 12/2013 | Mi |
| 2005/0213347 A1 | 9/2005 | Kajiura |
| 2013/0155693 A1 | 6/2013 | Mi |
| 2014/0098563 A1* | 4/2014 | Kim .................... G02B 6/0076 362/606 |

FOREIGN PATENT DOCUMENTS

| | | | |
|---|---|---|---|
| JP | 2012-242649 A | 12/2012 | |
| JP | 2013-145744 A | 7/2013 | |

* cited by examiner

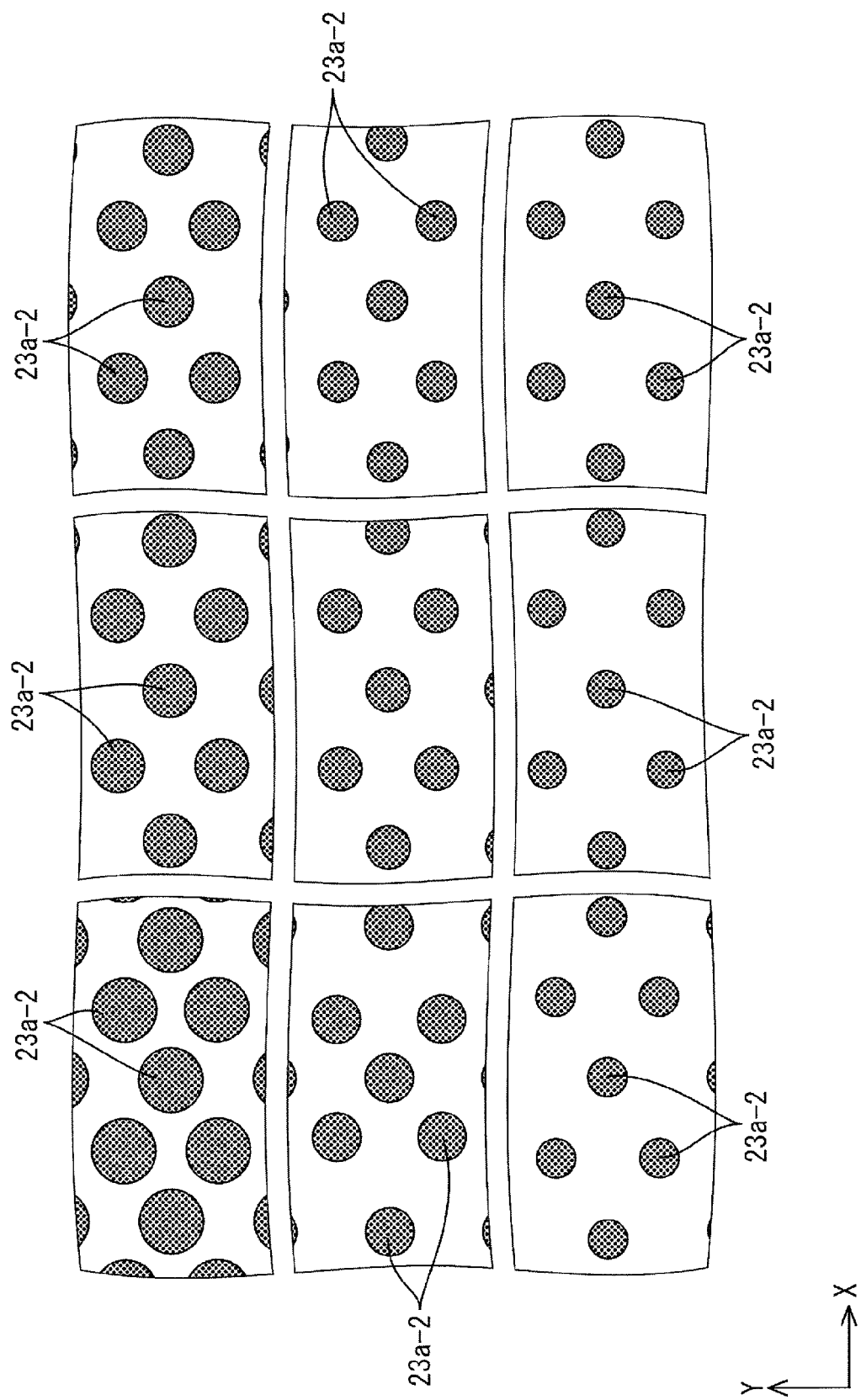

LIGHT GUIDE PLATE, LIGHTING DEVICE, DISPLAY DEVICE, AND TELEVISION DEVICE

CROSS REFERENCE TO RELATED APPLICATION

This application is a Continuation of PCT International Application No. PCT/JP2014/063702 filed on May 23, 2014, which claims priority under 35 U.S.C. §119(a) to Patent Application No. 2013-115935 filed in Japan on May 31, 2013, all of which are hereby expressly incorporated by reference into the present application.

TECHNICAL FIELD

The present invention relates to a light guide plate, a lighting device, a display device, and a television device.

BACKGROUND

In recent years, displays in image display devices, such as television devices, are being shifted from conventional cathode-ray tube displays to thin displays, such as liquid crystal displays and plasma displays. With the thin displays, thicknesses of the image display devices can be decreased. Because liquid crystal panels do not emit light, liquid crystal display devices including liquid crystal panels require backlight devices. The backlight devices are classified broadly into a direct type and an edge-light type based on mechanisms. For further reduction in thicknesses of the liquid crystal display devices, the edge-light type backlight devices including light guide plates are more preferable.

An edge-light backlight device may include an optical sheet that includes lenses and geometric structures on a light emitting side. Each lens is formed independently in a half-dome-like shape. The geometric structures continue from one another. The optical sheet is configured to control the brightness within a surface thereof by adjusting in-plane ratios of the half-dome-like lenses having high light diffusivity and the geometric structures having high light collecting capability. The optical sheet is arranged over a light exit surface of a light guide plate that is configured to guide light from a light source.

Because the backlight device requires the optical sheet having a special configuration other than the light guide plate, parts cost of the backlight device is high. Furthermore, light from the light guide plate passes through the optical sheet having the special configuration. Therefore, a length of an optical path until the light reaches a liquid crystal panel may be long and thus light use efficiency may decrease.

The present invention was made in view of the above reasons and an object of this invention is to improve evenness of brightness distribution without using a special component.

SUMMARY

A light guide plate having a rectangular plate-like shape includes a light entrance surface, a light exit surface, an opposite plate surface, and a light reflection pattern. The light entrance surface is one of peripheral surfaces through which light from a light source enters. The light exit surface is a plate surface through which the light exits. The opposite plate surface is a plate surface opposite from the light exit surface. The light reflection pattern is formed on the opposite plate surface for directing the light to exit the light guide plate through the light exit surface. The light reflection pattern includes light reflection portions having distribution densities different from section to section of the opposite plate surface. The sections are defined by at least three columns and at least three rows. The columns are along a first dimension of the opposite plate surface that is not parallel to the light entrance surface. The rows are along a second dimension of the opposite plate surface that is parallel to the light entrance surface. The distribution densities in a middle column are higher than the distribution densities in end columns. The distribution densities in a middle row are higher than the distribution densities in an end low closer to the light entrance surface. The distribution densities are defined such that a difference between the distribution density in the section in the middle row and each of the end columns and the distribution density in the section in the middle row and the middle column is larger than a difference between the distribution density in the section in the end row and each of the end columns and the distribution density in the section in the end row and the middle column.

BRIEF DESCRIPTION OF THE DRAWINGS

FIG. 31 is a plan view of an opposite plate surface illustrating dots of light reflection portions of light reflection patterns in sections of the opposite plate surface according to other embodiment (2).

DETAILED DESCRIPTION

First Embodiment

Figure 1:
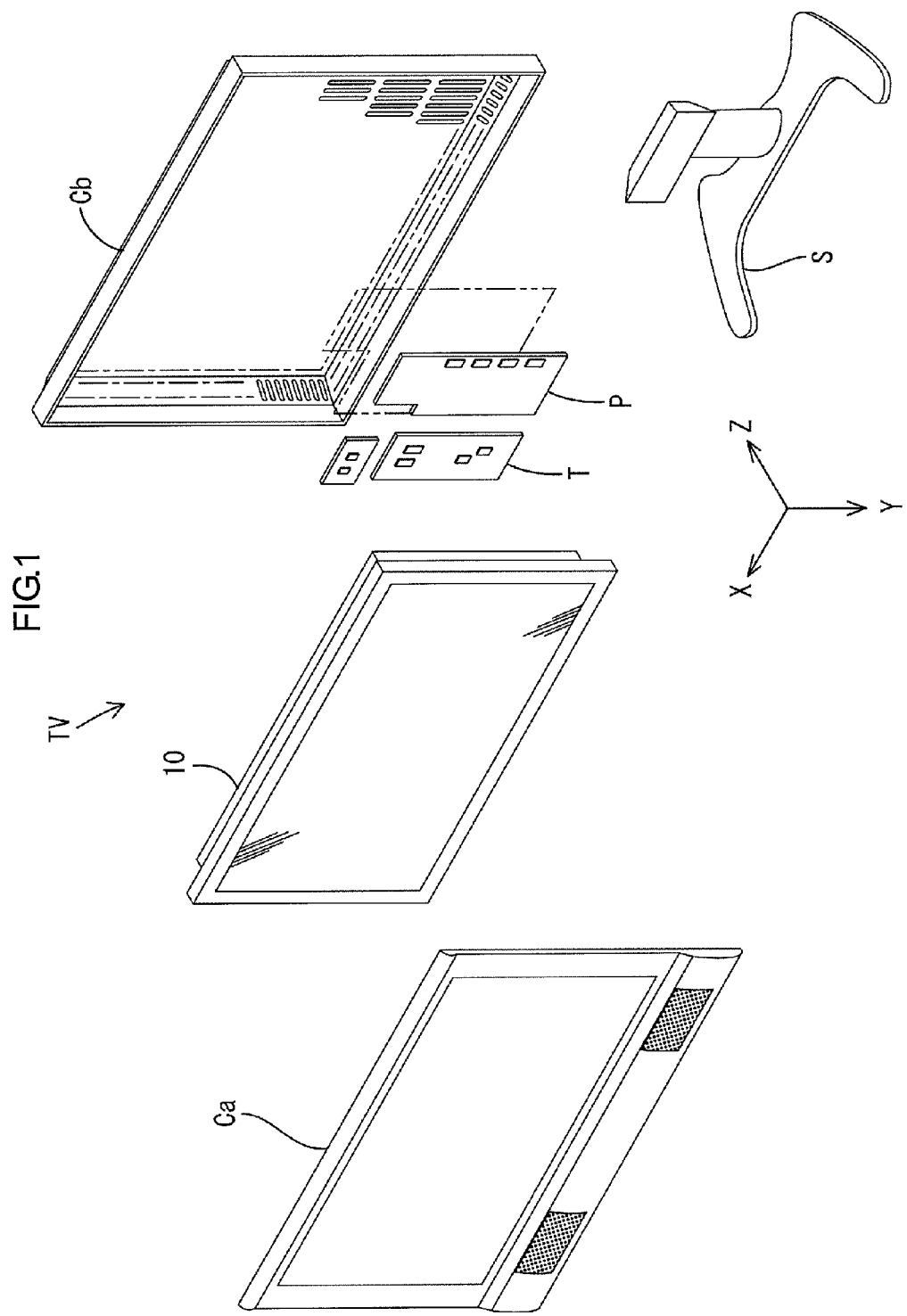
FIG. 1 is an exploded perspective view illustrating a general configuration of a television device according to a first embodiment.

A first embodiment of this invention will be described with reference to FIGS. 1 to 10. A liquid crystal display device 10 in this embodiment will be described. X-axes, Y-axes and Z-axes may be present in the drawings. The axes in each drawing correspond to the respective axes in other drawings. An upper side and a lower side in each of FIG. 3 correspond to a front side and a back side of the liquid crystal display device 10, respectively.

Figure 2:
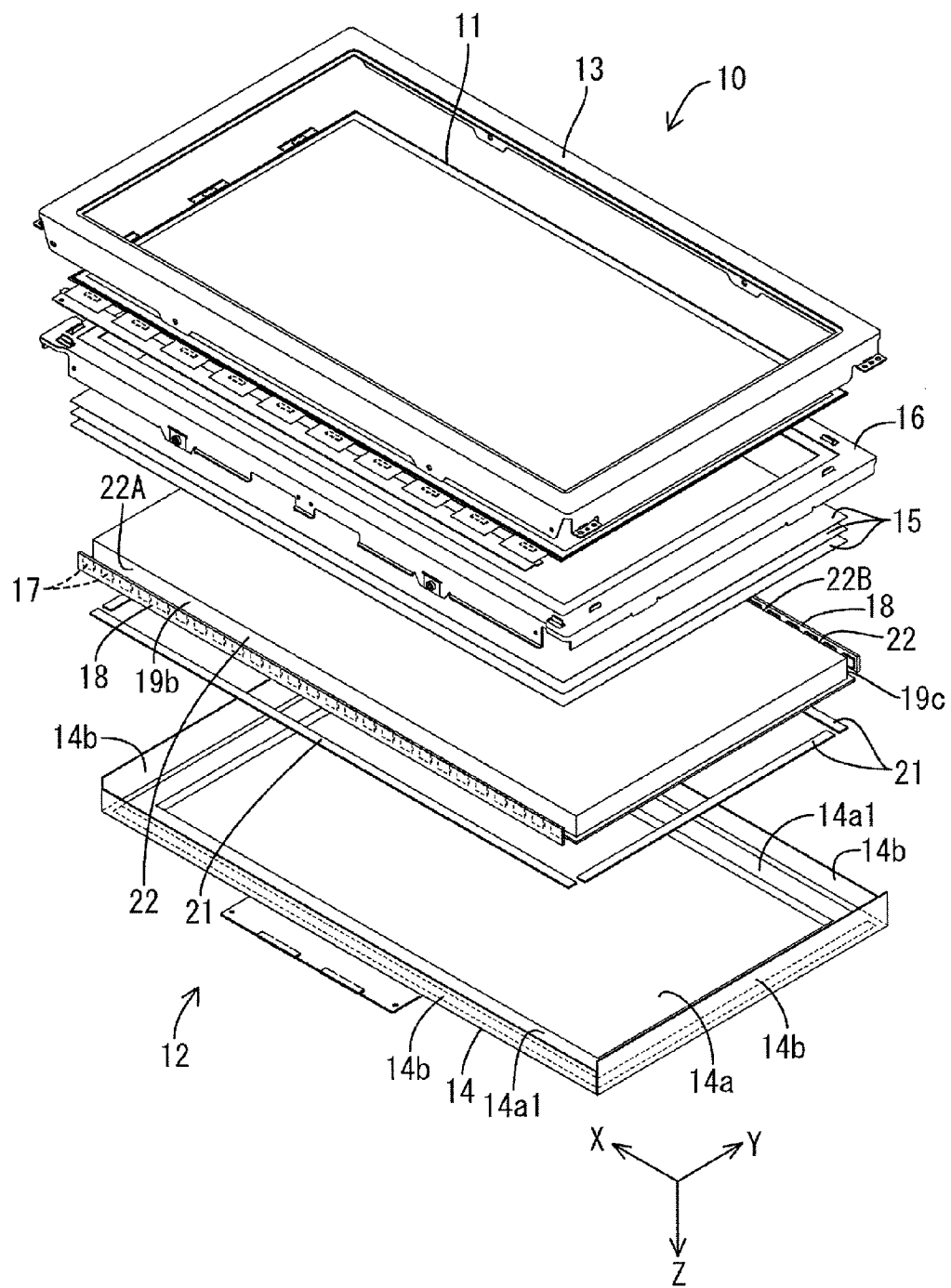
FIG. 2 is an exploded perspective view illustrating a general configuration of a liquid crystal display device.

As illustrated in FIG. 1, a television device TV according to this embodiment includes the liquid crystal display device 10, front and rear cabinets Ca and Cb that hold the liquid crystal display device 10 therebetween, a power source P, a tuner T, and a stand S. An overall shape of the liquid crystal display device (a display device) 10 is a horizontally-long rectangular shape. As illustrated in FIG. 2, the liquid crystal display device 10 includes a liquid crystal panel 11 and a backlight unit (a lighting device) 12. The liquid crystal panel 11 is a display panel and the backlight unit is an external light source. The liquid crystal panel 11 and the backlight unit 12 are collectively held with a bezel 13 having a frame-like shape. In the liquid crystal display device 10, the liquid crystal panel 11 is held with a display surface thereof on the front.

As illustrated in FIG. 2, the liquid crystal panel 11 has a horizontally-long rectangular shape in a plan view and includes a pair of glass substrates and liquid crystals. The substrates having high light transmissivity are bonded together with a predetermined gap therebetween. The liquid crystals are sealed between the substrates. On one of the substrates (an array board), switching components (e.g., TFTs), pixel electrodes and an alignment film are disposed. The switching components are connected to source lines and gate lines that are perpendicular to each other. The pixel electrodes are connected to the switching components. On the other substrate (a CF board), a color filter, common electrodes, and an alignment film are disposed. The color filter has color portions such as R (red), G (green) and B (blue) color portions that are arranged in a predetermined pattern. The liquid crystal panel 11 includes a display area (an active area) and a non-display area (a non-active area). The display area is an inner area of a screen in which images are displayed. The non-display area is an outer area of the screen around the display area and has a frame-like shape. Polarizing plates are attached to outer sides of the substrates.

As illustrated in FIG. 2, the backlight unit 12 includes a chassis 14 and optical sheets (optical members) 15. The chassis 14 has a substantially box-like shape with an opening on the front (a light exiting side, a liquid crystal panel 11 side). The optical sheets 15 cover the opening of the chassis 14. The chassis 14 holds at least LEDs (light emitting diodes) 17 that are light sources, an LED boards (light source boards) 18 on which the LEDs 17 are mounted, a light guide plate 19, a reflection sheet (a reflection member) 20, spacers 21, and a frame (a holding member) 16. The light guide plate 19 is configured to guide light from the LEDs 17 toward the optical sheets 15 (toward the liquid crystal panel 11). The reflection sheet 20 is disposed on the back surface of the light guide plate 19. The spacers 21 are disposed between the reflection sheet 20 and the chassis 14. The frame 16 presses the light guide plate 19 and the optical sheets 15 from the front side. The backlight unit 12 includes the LED boards 18 at long edges thereof, respectively. Namely, the LEDs 17 mounted on the LED boards 18 are located close to the long edges of the liquid crystal panel 11, respectively. The backlight unit 12 according to this embodiment is so-called an edge-light type (or a side-light type) backlight in which light enters the light guide plate 19 through opposed surfaces of the light guide plate 19. Components of the backlight unit 12 will be described in detail.

Figure 4:
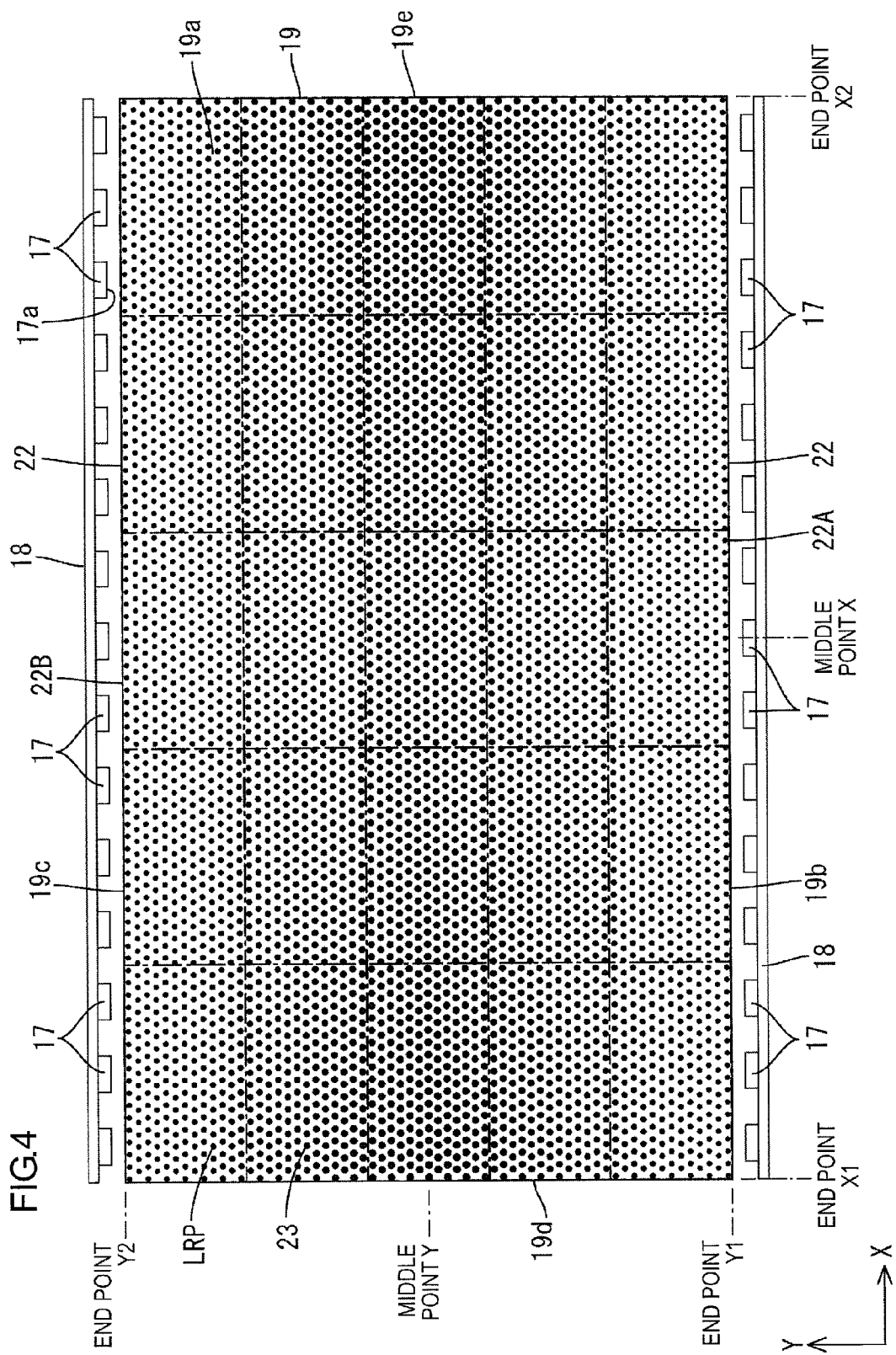
FIG. 4 is a plan view of an LED board and a light guide plate in a backlight unit in the liquid crystal display device.

The chassis 14 is formed from a metal plate such as an aluminum plate and an electrolytic zinc-coated steel sheet (SECC). As illustrated in FIGS. 2 and 4, similar to the liquid crystal panel 11, the chassis 14 has a horizontally-long rectangular shape in a plan view. A long-side direction and a short-side direction of the chassis 14 correspond to the X-axis direction (the horizontal direction) and the Y-axis direction (the vertical direction), respectively. The chassis 14 includes a bottom plate 14a and side plates 14b. The bottom plate 14a has a horizontally-long rectangular shape. The side plates 14b project from long edges and short edges of the bottom plate 14a, respectively. The LED boards 18 are attached to the side plates 14b on the long side, respectively. The bottom plate 14a includes a protrusion 14a1 near outer periphery thereof. The protrusion 14a1 protrudes toward the front and has a frame-like shape in a plan view. An outline of the protrusion 14a1 in a plan view is about the same as an outline of the light guide plate 19 and an outline of the reflection sheet 20. With this configuration, outer edge portions of the light guide plate 19 and the reflection sheet 20 held in the chassis 14 are supported by the protrusion from the back side. The protrusion 14a1 has a flat top surface parallel to plate surfaces of the light guide plate 19 and the reflection sheet 20. With this configuration, the light guide plate 19 and the reflection sheet 20 are stably supported. Circuit boards including a panel control circuit board for supplying signals for driving the liquid crystal panel 11 and an LED driving circuit board for supplying driving power to the LEDs 17, which are not illustrated, are mounted to the back surface of the bottom plate 14a. The frame 16 and the bezel 13 are fixed to the side plates 14b with screws.

As illustrated in FIG. 2, similar to the liquid crystal panel 11 and the chassis 14, the optical sheets 15 have a horizontally-long rectangular shape in a plan view. The optical sheets 15 are placed on a front surface (on the light exiting side) of the light guide plate 19 and located between the liquid crystal panel 11 and the light guide plate 19. With this configuration, the optical sheets 15 pass light from the light guide plate 19 therethrough while adding a specific optical property to the light, and direct the light toward the liquid crystal panel 11. The optical sheets 15 include multiple sheet-like members (three sheets in this embodiment) which are overlaid with each other. Each optical sheet 15 may be selected from a diffuser sheet, a lens sheet, and a reflecting type polarizing sheet, whatever is appropriate.

Figure 3:
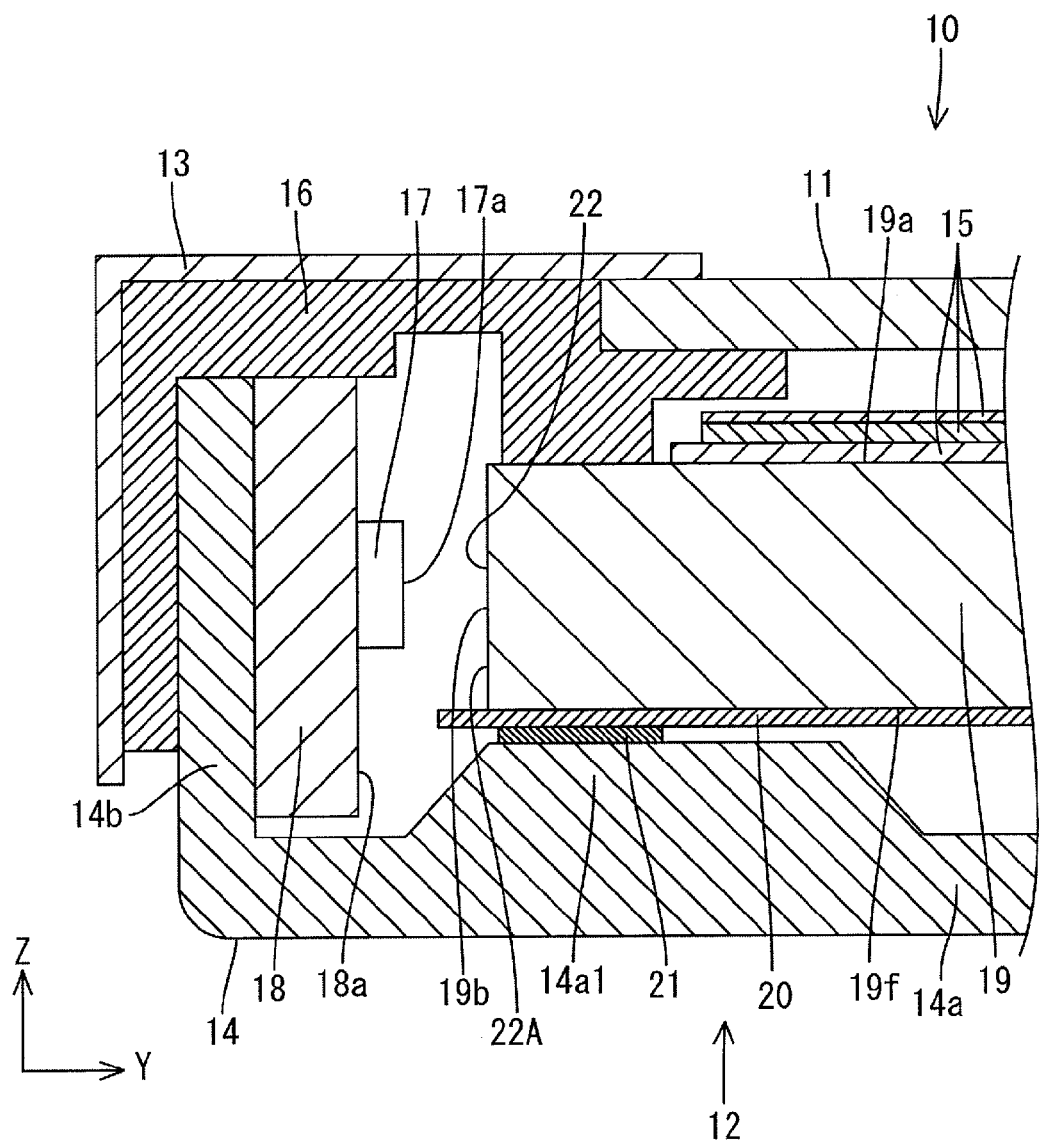
FIG. 3 is a magnified cross-sectional view of a portion of the liquid crystal display device including an LED taken along a short-side direction of the liquid crystal display device.

The frame 16 is made of synthetic resin. As illustrated in FIGS. 2 and 3, the frame 16 has a frame shape that extends along outer edge portions of the light guide plate 19 and holds down substantially the entire edge portions of the light guide plate 19 from the front side. The frame 16 includes a portion that projects inward from the portion thereof which holds down the edge portions of the light guide plate 19. The portion of the frame 16 covers the outer edge portions of the optical sheets 15 from the front. The optical sheets 15 are supported by the portion of the frame 16. The portion of the frame 16 which holds down the outer edge portions of the light guide plate 19 and the portions of the frame 16 which support the optical sheet 15 support the outer edge portions of the liquid crystal panel from the rear. The frame 16 has a dimension to cover the outer edge portions of the light guide plate 19 and the side plates 14b of the chassis 14. Namely, the frame 16 covers the LEDs 17 and the LED boards 18 from the front. The outer edge portions of the frame 16 include short pipe-like portions that project toward the rear. The short pipe-like portions surround the side plates 14b of the chassis 14 from the outside and fixed to specified side plates 14b together with the bezel 13.

As illustrated in FIGS. 3 and 4, each of the LEDs 17 includes an LED chip (an LED element, a semiconductor light emitting element) which is arranged on a board fixed on the LED board 18 and sealed with resin. The LED chip mounted on the board has one main light emission wavelength. Specifically, the LED chip that emits light in a single color of blue is used. The resin that reals the LED chip contains phosphors dispersed therein. The phosphors emit light in a predetermined color when excited by blue light emitted from the LED chip. Overall color of light emitted from the LED 17 is white. The phosphors may be selected, as appropriate, from yellow phosphors that emit yellow light, green phosphors that emit green light, and red phosphors that emit red light. The phosphors may be used in combination of the above phosphors. The LED 17 includes a main light-emitting surface 17a that is opposite from a mounting surface of the LED 17 on which the LED board 18 is mounted. Namely, the LED 17 is a top-surface-emitting type LED.

As illustrated in FIGS. 2 and 4, the LED board 18 has an elongated plate-like shape that extends in the long-side direction (the X-axis direction, a long-side direction of a light entrance surface 22 of the light guide plate 19) of the chassis 14. The LED board 18 is arranged in the chassis 14 such that plate surfaces of the LED board 18 are parallel to the X-Z plane, i.e., perpendicular to the plate surfaces of the liquid crystal panel 11 and the light guide plate 19 (the optical sheets 15). Namely, the long-side direction (a length direction) and the short-side direction (a width direction) of the plate surfaces of the LED board 18 correspond to the X-axis direction and the Z-axis direction, respectively. A plate-thickness direction of the LED board 18 perpendicular to the plate surfaces thereof corresponds to the Y-axis direction. The LED boards 18 are arranged so as to sandwich the light guide plate 19 in the Y-axis direction. Specifically, each LED board 18 is arranged between the light guide plate 19 and the corresponding long side plate 14b of the chassis 14. The LED boards 18 are inserted in the chassis 14 from the front along the Z-axis direction. Each LED board 18 is attached to the chassis 14 such that plate surfaces thereof opposite from the mounting surfaces 18a on which the LEDs 17 are mounted are in contact with the inner surfaces of the respective side plates 14b of the chassis 14. Therefore, the light emitting surfaces 17a of the LEDs 17 mounted on one of the LED boards 18 face the light emitting surfaces 17a of the LEDs 17 mounted on the other LED board 18. Optical axes of the LEDs 17 are substantially parallel to the Y-axis direction (the direction parallel to the plate surface of the liquid crystal panel 11).

As illustrated in FIGS. 3 and 4, each LED board 18 includes the mounting surface 18a that faces the inner side is opposed to the peripheral surface of the light guide plate 19 on the long side (i.e., the light entrance surface 22, which will be described later). The LEDs 17 (twenty six of them in FIG. 4) are arranged at intervals along the long-side direction of the LED board 18 (the long-side direction of the liquid crystal panel 11 or the light guide plate 19, the X-axis direction). The LEDs 17 are surface-mounted on the plate surface of the respective LED boards 18 facing the light guide plate 19 (surfaces opposite the light guide plate 19). The plate surfaces are the mounting surfaces 18a. A metal-film trace (not illustrated), such as a copper-foil trace, is formed on the mounting surface 18a of each LED board 18. The metal-film trace extends in the X-axis direction and crosses over a group of the LEDs 17 so as to connect the adjacent LEDs 17 in series. Terminals at ends of the trace are connected to an external LED driver circuit board (not illustrated) by a wiring member. Driving power is supplied from the LED driver circuit board to the LEDs 17. Each LED board 18 is a single-side mounting type, that is, one of the plate surfaces is the mounting surface 18*a*. The intervals of the LEDs 17 arranged along the X-axis direction are equal, that is, an arrangement pitch is substantially constant. The LED boards 18 are made of metal such as aluminum. The traces (not illustrated) are formed on the surfaces of the LED boards 18 via insulating layers. Insulating material such as synthetic resin and ceramic may be used for material of base members of the LED boards 18.

The light guide plate 19 is made of substantially transparent (high transmissivity) synthetic resin (e.g. acrylic resin or polycarbonate such as PMMA) that has a refractive index sufficiently higher than that of the air. As illustrated in FIG. 2, the light guide plate 19 has a horizontally-long rectangular shape in a plan view similar to the liquid crystal panel 11 and the chassis 14. The light guide plate 19 is a plate member having a thickness that is larger than that of the optical sheets 15. A long-side direction and a short-side direction of the plate surfaces of the light guide plate 19 correspond to the X-axis direction and the Y-axis direction, respectively. A thickness direction of the light guide plate 19 that is perpendicular to the plate surfaces of the light guide plate 19 corresponds to the Z-axis direction. As illustrated in FIGS. 2 and 3, the light guide plate 19 is arranged right behind the liquid crystal panel 11 and the optical sheets 15 in the chassis 14. The light guide plate 19 includes the long peripheral surfaces that are opposed to the respective LED boards 18 arranged at the respective long sides of the chassis 14 and the LEDs 17 mounted on the LED boards 18. An arrangement direction of the LEDs 17 (or the LED boards 18) and the light guide plate 19 corresponds with the Y-axis direction. An arrangement direction of the optical sheets 15 (or the liquid crystal panel 11) and the light guide plate 19 corresponds with the Z-axis direction. The arrangement directions are perpendicular to each other. The light guide plate 19 receives light emitted by the LEDs in the Y-axis direction from the long peripheral surfaces, transmits the light therethrough, and direct the light such that the light exits from the plate surfaces and travels toward the optical sheets 15 (toward the front or the light exiting side).

As illustrated in FIGS. 2 and 4, the light guide plate 19 has a plate-like shape that extends along plate surfaces of the bottom plate 14*a* of the chassis 14 and the optical sheets 15. The plate surfaces of the light guide plate 19 are parallel to the X-Y plane. One of the plate surfaces (a surface opposite the optical sheets 15) of the light guide plate 19 on the front side is a light exit surface 19*a*. Light that is inside the light guide plate 19 exits through the light exit surface 19*a* toward the optical sheets 15 and the liquid crystal panel 11. The outer peripheral surfaces of the light guide plate 19 that are adjacent to the plate surfaces thereof include a first peripheral surface 19*b*, a second peripheral surface 19*c*, a third peripheral surface 19*d*, and a fourth peripheral surface 19*e*. The first peripheral surface 19*b* is one of the long peripheral surfaces. The second peripheral surface 19*c* is the other long peripheral surface. The third peripheral surface 19*d* is one of the short peripheral surfaces. The fourth peripheral surface 19*e* is the other short peripheral surface. The first peripheral surface 19*b* and the second peripheral surface 19*c*, which are long peripheral surfaces in a pair, are opposed to the LEDs 17 (the respective LED boards 18). The first peripheral surface 19*b* and the second peripheral surface 19*c* are the light entrance surfaces 22 through which rays of light emitted by the LEDs 17 enter. The light entrance surfaces 22 are opposed to the LEDs 17 with predetermined gaps, that is, the light entrance surfaces 22 are "LED opposing peripheral surfaces (light source opposing peripheral surfaces)." Among the outer peripheral surfaces of the light guide plate 19 that are adjacent to the plate surfaces of the light guide plate 19, the third peripheral surface 19*d* and the fourth peripheral surface 19*e* that are the short peripheral surfaces not including the light entrance surfaces 22 and opposite to each other. The third peripheral surface 19*d* and the fourth peripheral surface 19*e* are LED non-opposing peripheral surfaces (light source non-opposing peripheral surfaces) which are not opposed to the LEDs 17. The rays of light from the LEDs 17 do not directly enter the third peripheral surface 19*d* and the fourth peripheral surface 19*e*. A distance between one of the light entrance surfaces 22 and each LED 17 opposed thereto and a distance between the other light entrance surface 22 and each LED 17 opposed thereto are about equal. Each light entrance surface 22 is parallel to the X-Z plane (the X-axis direction corresponding with the arrangement direction of the LEDs 17), that is, parallel to the plate surface of the LED board 18 and perpendicular to the light exit surface 19*a*. The arrangement direction of the LEDs 17 and the light entrance surface 22 corresponds with the Y-axis direction and is perpendicular to the light exit surface 19*a*. In the following description, the light entrance surface 22 on the lower side in FIG. 4 may be referred to as "the first light entrance surface" and letter A is added to the reference numeral. The light entrance surface 22 on the upper side in FIG. 4 may be referred to as "the second light entrance surface" and letter B is added to the reference numeral. In description about a generic configuration of the light entrance surfaces 22, letters A and B will not be added to the reference numerals.

As illustrated in FIGS. 2 and 3, the reflection sheet 20 is disposed so as to cover a back surface of the light guide plate 19, which is an opposite plate surface 19*f* that is opposite the light exit surface 19*a* (a surface opposed to the bottom plate 14*a* of the chassis 14). Some ray of light may travel from the opposite plate surface 19*f* to the outside on the rear. The reflection sheet 20 is configured to reflect the rays of light toward the front. The reflection sheet 20 is disposed between the bottom plate 14*a* of the chassis 14 and the light guide plate 19. Long edge portions of the reflection sheet 20, that is, edge portions close to the light entrance surface 22 of the light guide plate 19 are located outer than the respective light entrance surface 22. Namely, the long edge portions of the reflection sheet 20 are extended toward the LEDs 17. Extended portions of the reflection sheet 20 reflect light in space between the LED boards and the light entrance surfaces 22. According to the configuration, high light entrance efficiency is achieved. As illustrated in FIG. 4, light reflection patterns LRP are formed on the opposite plate surface 19*f* of the light guide plate 19. The light reflection patterns LRP include light reflection portions 23 for reflecting light in the light guide plate 19 toward the light exit surface 19*a* so that the light exits from the light exit surface 19*a*. The light reflection patterns LRP will be described later. In FIG. 4, the light reflection portions 23 of the light reflection patterns LRP are indicated with hatching.

As illustrated in FIGS. 2 and 3, four spacers 21 are disposed along edges of the chassis 14 and the light guide plate 19, respectively. Each spacer 21 has a plate-like shape that extends along the corresponding edge of the chassis 14 or the light guide plate 19. The spacers 21 are placed on the top surfaces of the respective protrusions 14*a*1 of the chassis 14 so as to overlap peripheral portions of the light guide plate 19 and the reflection sheet 20 from the front in a plan view. The spacers 21 and the peripheral portions of the light guide plate 19 hold peripheral portions of the reflection sheet 20 therebetween. The peripheral portions of the reflection sheet 20 are fixed by the spacers 21 and the light guide plate 19. According to this configuration, displacement of the reflection sheet 20 along the plate surface of the light guide plate 19 (the X-Y plane) is reduced. A gap is less likely to be created between each long peripheral portion of the light reflection sheet 20 among the peripheral portions thereof and the corresponding long peripheral surface including the light entrance surface 22. Therefore, the light that has entered from the light entrance surface 22 is properly reflected by the reflection sheet 20 and transmitted through the light guide plate 19. Portions of the peripheral portions of the reflection sheet 20 may not be held between the spacers 21 and the light guide plate 19. According to the configuration, the displacement of the reflection sheet 20 along the plate surface of the light guide plate 19 is allowed and thus the reflection sheet 20 is less likely to have wrinkles when thermally expanded.

Figure 6:
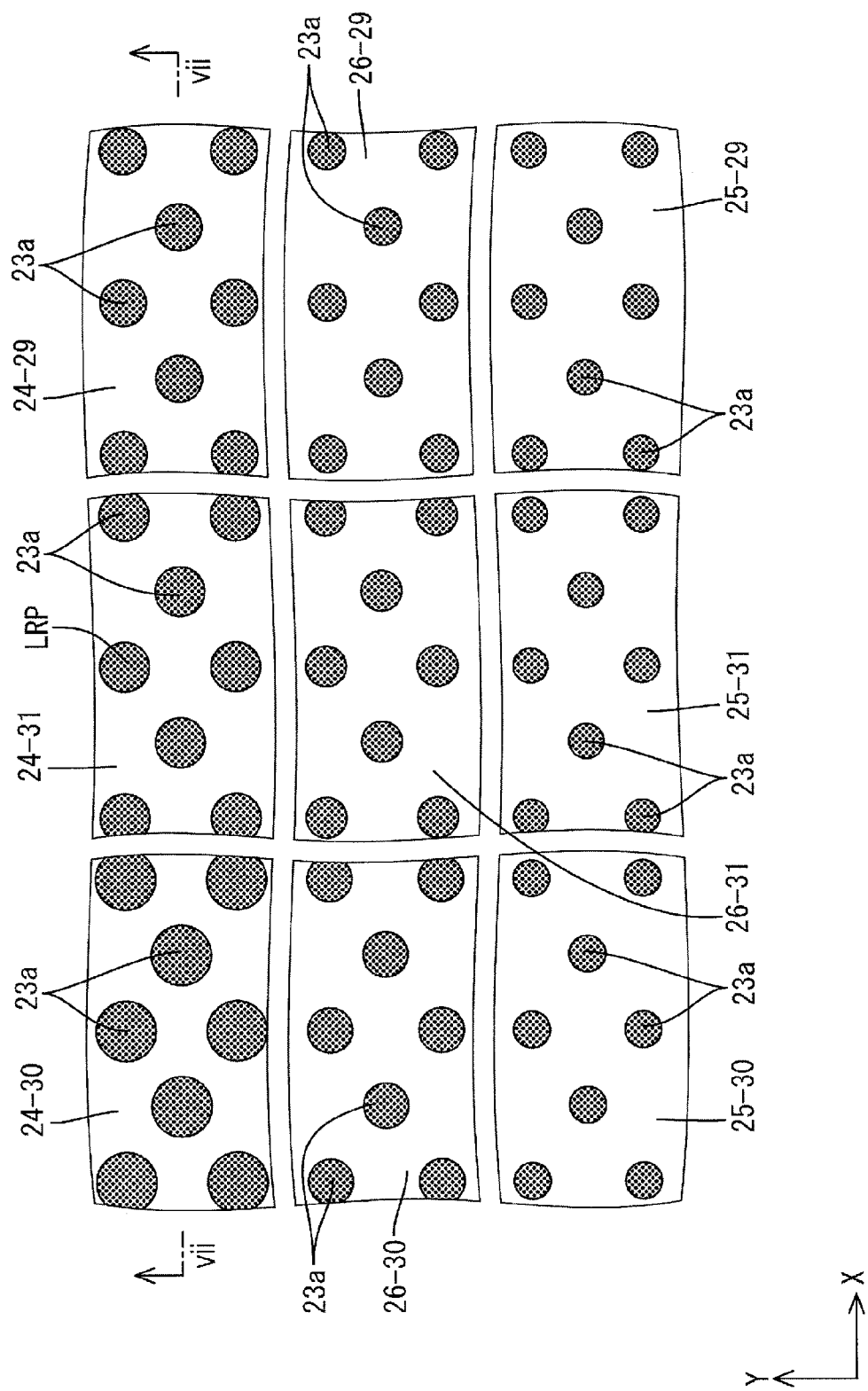
FIG. 6 is a plan view of the opposite plate surface illustrating dots of light reflection portions of light reflection patterns in the sections of the opposite plate surface.
Figure 7:
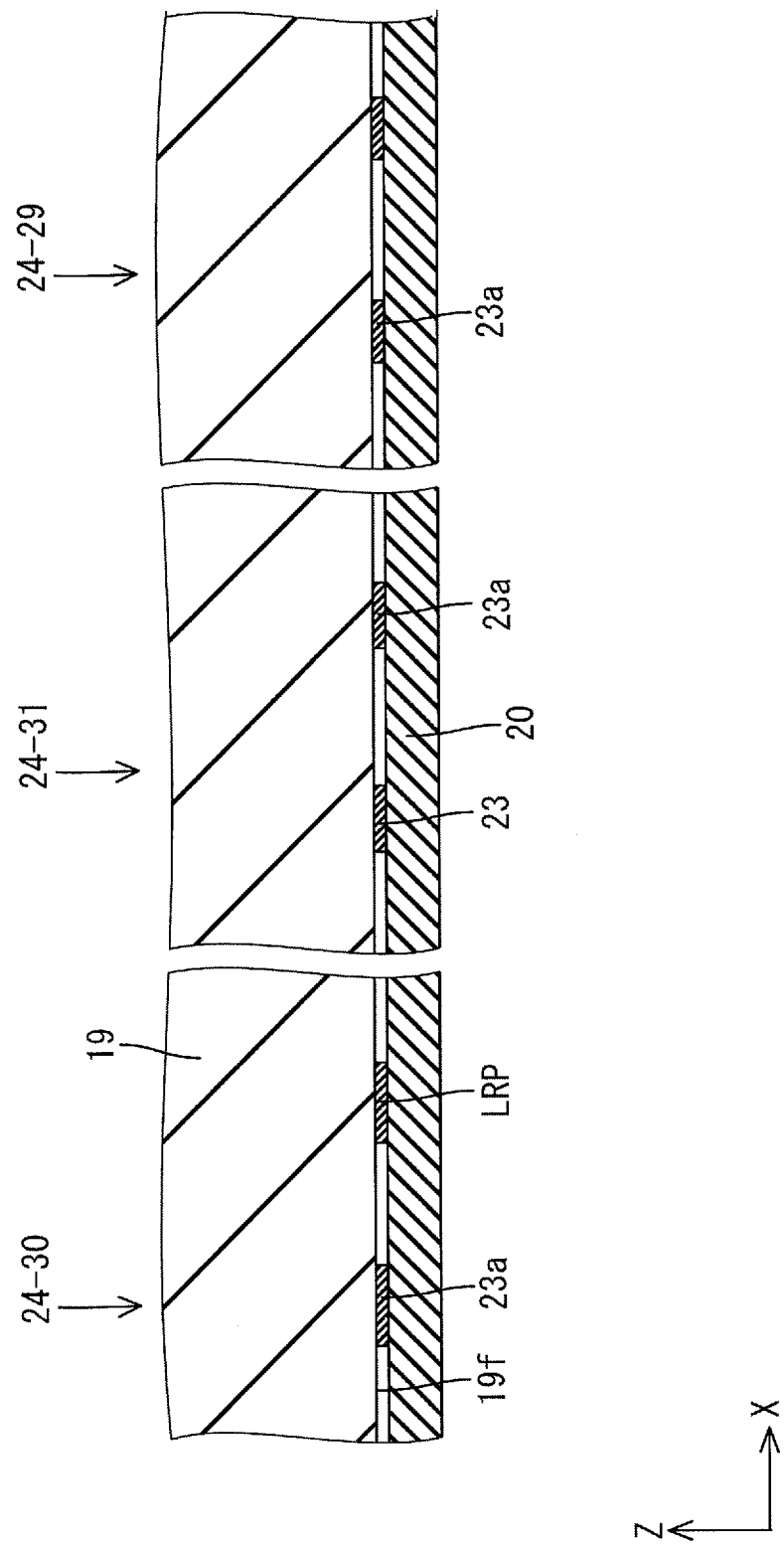
FIG. 7 is a cross-sectional view taken along line vii-vii in FIG. 6.

The light reflection portions 23 of the light reflection patterns LRP will be described in detail. As illustrated in FIG. 4, the light reflection portions 23 are formed by printing a light reflective substance on the opposite plate surface 19f of the light guide plate 19. Namely, the light reflection portions 23 are printed light reflection portions. The light reflective substance is white ink (paste) containing metal oxide such as titanium oxide. As illustrated in FIGS. 6 and 7, the light reflection portions 23 include a number of dots 23a that are reflective films made of the ink described above and dispersedly arranged within the opposite plate surface 19f of the light guide plate 19 with predetermined distribution. Each dot 23a of the light reflection portions 23 has a round shape in a plan view. The dots 23a are dispersedly arranged in zigzag patterns within the opposite plate surface 19f at about constant intervals although diameters of the dots 23a vary according to X and Y positions. The reflection portions 23 irregularly reflects rays of light that have entered the light guide plate 19 and reached the opposite plate surface 19f and direct toward the light exit surface 19a. The reflection portions 23 are for adjusting incidence angles of the rays of light to the light exit surface 19a by altering the rays of light in comparison to rays of light all reflected by portions of the opposite plate surface 19f in which the light reflection portions 23 are not formed. According to the configuration, the angles of the rays of light do not exceed the critical angle and thus the rays of light are properly directed to exit from the light guide plate 19 through the light exit surface 19a. An amount of exiting light per unit area of the light exit surface 19a (i.e., brightness) tends to increase as distribution density of the light reflecting portions 23 in the opposite plate surface 19f increases. The amount of exiting light per unit area tends to decrease as the distribution density decreases. To increase an area ratio of the light reflection portions 23 (to increase the amount of exiting light), the diameters of the dots 23a may be increased. To decrease the area ratio of the light reflection portions 23 (to decrease the amount of exiting light), the diameters of the dots 23a may be decreased. To form the light reflection portions 23 on the light guide plate 19, a printing method such as silkscreen printing and inkjet printing is used, for example. The silkscreen printing is preferable for reducing a production cost for mass production of the light guide plate 19. The inkjet printing is preferable when high accuracy is required for forming complicated patterns of the light reflecting portions 23.

Next, the distribution of the light reflection portions 23 of the light reflection patterns LRP on the opposite plate surface 19f of the light guide plate 19 will be described. In the following description, a dimension along the third peripheral surface 19d and the fourth peripheral surface 19e (the Y-axis direction) is referred to as a first dimension. The third peripheral surface 19d and the fourth peripheral surface 19e are opposite surfaces and do not include the light entrance surfaces 22. A dimension along the first peripheral surface 19b and the second peripheral surface 19c (the X-axis direction) is referred to as a second dimension. The first peripheral surface 19b and the second peripheral surface 19c are opposite surfaces and include the light entrance surfaces 22. As illustrated in FIG. 4, the distribution density of the light reflection portions 23 of the light reflection patterns LRP on the opposite plate surface 19f of the light guide plate 19 increases as a distance from the middle of the first dimension decreases. The distribution density decreases as distances from the middle of the first dimension toward the edges of the opposite plate surface 19f close to the respective light entrance surfaces 22 increase. To achieve such distribution, the dots 23a of the light reflection portions 23 are formed on the opposite plate surface 19f such that the diameters thereof gradually increase as the distances from the edges toward the middle of the first dimension increases and such that the diameters thereof gradually decreases as the distance from the middle of the first dimension toward the edges increases. Rays of light emitted by the LEDs 17 enter the light guide plate 19 through the light entrance surfaces 22 and travels through the light guide plate 19 along the first dimension from edges close to the light entrance surfaces 22 to the middle of the first dimension. According to the distribution of the light reflection portions 23 described above, irregular reflection by the light reflection portions 23 is less likely to occur in the portions closer to the light entrance surfaces 22. The irregular reflection is more likely to occur in the middle portion. Therefore, even distribution of the amount of exiting light from the light exit surface 19a is achieved, that is, even brightness is achieved with respect to the first dimension. The distribution density of the light reflection portions 23 of the light reflection patterns LRP on the opposite plate surface 19f of the light guide plate 19 decreases as a distance from the middle of the second dimension. The distribution density increases as distances from the middle of the second dimension toward the edges of the opposite plate surface 19f increase. To achieve such distribution, the dots 23a of the light reflection portions 23 are formed on the opposite plate surface 19f such that the diameters thereof gradually decrease as the distances from the edges toward the middle of the second dimension increases and such that the diameters thereof gradually increases as the distance from the middle of the second dimension toward the edges increases. The amount of light that has entered through the light entrance surfaces 22, which is emitted by the LEDs 17, tends to be larger in the middle portions of the second dimension of the light guide plate 19 and smaller in the edge portions closer to ends of the second dimension. According to the distribution of the light reflection portions 23 described above, irregular reflection by the light reflection portions 23 is less likely to occur in the portions closer to the light entrance surfaces 22, The irregular reflection is more likely to occur in the middle portion. Therefore, even distribution of the amount of exiting light from the light guide plate through the light exit surface 19a is achieved, that is, even brightness is achieved with respect to the second dimension.

If the even brightness distribution with respect to the second dimension is required at a higher level, the difference between the distribution density in the middle portion and the distribution density in each edge portion may be increased. However, if the difference is increased, a larger number of rays of light may exit through the third peripheral surface 19d and the fourth peripheral surface 19e, which are not the light exit surface 19a of the light guide plate, as the amount of light reflected by the light reflection portions of the light reflection patterns in the edge portions close to the ends of the second dimension. As a result, the light use efficiency may decrease. If the difference between the distribution density of the light reflection portions of the light reflection patterns in the middle portion and that in each edge portion close to the end of the second dimension is increased, the following problem may occur. If uneven thickness of the light reflection portions of the light reflection patterns occurs due to deficiencies during formation of the light reflection patterns on the light guide plate 19 in the production process of the light guide plate 19, the difference in distribution density may be larger than expected. This may cause a significant decrease in brightness in the middle portion at the middle of the second dimension.

Therefore, the light reflection patterns LRP in this embodiment are formed with the following distribution. As illustrated in FIG. 4, the difference between the distribution density in a section in the middle of the first dimension of the opposite plat surface 19f and close to the end of the second dimension of the opposite plate surface 19f and the distribution density in a section in the middle of the first dimension and in the middle of the second dimension is larger than the difference the distribution density in a section close to the end of the first dimension on the light entrance surface 22 side and close to the end of the second dimension and the distribution density in a section closer to the end of the first dimension and in the middle of the second dimension. According to the configuration, in the sections of the light guide plate 19 close to the end of the first dimension on the light entrance surface 22 side, the rays of light are less likely to be directed from the middle to the ends of the second dimension in comparison to the sections in the middle the middle of the first dimension. In the sections of the light guide plate 19 close to the end of the first dimension close on the light entrance surface 22 side and close to the end of the second dimension, an amount of light therein is larger than the amount of light in the sections in the middle of the first dimension and close to the end of the second dimension. Because the light is less likely to be directed from the middle to the end of the second dimension, in the section close to the end of the second dimension, rays of light reflected by the light reflection portions 23 of the light reflection patterns LRP are less likely to exit from the light guide plate 19 through the third peripheral surface 19d or the fourth peripheral surface 19e, which is not the light exit surface 19a of the light guide plate 19. Therefore, high light use efficiency is achieved. In the sections of the light guide plate 19 in the middle of the first dimension, in comparison to the sections close to the ends of the first dimension closer to the light entrance surface 22, the rays of light is more likely to be directed from the middle to the ends of the second dimension. Therefore, the light is sufficiently supplied to the sections close to the ends of the second dimension where the amount of light tends to be insufficient. According to the configuration, even brightness distribution is achieved at a high level. Even if uneven thickness of the light reflection portions 23 of the light reflection patterns LRP occurs due to deficiencies during formation of the light reflection patterns LRP on the light guide plate 19 in the production process of the light guide plate 19, the difference between the distribution density of the light reflection portions 23 of the light reflection patterns LRP in the sections in the middle of the second dimension and the sections close to the end of the second dimension is less likely to vary. Therefore, the brightness in the sections in the middle of the second dimension is less likely to decrease. According to the configuration, the evenness in brightness distribution is improved by the light guide plate 19 without using an optical sheet having a special configuration as in conventional devices. This reduces a parts cost and further improves the light use efficiency.

Figure 5:
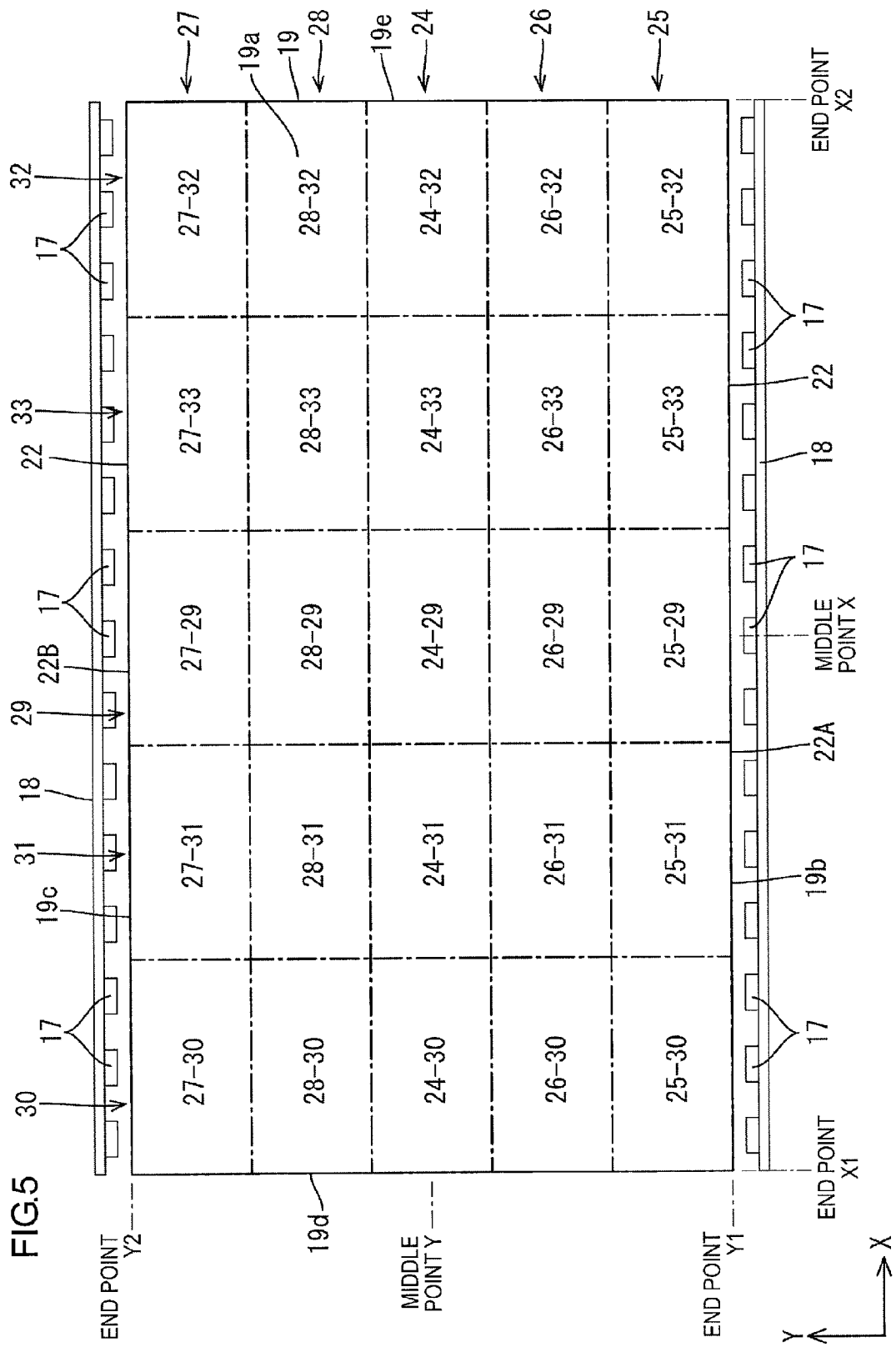
FIG. 5 is a plan view of the LED board and the light guide plate including an opposite plate surface that includes twenty five sections.

The distribution of the light reflection patterns LRP will be described in more detail. Prior to the detailed description of the distribution of the light reflection patterns LRP, the sections of the opposite plate surface 19f of the light guide plate 19 in a plan view will be described. As illustrated in FIG. 5, the opposite plate surface 19f is divided into five rows with respect to the first dimension. The five rows include a middle row 24, a first end row 25, a first intermediate row 26, a second end row 27, and a second intermediate row 28. The middle row 24 is located in the middle of the first dimension of the opposite plate surface 19f. The first end row 25 is located close to the first light entrance surface 22A (on the lower side in FIG. 5). The first intermediate row 26 is located between the middle row 24 and the first end row 25. The second end row 27 is located close to the second light entrance surface 22B. The second intermediate row 28 is located between the middle row 24 and the second end row 27. The area ratios of the rows 24 to 28 are equal. The opposite plate surface 19f is divided into five columns with respect to the second dimension. The five columns include a middle column 29, a first end column 30, a first intermediate column 31, a second end column 32, and a second intermediate column 33. The second middle column 29 is located in the middle of the second dimension of the opposite plate surface 19f. The first end column 30 is located close to one of ends of the second dimension (on the left in FIG. 5). The first intermediate column 31 is located between the second middle column 29 and the first end column 30. The second end column 32 is located close to the other end of the second dimension (on the right in FIG. 5). The second intermediate column 33 is located between the second middle column 29 and the second end column 32. The area ratios of the columns 29 to 33 are equal. FIG. 5 illustrates sections of the opposite plate surface 19f defined by the rows and the columns. The sections in the middle row 24 include a middle section 24-29, a first end section 24-30, a first intermediate section 24-31, a second end section 24-32, and a second intermediate section 24-33. The sections in the first end row 25 include a middle section 25-29, a first end section 25-30, a first intermediate section 25-31, a second end section 25-32, and a second intermediate section 25-33. The sections in the first intermediate row 26 include a middle section 26-29, a first end section 26-30, a first intermediate section 26-31, a second end section 26-32, and a second intermediate section 26-33. The sections in the second end row 27 include a middle section 27-29, a first end section 27-30, a first intermediate section 27-31, a second end section 27-32, and a second intermediate section 27-33. The sections in the second intermediate row 28 include a middle section 28-29, a first end section 28-30, a first intermediate section 28-31, a second end section 28-32, and a second intermediate section 28-33. The light reflection patterns LRP are not illustrated in FIG. 5.

Figure 8:
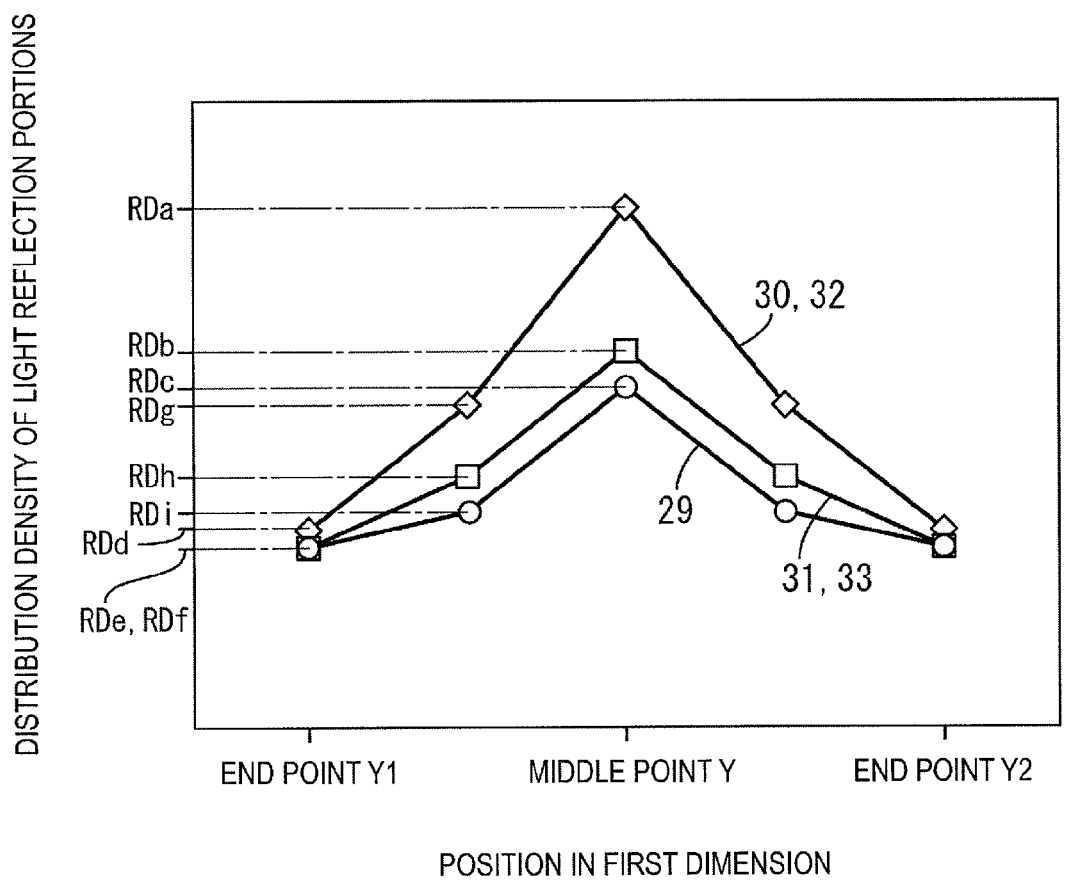
FIG. 8 is a graph illustrating variations in distribution density of the light reflection portions between end point Y1 and end point Y2 on the opposite plate surface of the light guide plate.
Figure 9:
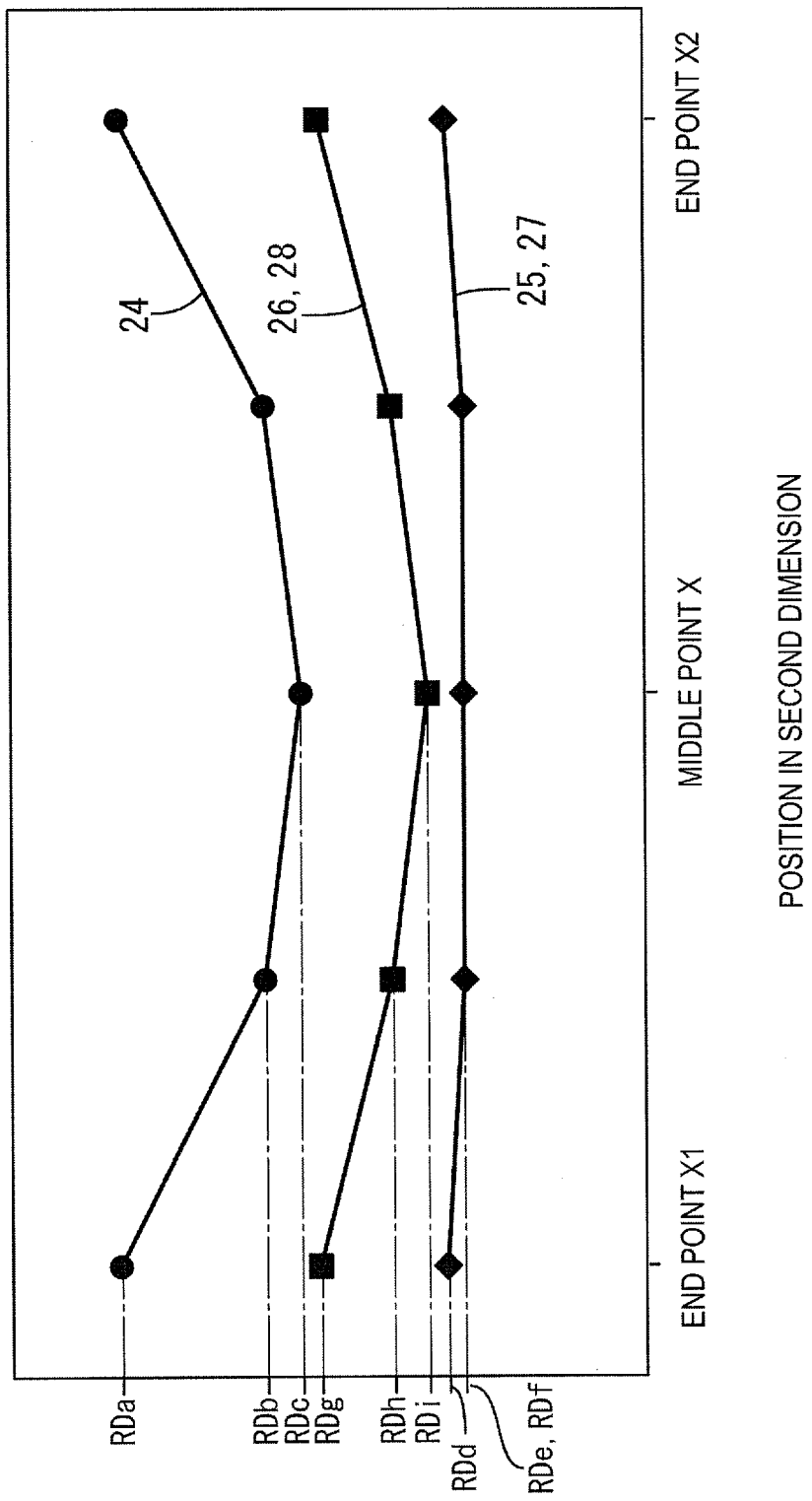
FIG. 9 is a graph illustrating variations in distribution density of the light reflection portions between end point X1 and end point X2 on the opposite plate surface of the light guide plate.

The distribution of the light reflection patterns LRP on the opposite plate surface 19f of the light guide plate 19 is illustrated in FIGS. 8 and 9. Curves in a graph in FIG. 8 represent distribution densities of the light reflection portions 23 at points between end point Y1 and end point Y2 along the first dimension in the second middle column 29, the first end column 30, the first intermediate column 31, the second end column 32, and the second intermediate column 33 of the opposite plate surface 19f of the light guide plate 19. The area ratios of the columns 29 to 33 are equal. Therefore, in the column in which the distribution density of the light reflection portions 23 is higher, the amount of exiting light from the light exit surface 19a is larger. In the column in which the distribution density of the light reflection portions 23 is lower, the amount of exiting light from the light exit surface 19a is smaller. Curves in a graph in FIG. 9 represent distribution densities of the light reflection portions 23 at points between end point X1 and end point X2 along the second dimension in the middle row 24, the first end row 25, the first intermediate row 26, the second end row 27, and the second intermediate row 28 of the opposite plate surface 19f of the light guide plate 19. The area ratios of the rows 24 to 28 are equal. Therefore, in the row in which the distribution density of the light reflection portions 23 is higher, the amount of exiting light from the light exit surface 19a is larger. In the row in which the distribution density of the light reflection portions 23 is lower, the amount of exiting light from the light exit surface 19a is smaller. End points Y1, Y2, X1 and X2 and middle points Y and X correspond to those in FIGS. 4 and 5.

The distribution of the light reflection patterns LRP with respect to the first dimension will be described. As illustrated in FIG. 8, the distribution density in the middle row 24 is the highest. The distribution density decreases from the middle row 24 to each of the intermediate rows 26 and 28, and then to each of the end rows 25 and 27. The distribution densities in the sections in the first end row 25 are equal to the distribution densities in the respective sections in the second end row 27. The distribution densities in the sections in the first intermediate row 26 are equal to the distribution densities in the respective sections in the second intermediate row 28. The light reflection portions 23 of the light reflection patterns LRP are symmetric with respect to the first dimension. The light reflection portions 23 are formed such that variations in distribution density of the light reflection portions 23 in the end columns 30 and 32 along the first dimension are larger than the variations in the middle column 29 and the intermediate columns 31 and 33. The variations in distribution density of the light reflection portions 23 correspond to differences in distribution density of the light reflection portions 23 among adjacent rows 24 to 28. Gradients of the curves in FIG. 8 represent the variations in distribution density of the light reflection portions 23. The variations along the rows in the end columns 30 and 32 are larger than the variations along the rows in the middle column 29 and the intermediate columns 31 and 33. The variation in distribution density from each of the end rows 25 and 27 to the corresponding intermediate row 26 or 28 in the middle column 29 is the smallest. The variation in distribution density from each of the end rows 25 and 27 to the corresponding intermediate row 26 or 28 in the intermediate columns 31 and 33 is the second smallest. The variation in distribution density from each of the end rows 25 and 27 to the corresponding intermediate row 26 or 28 in each of the end columns 30 and 32 is the third smallest. The variation in distribution density from each of the intermediate rows 26 and 28 to the middle row 24 in the middle column 29 is the third smallest. The variation in distribution density from each of the intermediate rows 26 and 28 to the middle row 24 in each of the intermediate columns 31 and 33 is the third smallest. Namely, the variations that are the third smallest are equal to one another. The variation in distribution density from each of the intermediate rows 26 and 28 to the middle row 24 in each of the end columns 30 and 32 is the largest. The distribution densities in the end rows 25 and 27 in the middle column are equal to the distribution densities in the end rows 25 and 27 in the intermediate columns 31 and 33.

Next, the distribution of the light reflection patterns LRP with respect to the second dimension will be described. As illustrated in FIG. 9, the distribution density in the middle column 29 is the lowest. The distribution density increases from the middle column 29 to each of the intermediate columns 31 and 33, and then to each of the end columns 30 and 32. The distribution densities in the sections in the first end column 30 are equal to the distribution densities in the respective sections in the second end column 32. The distribution densities in the sections in the first intermediate column 31 are equal to the distribution densities in the respective sections in the second intermediate column 33. The light reflection portions 23 of the light reflection patterns LRP are symmetric with respect to the second dimension. The light reflection portions 23 are formed such that variations in distribution density of the light reflection portions 23 in the middle row along the second dimension are larger than the variations in each of the intermediate rows 26 and 28 and the end rows 25 and 27. The variations in distribution density of the light reflection portions 23 correspond to differences in distribution density of the light reflection portions 23 among adjacent columns 29 to 33. Gradients of the curves in FIG. 9 represent the variations in distribution density of the light reflection portions 23. The variation in distribution density from the middle column 29 to each of the intermediate columns 31 and 33 in the corresponding end row 25 or 27 is the smallest. The variation in distribution density from each of the intermediate columns 31 and 33 to the corresponding end column 30 or 32 in each of the end rows 25 and 27 is the second smallest. The variation in distribution density from the middle column 29 to each of the intermediate columns 31 and 33 in each of the intermediate rows 26 and 28 is the third smallest. The variation in distribution density from the middle column 29 to each of the intermediate columns 31 and 33 in the middle row 24 is the third smallest. Namely, the variations that are the smallest are about equal to each other. The variation in distribution density from each of the intermediate columns 31 and 33 to the corresponding end column 30 and 32 in each of the intermediate rows 26 and 28 is the fourth smallest. The variation in distribution density from each of the intermediate columns 31 and 33 to the corresponding end column 30 and 32 in the middle row 24 is the largest.

The distribution densities in the middle column 29 in the end rows 25 and 27 are equal to the distribution densities in the intermediate columns 31 and 33 in the end rows 25 and 27.

The distributions of the light reflection patterns LRP illustrated in FIGS. 8 and 9 satisfy inequations (3) to (8).

$$(RDb-RDc)<(RDa-RDb) \qquad (3)$$

$$(RDe-RDf)<(RDd-RDe) \qquad (4)$$

$$(RDh-RDi)<(RDg-RDh) \qquad (5)$$

$$((RDd-RDe)-(RDe-RDf))<((RDa-RDb)-(RDb-RDc)) \qquad (6)$$

$$((RDg-RDh)-(RDh-RDi))<((RDa-RDb)-(RDb-RDc)) \qquad (7)$$

$$((RDd-RDe)-(RDe-RDf))<((RDg-RDh)-(RDh-RDi)) \quad (8)$$

RDa, RDb, and RDc in the inequations are the distribution densities of the light reflection portions 23 in the sections 24-30 and 24-32, those in the sections 24-31 and 24-33, and the distribution density in the section 24-29, respectively. RDd, RDe, and RDf in the inequations are the distribution densities in the sections 25-30, 25-32, 27-30, and 27-32, and those in the sections 25-31, 25-33, 27-31, and 27-33, and those in the sections 25-29 and 27-29, respectively. RDg, RDh, and RDi in the inequations are the distribution densities in the sections 26-30, 26-32, 28-30, and 28-32, and those in the sections 26-31, 26-33, 28-31, and 28-33, and those in the sections 26-29 and 28-29, respectively.

Inequations (3) to (5) express relationships of differences in distribution density of the light reflection portions 23 among the sections of the opposite plate surface 19f of the light guide plate 19 below. A difference between the distribution density RDa in the sections 24-30 and 24-32 and the distribution density RDb in the sections 24-31 and 24-33 is larger than a difference between the distribution density RDb in the sections 24-31 and 24-33 and the distribution density RDc in the section 24-29. A difference between the distribution density RDg in the sections 26-30, 26-32, 28-30, and 28-32 and the distribution density RDh in the sections 26-31, 26-33, 28-31, and 28-33 is larger than a difference between the distribution density RDh in the sections 26-31, 26-33, 28-31, and 28-33 and the distribution density RDi in the sections 26-29 and 28-29. A difference between the distribution density RDd in the section 25-30, 25-32, 27-30, and 27-32 and the distribution density RDe in the sections 25-31, 25-33, 27-31, and 27-33 is larger than a difference between the distribution density RDe in the sections 25-31, 25-33, 27-31, and 27-33 and the distribution density RDf in the sections 25-29 and 27-29. According to inequations (6) and (7), differences in distribution densities have the following relationships. Prior to the description, the differences among the distribution densities are referred as follows. The difference between the distribution density RDa in the sections 24-30 and 24-32 and the distribution density RDb in the sections 24-31 and 24-33 is referred to as a first difference. The difference between the distribution density RDb in the sections 24-31 and 24-33 and the distribution density RDc in the section 24-29 is referred to as a second difference. The difference between the distribution density RDg in the sections 26-30, 26-32, 28-30, and 28-32 and the distribution density RDh in the sections 26-31, 26-33, 28-31, and 28-33 is referred to as a third difference. The difference between the distribution density RDh in the sections 26-31, 26-33, 28-31, and 28-33 and the distribution density RDi in the sections 26-29, and 28-29 is referred to as a fourth difference. The difference between the distribution density RDd in the sections 25-30, 25-32, 27-30 and 27-32 and the distribution density RDe in the sections 25-31, 25-33, 27-31, and 27-33 is referred to as a fifth difference. The difference between the distribution density RDe in the sections 25-31, 25-33, 27-31, and 27-33 and the distribution density RDf in the sections 25-29 and 27-29 is referred to as a sixth difference. A difference between the first difference and the second difference (the right side of inequation (7)) is larger than a difference between the third difference and the fourth difference (the left side of inequation (7)). A difference between the first difference and the second difference (the right side of inequation (6)) is larger than a difference between the fifth difference and the sixth difference (the left side of inequation (6)). Namely, the difference between the first difference and the second difference is the largest. According to inequation (8), the difference between the third difference and the fourth difference (the right side of inequation (8)) is larger than the difference between the fifth difference and the sixth difference (the left side of inequation (8)).

Because the difference between the fifth difference and the sixth difference (the left side of inequation (6)) and the difference between the third difference and the fourth difference (the left side of inequation (7)) are smaller than the first difference and the second difference (the right side of inequations (6) and (7)), light is less likely to be directed from the sections 25-29, 26-29, 27-29, and 28-29 to the sections 25-30, 26-30, 27-30, and 28-30 via the sections 25-31, 26-31, 27-31, and 28-31 or to the sections 25-32, 26-32, 27-32, and 28-32 via the sections 25-33, 26-33, 27-33, and 28-33. With the light reflection portions 23 of the light reflection patterns LRP, the light is less likely to exit from the third peripheral surface 19d and the fourth peripheral surface 19e in the sections 25-30, 25-32, 26-30, 26-32, 27-30, 27-32, 28-30, and 28-32. According to the configuration, high light use efficiency is achieved. Furthermore, because the difference between the first difference and the second difference (the right side of inequations (6) and (7)) is larger than the difference between the fifth difference and the six difference (the left side of inequation (6)) and the difference between the third difference and the fourth difference (the left side of inequation (7)), the light is more likely to be directed from the section 24-29 to the section 24-30 via the section 24-31 or to the section 24-32 via the section 24-33. With the light reflection portions 23 of the light reflection patterns LRP, the light reflected by light reflection portions 23 efficiently exits from the light exit surface in the sections 24-30 and 24-32. Therefore, differences in brightness among the sections 24-30 and 24-32 and the sections 25-30, 25-32, 26-30, 26-32, 27-30, 27-32, 28-30, and 28-32 are compensated. According to the configuration, even brightness distribution is achieved at a high level. Even if uneven thickness of the light reflection portions 23 of the light reflection patterns LRP occurs due to deficiencies during formation of the light reflection patterns LRP on the opposite plate surface 19f in the production process of the light guide plate 19, the difference in distribution density of the light reflection portions 23 of the light reflection patterns LRP is less likely to vary among the columns 29 to 33. Therefore, the brightness in the middle column 29 is less likely to decrease.

The brightness distributions in a total of nine sections, that is, the sections 24-30, 24-29, 24-32, 25-30, 25-29, 25-32, 27-30, 27-29, and 27-32 are equalized. According to the configuration, images are displayed on the display panel 11 of the liquid crystal panel 10 with high quality using the light from the light guide plate 19. It has been known that equalization of the brightness distributions in the above nine sections improves the image display quality from experience in quality evaluation. Evaluation standards for objectively evaluating display quality of images such as the THX (registered trademark) standards include an evaluation for evenness of brightness distributions in the above nine sections as an evaluation item.

Furthermore, the distributions of the light reflection patterns LRP illustrated in FIGS. 8 and 9 satisfy the following inequations (9) to (11). Inequation (9) expresses relationships of differences in distribution density of the light reflection portions 23 among the sections of the opposite plate surface 19f of the light guide plate 19 below. A difference between the distribution density RDa in the section 24-30 and the distribution density RDc in the section 24-29 is larger than a difference between the distribution density RDg in the sections 26-30 and 28-30 and the distribution density RDi in the sections 26-29 and 28-29. Furthermore, a difference between the distribution density RDd in the sections 25-30 and 27-30 and the distribution density RDf in the sections 25-29 and 27-29 is the smallest. According to inequation (10), differences in distribution densities have the following relationships. A difference between the distribution density RDa in the section 24-30 and the distribution density RDb in the section 24-31 is larger than a difference between the distribution density RDg in the sections 26-30 and 28-30 and the distribution density RDh in the sections 26-31 and 28-31. Furthermore, a difference between the distribution density RDd in the sections 25-30 and 27-30 and the distribution density RDe in the sections 25-31 and 27-31 is the smallest. According to inequation (11), differences in distribution densities have the following relationships. A difference between the distribution density RDb in the section 24-31 and the distribution density RDc in the section 24-29 is larger than a difference between the distribution density RDh in the sections 26-31 and 28-31 and the distribution density RDi in the sections 26-29 and 28-29. Furthermore, a difference between the distribution density RDe in the sections 25-31 and 27-31 and the distribution density RDf in the sections 25-29 and 27-29 is the smallest.

$$(RDd-RDf)<(RDg-RDi)<(RDa-RDc) \quad (9)$$

$$(RDd-RDe)<(RDg-RDh)<(RDa-RDb) \quad (10)$$

$$(RDe-RDf)<(RDh-RDi)<(RDb-RDc) \quad (11)$$

Figure 10:
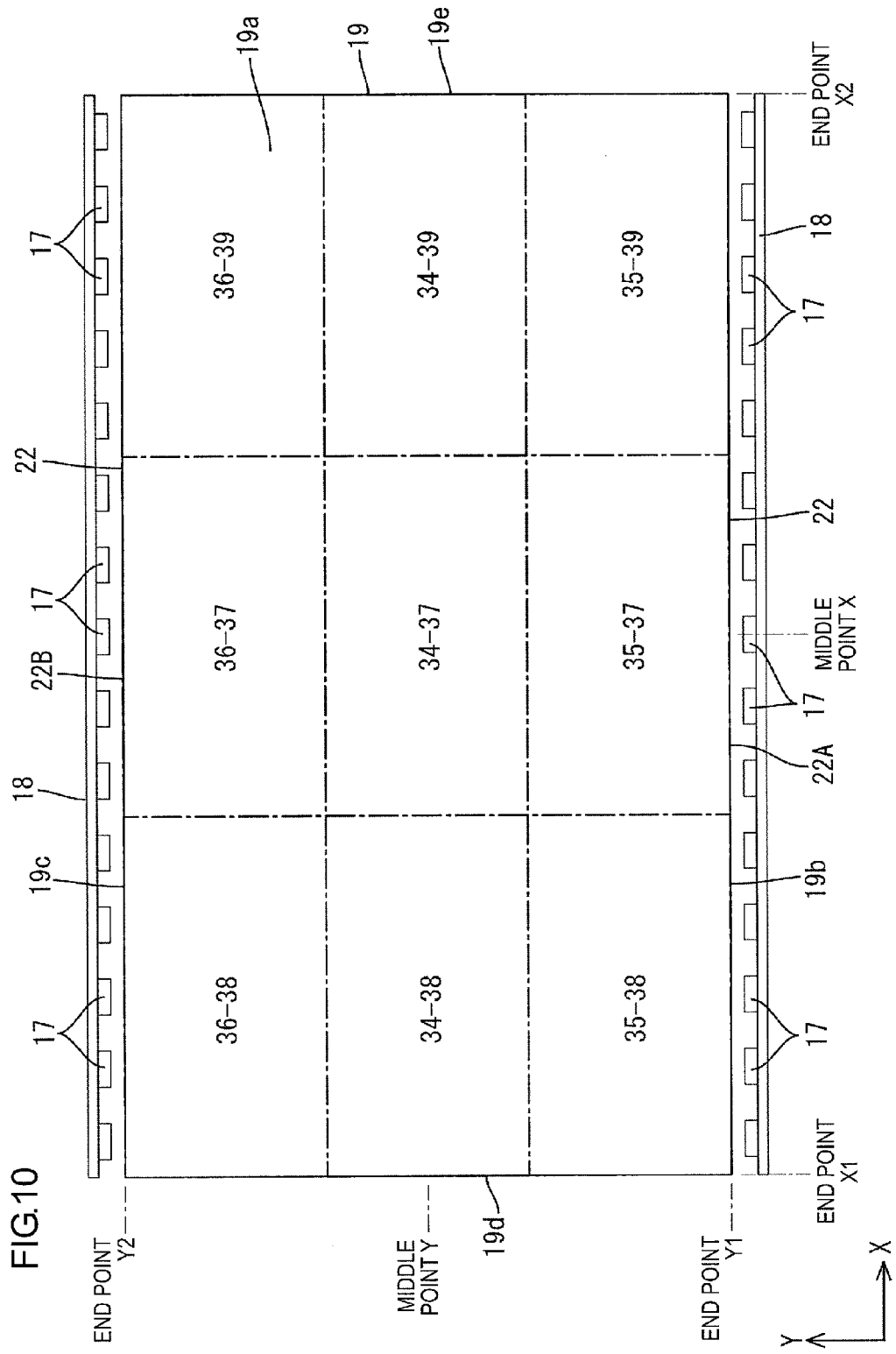
FIG. 10 is a plan view of the LED board and the light guide plate including the opposite plate surface that includes nine sections.

Inequations (3) to (11) express relationships of the distributions of the light reflection patterns LRP among the sections of the opposite plate surface 19*f* of the light guide plate 19 below. The opposite plate surface 19*f* of the light guide plate 19 may be divided into three columns along the first dimension and three rows along the second dimension as illustrated in FIG. 10 to describe the distributions. The rows of the opposite plate surface 19*f* include a middle row 34, a first end row 35, and a second end row 36. The middle row 34 is located in the middle. The first end row 35 is located closer to the first light entrance surface 22A (on the lower side in FIG. 10). The second end row 36 is located closer to the second light entrance surface 22B (on the lower side in FIG. 10). The columns include the middle column 37, a first end column 38, and a second end column 39. The middle column 37 is located in the middle. The first end column 38 is located closer to one of edges (or sides) of the opposite plate surface 19*f* (the left edge in FIG. 10). The second end column 39 is located closer to the other edge (the right edge in FIG. 10). Sections of the opposite plate surface 19*f* defined by the rows 34 to 36 and the columns 37 to 39 includes sections 34-37, 34-38, 34-39, 35-37, 35-38, 35-39, 36-37, 36-38, and 36-39. The number of the reference numeral of each section before dash (-) indicates the row that defines the section and the number after dash indicates the column that defines the section. For example, the section 34-37 is a section at the row 34 and the column 37. The distribution density of the light reflection patterns LRP is higher in the middle row 34 than the first end row 35 and the second end row 36. A difference between the distribution density the in the sections 34-38 and 34-39 and the distribution density in the section 34-37 is larger than a difference between the distribution density in the sections 35-38 and 35-39 and the distribution density in the section 35-37.

Furthermore, difference between the distribution density the in the sections 34-38 and 34-39 and the distribution density in the section 34-37 is larger than a difference between the distribution density in the sections 36-38 and 36-39 and the distribution density in the section 36-37. According to the configuration, the distribution density of the light reflection portions 23 of the light reflection patterns LRP is higher in the row 34 than in the rows 35 and 36 that are closer to the first light entrance surface 22A and the second light entrance surface 22B, respectively. Namely, evenness of the brightness distribution is improved. In the end rows 35 and 36, rays of light are less likely to be directed from the middle to the sides, that is, from the section 35-37 or 36-37 to the sections 35-38 and 35-39 or the sections 36-38 and 36-39 in comparison to the row 34. The amount of light in each of the sections 35-38, 35-39, 36-38, and 36-39 is larger than the amount of light in each of the sections 34-38 and 34-39. By reducing the rays of light directed from the sections 35-37 and 36-37 to the sections 35-38, 35-39, 36-38, and 36-39, the rays of light reflected by the light reflection portions 23 of the light reflection patterns LRP are less likely to exit from the third peripheral surface 19*d* or the fourth peripheral surface 19*e*, which is not the light exit surface 19*a* of the light guide plate 19. Therefore, high light use efficiency is achieved. In the middle row 34, rays of light are more likely to be directed from the section 34-37 to the sections 34-38 and 34-39 in comparison to the end rows 35 and 36. Therefore, a sufficient amount of light is supplied to the sections 34-38 and 34-39 in which the amounts of light tend to be insufficient. According to the configuration, evenness of the brightness distribution is improved.

As described above, the light guide plate 19 having a rectangular plate-like shape includes a light entrance surface 22, the light exit surface 19*a*, the opposite plate surface 19*f*, and the light reflection patterns LRP. The light entrance surface 22 is at least one of opposite surfaces of the peripheral surfaces of the light guide plate 19. Rays of light from the LEDs 17 (light sources) enter the light guide plate 19 through the light entrance surface 22. The light exit surface 19*a* is one of the plate surfaces of the light guide plate 19. The opposite plate surface is the other one of the plate surfaces. The light reflection patterns LRP include the light reflection portions 23 formed on the opposite plate surface 19*f*. The light reflection portions 23 are for directing the rays of light to exit from the light exit surface 19*a*. The distribution densities of the light reflection portions 23 are different from section to section of the opposite plate surface 19*f*. The sections are defined by the first dimension along the first peripheral surface that does not include the light entrance surface 22 and the second peripheral surface that includes the light entrance surface 22. The sections at least include the middle section in the middle of the second dimension and the end sections at the respective ends of the second dimension. The distribution density of the light reflection portions 23 is higher in the end sections than in the middle section. The sections at least include the middle section in the middle of the first dimension and the end sections at the respective ends of the first dimension. The distribution density of the light reflection portions 23 is higher in the middle section than in the end sections. A difference between the distribution density of the light reflection portions 23 in the section in the middle of the first dimension and at the end of the second dimension and the distribution density in the section in the middle of the first and the second dimensions is larger than a difference between the distribution density in the sections at the ends of the first dimension and the second dimension and the distribution density in the section at the ends of the first dimension and in the middle of the second dimension.

The rays of light emitted by the LEDs 17 enter through the light entrance surface 22 and travel through the light guide plate 19. During traveling through the light guide plate 19, the rays of light may be reflected by the light reflection portions 23 of the light reflection patterns LRP on the opposite plate surface 19f. According the configuration, the rays of light are more likely to exit from the light exit surface 19a. The amount of exiting light increases as the distribution density of the light reflection portions 23 of the light reflection patterns LRP increases and decreases as the distribution density decreases. The light reflection portions 23 of the light reflection patterns LRP are formed on the opposite plate surface 19f such that the distribution densities of the light reflection portions 23 are higher in the middle of the first dimension than in the end of the first dimension. According to the configuration, the amounts of light are equalized with respect to the first dimension, that is, the evenness of the brightness with respect to the first dimension is improved. Furthermore, the light reflection portions 23 of the light reflection patterns LRP are formed on the opposite plate surface 19f such that the distribution densities of the light reflection portions 23 are higher in the ends of the second dimension than in the middle of the second dimension. According to the configuration, the rays of light, a larger number of which exist in the middle of the second dimension, are directed to the ends of the second dimension. Namely, the evenness of the brightness with respect to the second dimension is improved.

The light reflection portions 23 of the light reflection patterns LRP are formed on the opposite plate surface 19f such that the differences among sections have the following relationships. The difference between the distribution density of the light reflection portions 23 in the sections in the middle of the first dimension and at the ends of the second dimension and the distribution density in the section in the middle of the first and the second dimensions is larger than the difference between the distribution densities in the sections at the ends of the first dimension and at the ends of the second dimension. According to the configuration, the rays of light in the sections at the ends of the first dimension is less likely to be directed from the middle of the second dimension to the ends of the second dimension in comparison to the sections in the middle of the first dimension. In the sections at the ends of the first dimension and the second dimension, the amount of light inside the light guide plate 19 is larger in the sections in the middle of the first dimension than in the sections at the ends of the second dimension. Furthermore, the rays of light are less likely to be directed from the sections in the middle of the second dimension to the sections at the ends of the second dimension. Therefore, the rays of light reflected by the light reflection portions 23 of the light reflection patterns LRP in the sections at the ends of the second dimension are less likely to exit from the peripheral surface that is not the light exit surface 19a of the light guide plate 19. According to the configuration, high light use efficiency is achieved. In the sections in the middle of the first dimension, the rays of light are more likely to be directed from the sections in the middle of the second dimension to the sections at the ends of the second dimension in comparison to the sections at the ends of the first dimension. Therefore, the sufficient amount of light is supplied to the sections at the ends of the second dimension in which the amount of light tends to be insufficient. According to the configuration, the evenness of the brightness distribution is further improved.

Unevenness of the distribution densities of the light reflection portions 23 of the light reflection patterns LRP may occur due to deficiencies during formation of the light reflection patterns LRP on the opposite plate surface 19f in the production process of the light guide plate 19. Even in such a case, the difference between the distribution densities of the light reflection portions 23 of the light reflection patterns LRP in the sections in the middle of the second dimension and the distribution densities in the sections at the ends of the second dimension is less likely to vary. Therefore, the brightness is less likely to decrease in the sections in the middle of the second dimension. As described earlier, an optical sheet having a special configuration such as ones used in conventional devices is not required for improving the evenness of the brightness distributions. According to the configuration, the parts cost can be reduced and the light use efficiency is further improved.

The opposite plate surface 19f is divided into the middle section (the middle column 29), the end sections (the end columns 30 and 32), and the intermediate sections (the intermediate columns 31 and 33) with respect to the second dimension. The middle section is located in the middle of the second dimension. The end sections are located at the ends of the second dimension. The intermediate sections are located between the middle section and one of the end sections and between the middle section and the other one of the end sections, respectively. The light reflection patterns LRP are formed such that the difference between the distribution density of the light reflection portions 23 in the end sections and the distribution density in the intermediate sections of the second dimension is larger than the difference between the distribution density in the intermediate sections and the distribution density in the middle section. According to the configuration, the difference between the distribution density of the light reflection portions 23 in the intermediate sections and the distribution density in the middle section is relatively small. Therefore, a larger number of the ray of light are directed from the meddle section to the end sections of the second dimension via the intermediate sections. The difference between the distribution density of the light reflection portions 23 in the end sections and the distribution density in the intermediate section is relatively large. The rays of light directed from the middle section to the end sections via the intermediate sections with respect to the second dimension are reflected by the light reflection portions 23 and direct a larger number of rays of light toward the light exit surface 19a. According to the configuration, the difference in brightness that may occur between the middle section and the intermediate sections is compensated. Therefore, the evenness of the brightness is improved. Unevenness of the distribution densities of the light reflection portions 23 of the light reflection patterns LRP may occur due to deficiencies during formation of the light reflection patterns LRP on the opposite plate surface 19f in the production process of the light guide plate 19. Even in such a case, the differences among the distribution density of the light reflection portions 23 of the light reflection patterns LRP in the middle section, the distribution densities in the end sections, and the distribution densities in the intermediate sections are less likely to vary. Therefore, the brightness is less likely to decrease in the middle section of the second dimension.

The opposite plate surface 19f is divided into the middle section (the middle row 24), the end sections (the end rows 25, 27), and the intermediate sections (the intermediate rows 26, 28) with respect to the first dimension. The middle section is located in the middle of the first dimension. The end sections are located at the ends of the first dimension closer to the light entrance surfaces 22. The intermediate sections are located between the middle section and one of the end sections and between the middle section and the other one of the end sections, respectively. The distribution densities of the light reflection portions 23 in the sections in the middle of the first dimension and at the ends of the second dimension, in the sections in the middle of the first dimension and at the intermediate sections of the second dimension, and in the sections in the middle of the first dimension and the second dimension are referred to as RDa, RDb, and RDc. The distribution densities of the light reflection portions 23 in the sections at the ends of the first dimension and at the ends of the second dimension, in the sections at the ends of the first dimension and at the intermediate sections of the second dimension, and in the sections at the ends of the first dimension and the second dimension are referred to as RDd, RDe, and RDf. The distribution densities of the light reflection portions 23 in the sections at the intermediate section of the first dimension and at the ends of the second dimension, in the sections at the intermediate section of the first dimension and at the intermediate sections of the second dimension, and in the sections at the intermediate section of the first dimension and the second dimension are referred to as RDg, RDh, and RDi. The light reflection patterns LRP are formed such that the RDa to RDi satisfy inequations (6) and (7).

The difference between the distribution density in the sections at the intermediate sections of the first dimension and at the ends of the second dimension and the distribution density in the sections at the intermediate sections of the first dimension and at the intermediate sections of the second dimension is referred to as the third difference. The difference between the distribution density in the sections at the intermediate sections of the first dimension and at the intermediate sections of the second dimension and the distribution density in the sections at the intermediate sections of the first dimension and in the middle of the second dimension is referred to as the fourth difference. The difference between the distribution density in the sections at the ends of the first dimension closer to the light entrance surfaces 22 and at the ends of the second dimension and the distribution density in the sections at the ends of the first dimension and at the intermediate section of the second dimension is referred to as the fifth difference. The difference between the distribution density in the sections at the ends of the first dimension and at the intermediate sections of the second dimension and the distribution density in the sections at the ends of the first dimension and in the middle of the second dimension is referred to as the sixth difference. The fifth difference and the sixth difference are smaller than the third difference and the fourth difference, respectively. According to the configuration, the rays of light are less likely to be directed from the sections in the middle of the second dimension to the sections at the ends of the second dimension via the intermediate sections. Therefore, in the sections at the ends of the first dimension and at the ends of the second dimension and in the sections at the intermediate sections of the first dimension and at the ends of the second dimension, the rays of light reflected by the light reflection portions 23 of the light reflection patterns LRP are less likely to exit from the peripheral surfaces that are not the light exit surface 19*a* of the light guide plate 19. According to the configuration, the high light use efficiency is achieved.

The difference between the distribution density in the section in the middle of the first dimension and at the end of the second dimension and the distribution density in the section in the middle of the first dimension and at the intermediate section of the second dimension is referred to as the first difference. The difference between the distribution density in the section in the middle of the first dimension and at the intermediate section of the second dimension and the distribution density in the section in the middle of the first dimension and the second dimension is referred to as the second difference. The first difference is larger than the third and fifth differences and the second difference is larger than the fourth and the sixth differences. According to the configuration, the rays of light are more likely to be directed from the section in the middle of the second dimension to the sections at the ends of the second dimension via the intermediate sections. In the sections in the middle of the first dimension and at the ends of the second dimension, the rays of light reflected by the light reflection portions 23 of the light reflection patterns LRP efficiently exit from the light exit surface 19*a*. As a result, the unevenness in brightness that may occur between the sections at the end of the first dimension and the intermediate sections is compensated and thus the evenness of the brightness distribution is improved. The unevenness of the distribution densities of the light reflection portions 23 of the light reflection patterns LRP may occur due to deficiencies during formation of the light reflection patterns LRP on the opposite plate surface 19*f* in the production process of the light guide plate 19. Even in such a case, the differences among the distribution density of the light reflection portions 23 of the light reflection patterns LRP in the section in the middle of the second dimension, the distribution densities in the sections at the end of the second dimension, and the distribution densities in the sections at the intermediate sections of the second dimension are further less likely to vary. Therefore, the brightness is less likely to decrease in the section in the middle of the second dimension.

The light entrance surface 22 includes the first light entrance surface 22A and the second light entrance surface 22B. The first light entrance surface 22A is one of the peripheral surfaces opposite to each other. The rays of light from the LEDs 17 on one of sides enter the light guide plate 19 through the light entrance surface 22A. The second light entrance surface 22B is the other one of the peripheral surfaces. The rays of light from the LEDs 17 on the other one of sides enter the light guide plate 19 through the light entrance surface 22B. The light reflection patterns LRP may be formed on the opposite plate surface 19*f* with the light reflection portions 23, the distribution densities of which are defined according to the sections of the opposite plate surface 19*f* as described below. The sections of the opposite plate surface 19*f* include the middle row 34, the first end row 35, and the second end row 36. The middle row 34 is located in the middle of the first dimension of the opposite plate surface 19*f*. The first end row 35 is located at the end of the first dimension closer to the first light entrance surface 22A. The second end row 36 is located at the other end of the first dimension closer to the second light entrance surface 22B. The distribution density in the middle row 34 is higher than the distribution density in the first end row and the distribution density in the second end row. The middle row 34 includes three sections: the middle section in the middle of the second dimension of the opposite plate surface 19*f*; the first end section at one end of the second dimension; and the second end section at the other end of the second dimension. The first end row 35 includes three sections: the middle section in the middle of the second dimension of the opposite plate surface 19*f*; the first end section at one end of the second dimension; and the second end section at the other end of the second dimension. The second end row includes three sections: the middle section in the middle of the second dimension of the opposite plate surface 19f; the first end section at one end of the second dimension; and the second end section at the other end of the second dimension. The difference between the distribution density of the light reflection portions 23 in the first and the second end sections of the middle row 34 and the distribution density in the middle section in the middle row 34 is larger than the difference between the distribution density in the first and the second end sections of the first end row 35 and the distribution density in the middle section in the first end row 35. Furthermore, the difference between the distribution density of the light reflection portions 23 in the first and the second end sections of the middle row 34 and the distribution density in the middle section in the middle row 34 is larger than the difference between the distribution density in the first and the second end sections of the second end row 36 and the distribution density in the middle section in the second end row 36. Namely, the distribution density is large in the middle row than in the first end row 35 and in the second end row 36. According to the configuration, the amount of exiting light is increased with respect to the first dimension, that is, the evenness of the brightness is improved with respect to the first dimension. The rays of light are less likely to directed from the middle section to the first and the second end sections in the first end row 35 and in the second end row 36 in comparison to the middle row 34. The amounts of light in the first and the second end sections of the first end row 35 and the second end row 36 are larger than the amounts of light in the first and the second end sections of the middle row 34. Because the rays of light are less likely to be directed from the middle sections to the first and the second end sections in the first end row 35 and the second end row 36, the rays of light reflected by the light reflection portions 23 in the first and the second end sections are less likely to exit from the peripheral surfaces that are not the light exit surface 19a of the light guide plate 19. According to the configuration, the high light use efficiency is achieved. In the middle row 34, the rays of light are more likely to be directed from the middle section to the first and the second end sections in comparison to the first end row 35 and the second end row 36. Namely, the sufficient amount of light is supplied to the first and the second end sections in which the amount of light tends to be insufficient. According to the configuration, the evenness of the brightness distribution is further improved.

The light reflection patterns LRP may be formed on the opposite plate surface 19f with the light reflection portions 23, the distribution densities of which are defined according to the sections of the opposite plate surface 19f as described below. The sections include the middle row 24, the first end row 25, the first intermediate row 26, the second end row 27, and the second intermediate row 28. The middle row 24 is located in the middle of the first dimension of the opposite plate surface 19f. The first end row 25 is located at the end of the first dimension close to the first light entrance surface 22A. The first intermediate row 26 is located between the middle row 24 and the first end row 25. The second end row 27 is located at the end of the first dimension close to the second light entrance surface 22B. The second intermediate row 28 is located between the middle row 24 and the second end row 27. The difference between the distribution density in the sections at the ends of the second dimension and the distribution density in the section in the middle of the second dimension is larger in the middle row 24 than in the first end row 25, the first intermediate row 26, the second end row 27, and the second intermediate row 28. According to the configuration, the rays of light are less likely to be directed from the middle to the ends of the second dimension in the first end row 25, the first intermediate row 26, the second end row 27, and the second intermediate row 28 in comparison to the middle row 24. The amounts of light in the sections at the ends of the second dimension are larger in the first end row 25, the first intermediate row 26, the second end row 27, and the second intermediate row 28 in comparison to the middle row 24. Because the rays of light are less likely to be directed from the middle to the ends of the second dimension as described above, the rays of light reflected by the light reflection portions 23 in the sections at the ends of the second dimension are less likely to exit from the peripheral surfaces that are not the light exit surface 19a of the light guide plate 19. According to the configuration, the high light use efficiency is achieved. In the middle row 24, the rays of light are more likely to be directed from the middle to the ends of the second dimension in comparison to the first end row 25, the first intermediate row 26, the second end row 27, and the second intermediate row 28. Namely, the sufficient amount of light is supplied to the sections at the ends of the second dimension in which the amount of light tends to be insufficient. According to the configuration, the evenness of the brightness distribution is improved.

Furthermore, the light reflection patterns LRP may be formed with the light reflection portions 23, the distribution densities of which are defined according to the sections of the opposite plate surface 19f as described below. The difference between the distribution density of the light reflection portions 23 in the sections at the ends of the second dimension in the first intermediate row 26 and the distribution density in the section in the middle of the second dimension in the first intermediate row 26 is larger than the difference between the distribution density in the sections at the ends of the second dimension in the first end row 25 and the distribution density in the section in the middle of the second dimension in the first end row 25. The difference between the distribution density in the sections at the ends of the second dimension in the second intermediate row 28 and the distribution density in the section in the middle of the second dimension in the second intermediate row 28 is larger than the difference between the distribution density in the sections at the ends of the second dimension in the second end row 27 and the distribution density in the section in the middle of the second dimension in the second end row 27. In comparison to the first intermediate row 26 and the second intermediate row 28, the rays of light are less likely to be directed from the middle to the ends of the second dimension in the first end row 25 and the second end row 27. The amounts of light in the sections at the ends of the second dimension in the first end row 25 and the second end row 27 are larger than the amounts of light in the sections at the ends of the second dimension in the first intermediate row 26 and the second intermediate row 28. Therefore, according to the configuration that reduces the rays of light traveling from the middle to the ends of the second dimension in the first end row 25 and the second end row 27, the rays of light reflected by the light reflection portions 23 in the sections at the ends of the second dimension are less likely to exit from the peripheral surfaces that are not the light exit surface 19a of the light guide plate 19. Namely, the high light use efficiency is achieved. In the first intermediate row 26 and the second intermediate row 28, the rays of light are more likely to be directed from the middle to the ends of the second dimension in comparison to the first end row 25 and the second end row 27. According to the configuration, the sufficient amount of light is supplied to the sections at the ends of the second dimension in which the amount of light tends to be insufficient. The evenness of the brightness distribution is improved.

The opposite plate surface 19*f* may be further divided into five columns including the middle column 29, the first end column 30, the first intermediate column 31, the second end column 32, and the second intermediate column 33. The middle column 29 is located in the middle of the second dimension. The first end column 30 is located at the end of the second dimension. The first intermediate column 31 is located between the middle column 29 and the first end column 30. The second end column 32 is located at the other end of the second dimension. The second intermediate column 33 is located between the middle column 29 and the second end column 32. The sections of the opposite plate surface 19*f* are defined by the rows 24 to 28 and the columns 29 to 33. The sections defined by the row 24 to 28 and the columns 29 to 33 include the sections 24-29, 24-30, 24-31, 24-32, 24-33, 25-29, 25-30, 25-31, 25-32, 25-33, 26-29, 26-30, 26-31, 26-32, 26-33, 27-29, 27-30, 27-31, 27-32, 27-33, 28-29, 28-30, 28-31, 28-32, and 28-33. The number of the reference numeral of each section before dash (-) indicates the row that defines the section and the number after dash indicates the column that defines the section. For example, the section 24-29 is the section at the row 24 and the column 29. The light reflection patterns LRP may be formed with the light reflection portions 23, the distribution densities of which are defined according to the sections of the opposite plate surface 19*f* as described below. The difference between the distribution density in the sections 24-30 and 24-32 and the distribution density in the sections 24-31 and 24-33 is referred to as the first difference. The difference between the distribution density in the sections 24-31 and 24-33 and the distribution density in the section 24-29 is referred to as the second difference. The difference between the distribution density in the sections 26-30, 26-32, 28-30, and 28-32 and the distribution density in the sections 26-31, 26-33, 28-31, and 28-33 is referred to as the third difference. The difference between the distribution density in the sections 26-31, 26-33, 28-31, and 28-33 and the distribution density in the sections 26-29, and 28-29 is referred to as the fourth difference. The difference between the distribution density in the sections 25-30, 25-32, 27-30 and 27-32 and the distribution density in the sections 25-31, 25-33, 27-31, and 27-33 is referred to as the fifth difference. The difference between the distribution density in the sections 25-31, 25-33, 27-31, and 27-33 and the distribution density in the sections 25-29 and 27-29 is referred to as the sixth difference. The difference between the first difference and the second difference is larger than the difference between the third difference and the fourth difference and the difference between the fifth difference and the sixth difference. According to the configuration, the difference between the fifth difference and the sixth difference in the first end row 25 is smaller than the difference between the first difference and the second difference in the middle row 24. Furthermore, the difference between the third difference and the fourth difference in the first intermediate row 26 is smaller than the difference between the first difference and the second difference in the middle row 24. According to the configuration, the rays of light are less likely to be directed from the middle sections 25-29 and 26-29 to the end sections 25-30, 25-32, 26-30, and 26-32 via the intermediate sections 25-31, 25-33, 26-31, and 26-33. In the end sections 25-30, 25-32, 26-30, and 26-32, the rays of light reflected by the light reflection portions 23 are less likely to exit from the peripheral surfaces that are not the light exit surface 19*a* of the light guide plate 19. According to the configuration, the high light use efficiency is achieved. The second end row 27 and the second intermediate row 28 have the same configurations and exert the same effects. The difference between the first difference and the second difference in the middle row 24 is larger than the difference between the third difference and the fourth difference and the difference between the fifth difference and the sixth difference. Therefore, in the middle row 24, the rays of light are more likely to be directed from the middle section 24-29 to the end sections 24-30 and 24-32 via the intermediate sections 29-31 and 24-33. In the end sections 24-30 and 24-32 in the middle row 24, the rays of light reflected by the light reflection portions 23 efficiently exit from the light exit surface 19*a*. Therefore, the difference in brightness between the middle row 24 and the first end row 25, the first intermediate row 26, the second end row 27, or the second intermediate row 28 is compensated. According to the configuration, the evenness of the brightness distribution is improved. The brightness distributions are equalized in the total of nine sections 24-29, 24-30, 24-32, 25-29, 25-30, 25-32, 27-29, 27-30, and 27-32. Therefore, when the light guide plate 19 is used in the backlight unit 12 for the liquid crystal display device 10, very high display quality is achieved.

The light reflection patterns LRP are formed such that the light reflection portions 23 are line symmetric with respect to the first dimension. This configuration is effective when a distance between each LED 17 and the first light entrance surface 22A and a distance between each LED 17 and the second light entrance surface 22B are set equal.

The light reflection portions 23 of the light reflection patterns LRP include the dots 23*a* that are the light reflection films printed on the opposite plate surface 19*f*. The distribution densities of the light reflection portions 23 are adjustable through modification of at least one of the areas and the intervals of the dots 23*a*. According to the configuration, the distribution densities of the light reflection portions 23 are easily adjusted by changing the configuration of the dots 23*a*.

The backlight unit (a lighting device) 12 includes at least the light guide plate 19 and the LEDs 17 that emit light toward the light entrance surface 22. The light guide plate 19 including the light entrance surface 22 through which the rays of light from the LEDs 17 enter and has improved evenness of the brightness distribution and the high light use efficiency. Namely, the backlight unit 12 has good optical performance and high brightness (low power consumption).

The liquid crystal display device (a display device) 10 includes the backlight unit 12 described above and the liquid crystal panel (display panel) 11 configured to display images using light from the backlight unit 12. The backlight unit 12 included in the liquid crystal display device 10 includes the light guide plate 19 having the improved evenness of the brightness distribution and the high light use efficiency. According to the liquid crystal display device 10, high quality images are displayed on the liquid crystal panel 11. The configuration of the liquid crystal display device 10 is preferable for large-screen applications.

The television device TV include the liquid crystal display device 10 described above. The liquid crystal display device 10 includes the light guide plate 19 having the improved evenness of the brightness distribution and the high light use efficiency. According to the television device TV, high quality images are displayed on the liquid crystal panel 11. The configuration of the television device TV is preferable for large-screen applications.

Second Embodiment

A second embodiment of this invention will be described with reference to FIGS. 11 to 15. The second embodiment includes a backlight unit 112 that is a single edge type backlight unit. Structures, functions, and effects similar to those of the first embodiment will not be described.

Figure 11:
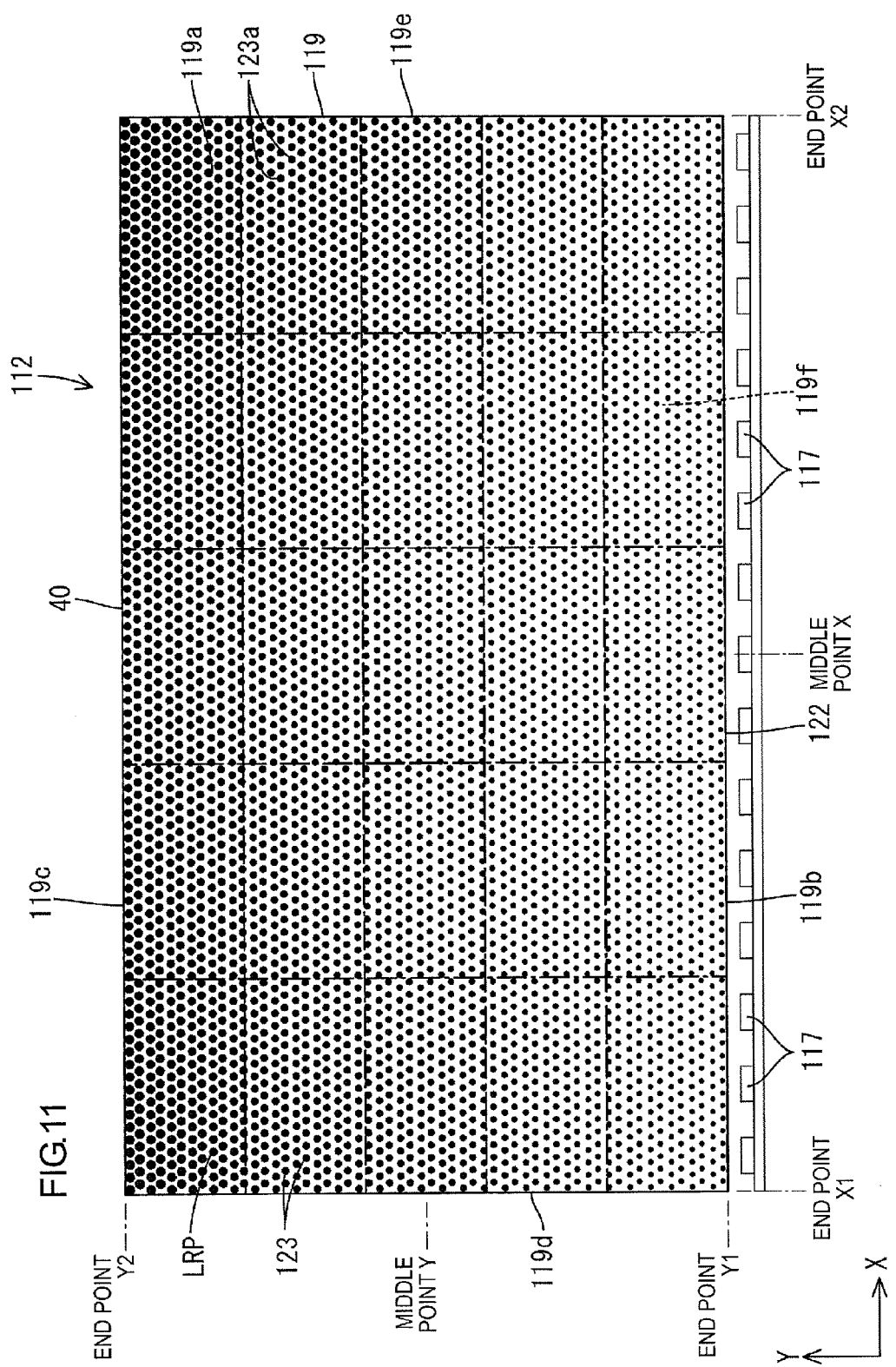
FIG. 11 is a plan view of an LED board and a light guide plate in a backlight unit in a liquid crystal display device according to a second embodiment.

As illustrated in FIG. 11, the backlight unit 112 includes a light guide plate 119 having four peripheral surfaces. A first peripheral surface 119b that is one of long peripheral surface of the light guide plate 119 is a light entrance surface 122 through which light from LEDs 117 enters. A second peripheral surface 119c, a third peripheral surface 119d, and a fourth peripheral surface 119e that are the rest of the peripheral surfaces are non-LED opposed surfaces through which light from the LEDs 117 does not directly enter. The second peripheral surface 119c is an opposite peripheral surface 40 that is opposite from the light entrance surface 122.

Next, the distribution of the light reflection portions 123 of the light reflection patterns LRP on the opposite plate surface 119f of the light guide plate 119 will be described. As illustrated in FIG. 11, the light reflection portions 123 of the light reflection patterns LRP are formed on the opposite plate surface 119f of the light guide plate 119 such that the distribution density of the light reflection portions 123 increases as a distance to the opposite peripheral surface 40 along the first dimension decrease and decreases as a distance to the light entrance surface 122 along the first dimension decreases. Specifically, the dots 123a are formed on the opposite plate surface 119f such that diameters thereof gradually increase as a distance from the light entrance surface 122 increases. Namely, the diameters of the dots 123a are larger in a middle area of the opposite plate surface 119f than in an edge area closer to the light entrance surface 122 and larger in an edge area closer to the opposite peripheral surface 40 than in the middle area. The dots 123a are formed on the opposite plate surface 119f such that diameters thereof gradually decrease as a distance from the opposite peripheral surface increases. Namely, the diameters of the dots 123a are smaller in a middle area of the opposite plate surface 119f than in the edge area closer to the opposite peripheral surface 40 and smaller in the edge area closer to the light entrance surface 122 than in the middle area. Rays of light emitted by the LEDs 117 enter the light guide plate 119 through the light entrance surface 122 and travel inside the light guide plate 119 along the first dimension from the light entrance surface 122 to the opposite peripheral surface 40 via a middle portion of the light guide plate 119. According to the distribution of the light reflection portions 123, irregular reflection by the light reflection portions 123 is less likely to occur as the distance to the light entrance surface 122 along the first dimension decreases. The irregular reflection is more likely to occur as the distance to the opposite peripheral surface 40 along the first dimension decreases. Therefore, even distribution of the amount of exiting light from the light exit surface 119a is achieved, that is, even brightness is achieved with respect to the first dimension. The distribution of the light reflection patterns LRP along the second dimension is the same as the first embodiment.

Figure 12:
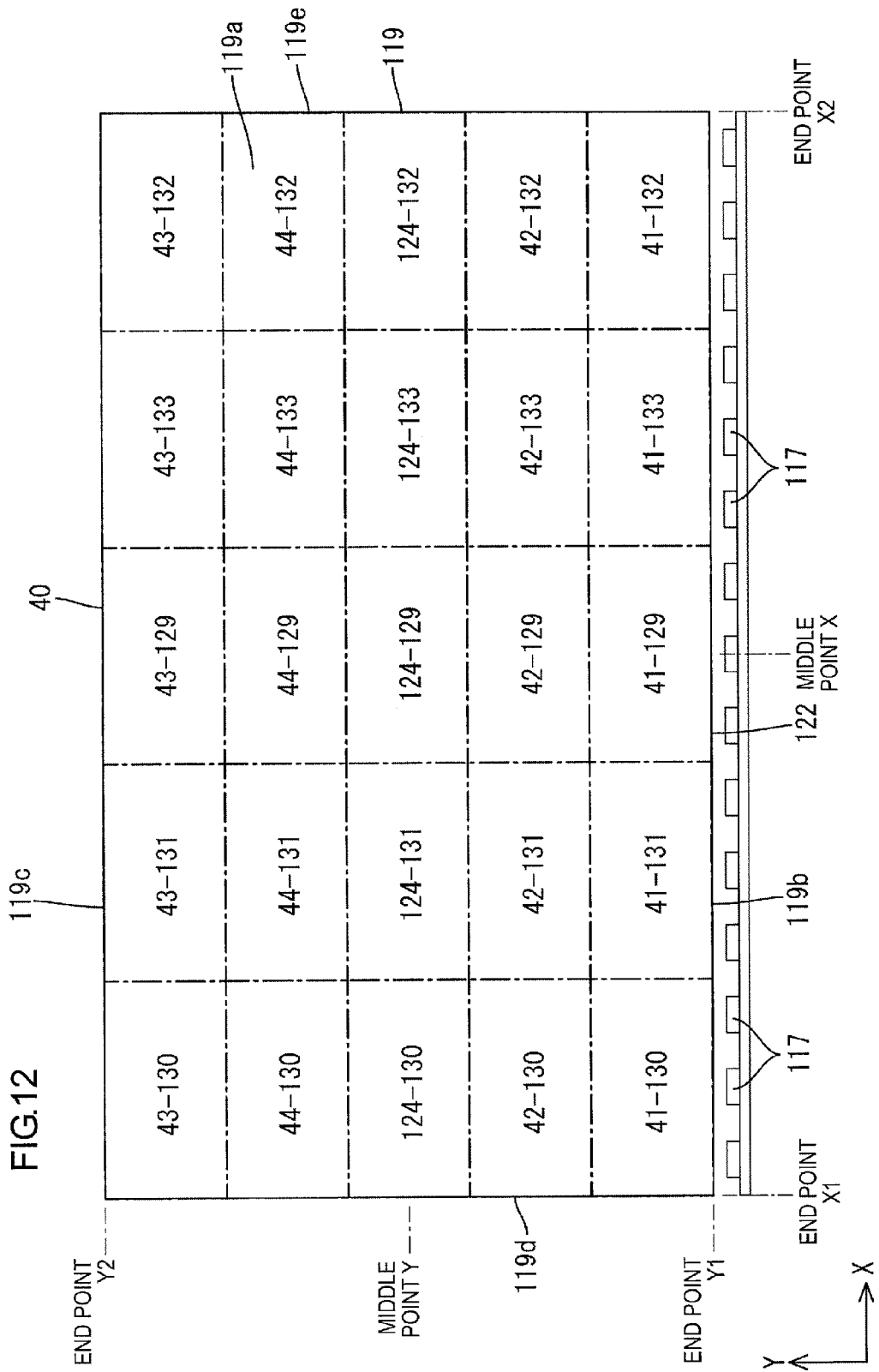
FIG. 12 is a plan view of the LED board and the light guide plate including an opposite plate surface that includes twenty five sections.

Prior to detailed description of the distribution of the light reflection patterns LRP, sections of the opposite plate surface 119f of the light guide plate 119 will be described. As illustrated in FIG. 12, the opposite plate surface 119f is divided into five rows including a middle row 124, a first end row 41, a first intermediate row 42, a second end row 43, and a second intermediate row 44. The middle row 124 is located in the middle of the first dimension of the opposite plate surface 119f. The first end row 41 is located at an end of the first dimension of the opposite plate surface 119f at which the light entrance surface 122 is located (on the lower side in FIG. 12). The first intermediate row 42 is located between the middle row 124 and the first end row 41. The second end row 43 is located at the other end of the first dimension at which the opposite peripheral surface 40 is located (on the upper side in FIG. 12). The second intermediate row 44 is located between the middle row 124 and the second end row 43. Area ratios of the rows 124 and 41 to 44 are equal. The opposite plate surface 119f is further divided into five columns including a middle column 129, a first end column 130, a first intermediate column 131, a second end column 132, and a second intermediate column 133. The middle column 129 is located in the middle of the second dimension of the opposite plate surface 119f. The first end column 130 is located at one of ends of the second dimension of the opposite plate surface 119f (a left edge in FIG. 12). The first intermediate column 131 is located between the middle column 129 and the first end column 130. The second end column 132 is located at the other end of the second dimension of the opposite plate surface 119f (a right edge in FIG. 12). The second intermediate column is located between the middle column 129 and the second end column 132. Area ratios of the columns 129 to 133 are equal. FIG. 12 is for illustrating the sections of the opposite plate surface 119f and thus the light reflection patterns LRP are not illustrated in FIG. 12.

Figure 13:
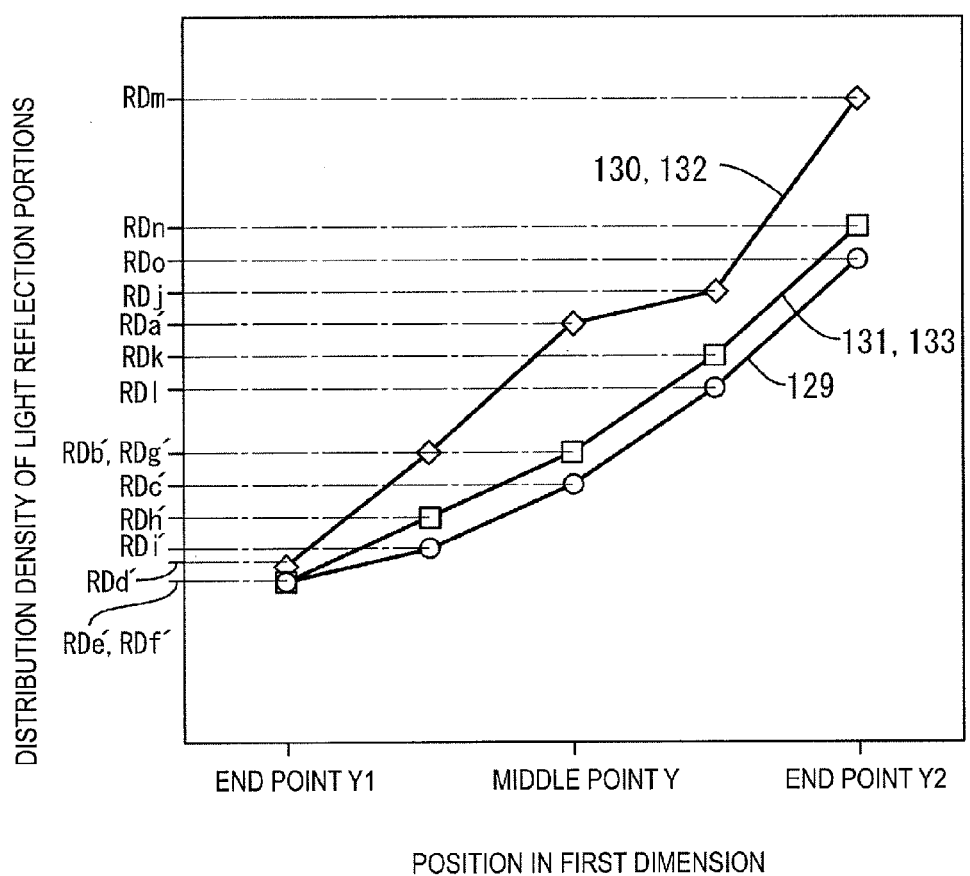
FIG. 13 is a graph illustrating variations in distribution density of the light reflection portions between end point Y1 and end point Y2 on the opposite plate surface of the light guide plate.
Figure 14:
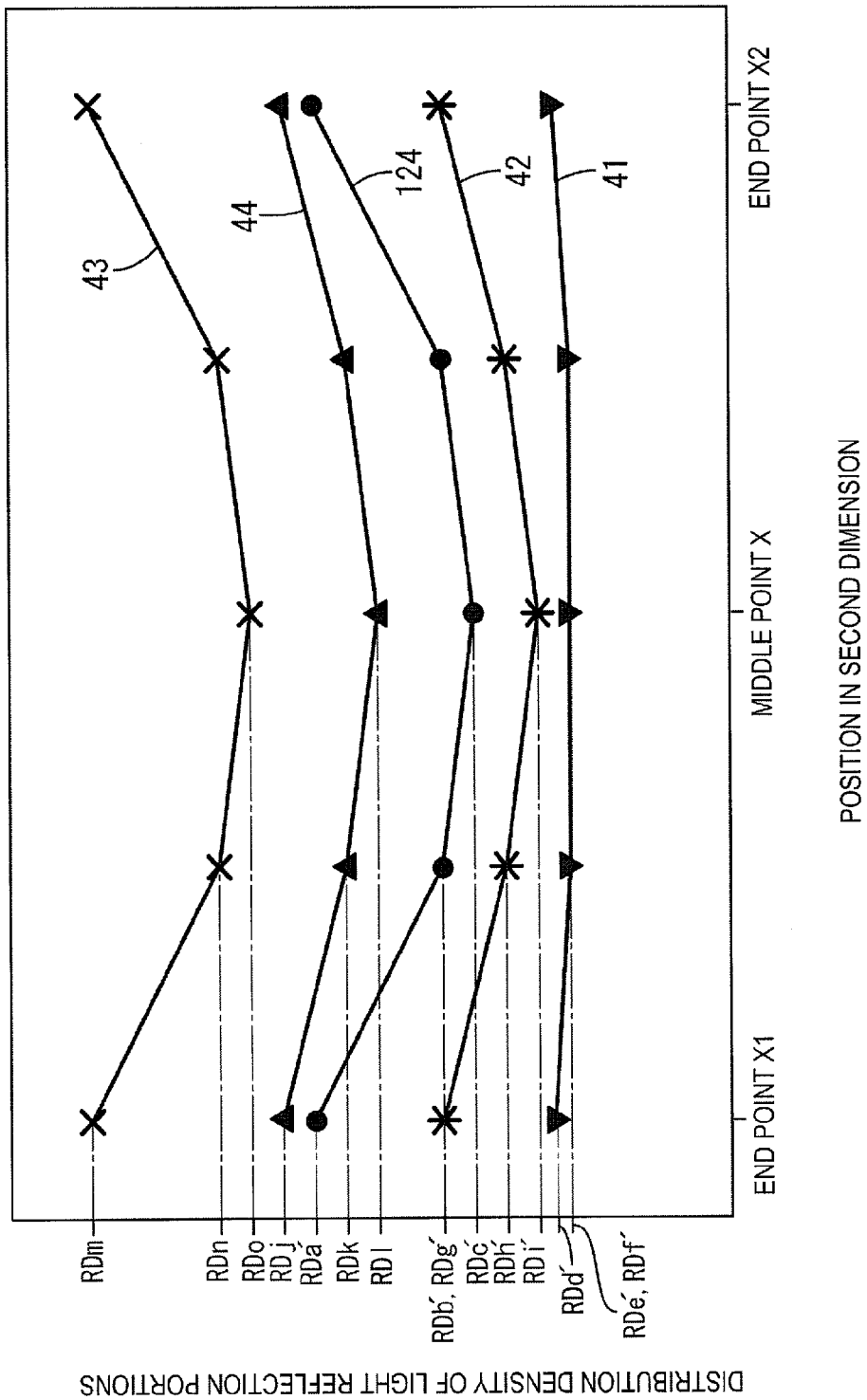
FIG. 14 is a graph illustrating variations in distribution density of the light reflection portions between end point X1 and end point X2 on the opposite plate surface of the light guide plate.

The distribution of the light reflection patterns LRP on the opposite plate surface 119f of the light guide plate 119 is illustrated in FIGS. 13 and 14. Curves in FIG. 13 represent distribution densities at points between end point Y1 and end point Y2 along the first dimension in the middle column 129, the first end column 130, the first intermediate column 131, the second end column 132, and the second intermediate column 133 of the opposite plate surface 119f of the light guide plate 119. Curves in FIG. 14 represent distribution densities at points between end point X1 and end point X2 along the second dimension in the middle row 124, the first end row 41, the first intermediate row 42, the second end row 43, and the second intermediate row 44 of the opposite plate surface 119f of the light guide plate 119. End points Y1, Y2, X1 and X2 and middle points Y-middle and X-middle in FIGS. 13 and 14 correspond with those in FIGS. 11 and 12.

The distribution of the light reflection patterns LRP along the first dimension will be described. In each of the columns 129 to 133, as illustrated in FIG. 13, the distribution density is the highest in the second end row 43. The distribution density decreases in the sequence of the second intermediate row 44, the middle row 124, the first intermediate row 42, and the first end row 41. Namely, the light reflection patterns LRP are asymmetric with respect to the first dimension. A variation in distribution density of the light reflection portions 123 along the first dimension (corresponding to a gradient of each curve in FIG. 13 or a difference between the adjacent sections) is larger in the end columns 130 and 132 than the middle column 129 and the intermediate columns 131 and 133. A variation in distribution density from the first end row 41 to the first intermediate row 42 in the middle column 129, a variation in distribution density from the first end row 41 to the first intermediate row 42 in the first end column 130, and a variation in distribution density from the first end row 41 to the first intermediate row 42 in the second end column 132 are equal and the smallest. A variation in distribution density from the first intermediate row 42 to the middle row 124 in the first intermediate column 131, a variation in distribution density from the first intermediate row 42 to the middle row 124 in the second intermediate column 133, and a variation in distribution density from the first intermediate row 42 to the middle row 124 in the middle column 129 are equal and the second smallest. A variation in distribution density from the middle row 124 to the second intermediate row 44 in the first intermediate column 131, a variation in distribution density from the middle row 124 to the second intermediate row 44 in the second intermediate column 133, and a variation in distribution density from the middle row 124 to the second intermediate row 44 in the middle column 129 are equal and the third smallest. A variation in distribution density from the second intermediate row 44 to the second end row 43 in the first intermediate column 131, a variation in distribution density from the second intermediate row 44 to the second end row 43 in the second intermediate column 133, a variation in distribution density from the second intermediate row 44 to the second end row 43 in the middle column 129, a variation in distribution density from the first intermediate row 42 to the second end row 43 in the first end column 130, and a variation in distribution density from the first intermediate row 42 to the second end row 43 in the second end column 132 are equal and the fourth smallest. A variation in distribution density from the second intermediate row 44 to the first end row 43 in the second intermediate column 133 and a variation in distribution density from the second intermediate row 44 to a second end row 43 in the second end column 132 are equal and the largest. The distribution densities of the light reflection portions 123 in the first end row 41 in the middle column 129 and in the first end row 41 in the intermediate columns 131 133 are equal.

Next, the distribution of the light reflection patterns LRP along the second dimension will be described. In each of the rows 41-44 and 124, as illustrated in FIG. 14, the distribution density of the light reflection portions 123 is the lowest in the middle section in the middle column 129 (41-129, 42-129, 43-129, 44-129, or 124-129). The distribution density increases in the sequence of the first and the second intermediate columns 131 and 133 and the first and the second end columns 130 and 132. The distribution densities in the sections in the first end column 130 and in the second end column 132 are equal. The distribution densities in the sections in the first intermediate column 131 and the second intermediate column 133 are equal. The light reflection portions 123 of the light reflection patterns LRP are symmetric with respect to the second dimension. A variation in distribution density of the light reflection portions 123 along the second dimension (corresponding to a gradient of each curve in FIG. 14 or a difference between the adjacent sections) is larger in the middle row 124 than in the first end row 41 and the first intermediate row 42. A variation in distribution density in the second end row 43 is larger in the second intermediate row 44. A variation in distribution density from the middle section 41-129 to the first intermediate section 41-131 and to the second intermediate section 41-133 in the first end row 41 is the smallest. A variation in distribution density from the first intermediate section 41-131 and the second intermediate section 41-133 to the first end section 41-130 and the second end section 41-132 in the first end row 41 are the second smallest. A variation in distribution density from the middle section 42-129 to the first intermediate section 42-131 and to the second intermediate section 42-133 in the first intermediate row 42 is the third smallest. A variation in distribution density from the middle section 124-129 to the first intermediate section 124-131 and to the second intermediate section 124-133 in the middle row 124 is about equal to the above variation and the third smallest. A variation in distribution density from the middle section 44-129 to the first intermediate section 44-131 and to the second intermediate section 44-133 in the second intermediate row 44 is about equal to the above variation and the third smallest. A variation in distribution density from the middle section 43-129 to the first intermediate section 43-131 and to the second intermediate section 43-133 in the second end row 43 is about equal to the above variation and the third smallest. A variation in distribution density from the first intermediate section 42-131 to a first end section 42-130 and from the second intermediate section 42-133 to the second end section 42-132 in the first intermediate row 42 are about equal and the fourth smallest. A variation in distribution density from the first intermediate section 44-131 to the first end section 44-130 and from the second intermediate section 44-133 to the second end section 44-132 in the second intermediate row 44 are about equal to the above variation and the fourth smallest. A variation in distribution density from the first intermediate section 124-131 to the first end section 124-130 and from the second intermediate section 124-133 to the second end section 124-132 in the middle row 124 are the largest. A variation in distribution density from the first intermediate section 43-131 to the first end section 43-130 and from the second intermediate section 43-133 to the second end section 43-132 in the second end row 43 are about equal to the above variation and the largest. The distribution densities of the light reflection portions 123 in the middle section 41-129, the first intermediate section 41-131, and the second intermediate section 41-133 in the first end row 41 are equal.

The distributions of the light reflection patterns LRP illustrated in FIGS. 13 and 14 satisfy inequations (12) to (19). The distribution density of the light reflection portions 123 in the end sections 124-130 and 124-132 in the middle row 124 is denoted by RDa'. The distribution density in the intermediate sections 124-131 and 124-133 in the middle row 124 is denoted by RDb'. The distribution density in the middle section 124-129 in the middle row 124 is denoted by RDc'. The distribution density of the light reflection portions 123 in the end sections 41-130 and 41-132 in the first end row 41 is denoted by RDd'. The distribution density in the intermediate sections 41-131 and 41-133 in the first end row 41 is denoted by RDd'. The distribution density in the middle section 41-129 in the first end row 41 is denoted by RDf'. The distribution density of the light reflection portions 123 in the end sections 42-130 and 42-132 in the first intermediate row 42 is denoted by RDg'. The distribution density in the intermediate sections 42-131 and 42-133 in the first intermediate row 42 is denoted by RDh'. The distribution density in the middle section 42-129 in the first intermediate row 42 is denoted by RDi'. The distribution density of the light reflection portions 123 in the end sections 44-130 and 44-132 in the second intermediate row 44 is denoted by RDj. The distribution density in the intermediate sections 44-131 and 44-133 in the second intermediate row 44 is denoted by RDk. The distribution density in the middle section 44-129 in the second intermediate row 44 is denoted by RDl. The distribution density of the light reflection portions 123 in the end sections 43-130 and 43-132 in the second end row 43 is denoted by RDm. The distribution density in the intermediate sections 43-131 and 43-133 in the second end row 43 is denoted by RDn. The distribution density in the middle section 43-129 in the second end row is denoted by RDo.

$$(RDb'-RDc')<(RDa'-RDb') \quad (12)$$

$$(RDe'-RDf')<(RDd'-RDe') \quad (13)$$

$$(RDh'-RDi')<(RDg'-RDh') \quad (14)$$

$$(RDk-RDl)<(RDj-RDk) \quad (15)$$

$$(RDn-RDo)<(RDm-RDn) \quad (16)$$

$$((RDd'-RDe')-(RDe'-RDf'))<((RDa'-RDb')-(RDb'-RDc')) \quad (17)$$

$$((RDg'-RDh')-(RDh'-RDi'))<((RDa'-RDb')-(RDb'-RDc')) \quad (18)$$

$$((RDj-RDk)-(RDk-RDl))<((RDm-RDn)-(RDn-RDo)) \quad (19)$$

Inequations (12) to (16) express relationships of differences in distribution density of the light reflection portions 123 among the sections of the opposite plate surface 119f of the light guide plate 119 below. A difference between the distribution density RDa' in the first end section 124-130 and the distribution density RDb' in the first intermediate section 124-131 in the middle row 124 is larger than a difference between the distribution density RDb' in the intermediate section 124-131, 124-133 and the distribution density RDc' in the middle section 124-129 in the middle row 124. A difference between the distribution density in each of the end sections 41-130 and 41-132 and the distribution density RDe' in the corresponding intermediate section 41-131 or 41-133 is larger than a difference between the distribution density RDe' in each of the intermediate sections 41-131 and 41-133 and the distribution density RDh' in the middle section 41-129 in the first end row 41. A difference between the distribution density RDg' in each of the end sections 42-130 and 42-132 and the distribution density RDh' in the corresponding intermediate section 42-131 or 42-133 in the first intermediate row 42 is larger than a difference between the distribution density RDh' in each of the intermediate sections 42-131 and 42-133 and the distribution density RDi' in the middle section 42-129. A difference between the distribution density RDj in each of the end section 44-130 and 44-132 and the distribution density RDk in the corresponding intermediate section 44-131 or 44-133 is larger than a difference between the distribution density RDk in each of the intermediate sections 44-131 and 44-133 and the distribution density RDl in the middle section 44-129 in the second intermediate row 44. A difference between the distribution density RDm in each of the end sections 43-130 and 43-132 and the distribution density RDn in the corresponding intermediate section 43-131 or 43-133 is larger than a difference between the distribution density RDn in each of the intermediate sections 43-131 and 43-133 and the distribution density RDo in the middle section 43-129 in the second end row 43. Inequations (17) and (18) express relationships of differences in distribution density of the light reflection portions 123 among the sections of the opposite plate surface 119f of the light guide plate 119 below. The differences among the sections are defined as follows. A difference between the distribution density RDa' in each of the end sections 124-130 and 124-132 and the distribution density RDb' in the corresponding intermediate section 124-131 or 124-133 in the middle row 124 is a first difference. A difference between the distribution density RDb' in each of the intermediate sections 124-131 and 124-133 and the distribution density RDc' in the middle section 124-129 in the middle row 124 is a second difference. A difference between the distribution density RDg' in each of the end sections 42-130 and 42-132 and the distribution density RDh' in the corresponding intermediate section 42-131 or 42-133 in the first intermediate row 42 is a third difference. A difference between the distribution density RDh' in each of the intermediate sections 42-131 and 42-133 and the distribution density RDi' in the middle section 42-129 in the first intermediate row 42 is a fourth difference. A difference between the distribution density RDd' in each of the end section 41-130 and 41-132 and the distribution density RDe' in the corresponding intermediate section 41-131 or 41-133 in the first end row 41 is a fifth difference. A difference between the distribution density RDe' in each of the intermediate section 41-131 and 41-133 and the distribution density RDi' in the middle section 41-129 in the first end row 41 is a sixth difference. A difference between the distribution density RDj in each of the end sections 44-130 and 44-132 and the distribution density RDk in the corresponding intermediate section 44-131 or 44-133 in the second intermediate row 44 is a seventh difference. A difference between the distribution density RDk in each of the intermediate sections 44-131 and 44-133 and the distribution density RDl in the middle section 44-129 in the second intermediate row 44 is an eighth difference. A difference between the distribution density RDm in each of the end sections 43-130 and 43-132 and the distribution density RDn in the corresponding intermediate section 43-131 or 43-133 in the second end row 43 is a ninth difference. A difference between the distribution density RDn in each of the intermediate sections 43-131 and 43-133 and the distribution density RDo in the middle section 43-129 in the second end row 43 is a tenth difference. Inequations (17) and (18) express relationships of differences in distribution density of the light reflection portions 123 among the sections of the opposite plate surface 119f of the light guide plate 119 below. A difference between the first difference and the second difference (the right side of inequation (18)) is larger than a difference between the third difference and the fourth difference (the left side of inequation (18)). Furthermore, a difference between the first difference and the second difference (the right side of inequation (17)) is larger than a difference between the fifth difference and the sixth difference (the left side of inequation (17)). Inequation (19) expresses relationships of differences in distribution density of the light reflection portions among the sections of the opposite plate surface 119f of the light guide plate 119 below. A difference between the ninth difference and the tenth difference (the right side of inequation (19)) is larger than a difference between the seventh difference and the eighth difference (the left side of inequation (19)). The difference between the third difference and the fourth difference is larger than the difference between the fifth difference and the sixth difference.

Furthermore, the distributions of the light reflection patterns LRP illustrated in FIGS. 13 and 14 satisfy equations (20) and (21). Equation (20) expresses relationships of differences in distribution density of the light reflection portions 123 among the sections of the opposite plate surface 119f of the light guide plate 119 below. The difference between the third difference and the fourth difference (the left side of equation (20)) is equal to the difference between the seventh difference and the eighth difference (the right side of equation (20)). Equation (21) expresses relationships of differences in distribution density of the light reflection portions 123 among the sections of the opposite plate surface 119f of the light guide plate 119 below. The difference between the ninth difference and the tenth difference (the right side of equation (21)) is equal to the difference between the first difference and the second difference (the left side of equation (21)).

$$((RDg'-RDh')-(RDh'-RDi'))=((RDj-RDk)-(RDk-RDl)) \quad (20)$$

$$((RDa'-RDb')-(RDb'-RDc'))=((RDm-RDn)-(RDn-RDo)) \quad (21)$$

According to the configurations, the following effects are achieved. The difference between the fifth difference and the sixth difference (the left side of inequation (17)) is smaller than the difference between the first difference and the second difference (the right side of inequation (17)). The difference between the third difference and the fourth difference (the left side of inequation (18)) is smaller than the difference between the first difference and the second difference (the right side of inequation (18)). According to the configurations, the rays of light are less likely to be directed from the middle column 129 to the end columns 130 and 132 via the intermediate columns 131 and 133, respectively. The difference between the seventh difference and the eighth difference (the left side of inequation (19)) is smaller than the difference between the ninth difference and the tenth difference (the right side of inequation (19)). According to the configuration, the rays of light are less likely to be directed from the middle column 129 to the end columns 130 and 132 via the intermediate columns 131 and 133, respectively. Therefore, in the end sections 41-130, 41-132, 42-130, 42-132, 44-130, and 44-132, the rays of light reflected by the light reflection portions 123 of the light reflection patterns LRP are less likely to exit from the third peripheral surface 119d or the fourth peripheral surface 119e. According to the configuration, the high light use efficiency is achieved. Furthermore, the difference between the difference between the first difference and the second difference (the right side of inequations (17) and (18)) and the difference between the ninth difference and the tenth difference (the right side of inequation (19)) are larger than the difference between the third difference and the fourth difference, the difference between the fifth difference and the sixth difference, and the difference between the seventh difference and the eighth difference. Therefore, in the middle row 124 and the second end row 43, the rays of light are more likely to be directed from the middle column 129 to the end columns 130 and 132 via the intermediate columns 131 and 133, respectively. In the sections 124-130, 124-132, 43-130, and 43-132, the rays of light reflected by the light reflection portions 123 of the light reflection patterns LRP efficiently exit from the light exit surface 119a. Therefore, differences in brightness among the first end row 41, the first intermediate row 42, and the second intermediate row 44 are compensated. According to the configuration, the evenness of the brightness distribution is improved.

In the second intermediate row 44, the rays of light are less likely to be directed from the middle section 44-129 to the end sections 44-130 and 44-132 via the intermediate sections 44-131 and 44-133, respectively. In the second end row 43, the rays of light are more likely to be directed from the middle section 43-129 to the end sections 43-130 and 43-132 via the intermediate sections 43-131 and 43-133, respectively. An amount of light directed from the middle section 43-129 to the end sections 43-130 and 43-132 via the intermediate sections 43-131 and 43-133, respectively, is about the same as that in the middle row 124. The first end section 43-130 includes a portion of the third peripheral surface 119d that extends along the first dimension and a portion of the opposite peripheral surface 40 that extends along the second dimension. The second end section 43-132 includes a portion of the fourth peripheral surface 119e that extends along the first dimension and a portion of the opposite peripheral surface 40. According to the configuration, the rays of light reflected by the light reflection portions 123 may leak to the outside. If the difference between the ninth difference and the tenth difference is defined larger than the difference between the first difference and the second difference and the difference between the seventh difference and the eighth difference, the light use efficiency may significantly decrease. The difference between the ninth difference and the tenth difference is set about equal to the difference between the first difference and the second difference. According to the configuration, the rays of light are less likely to leak from the sections 43-130 and 43-132, that is, the light use efficiency is less likely to decrease although the evenness of brightness distribution is maintained at a proper level. Furthermore, in the second intermediate row 44, the rays of light are less likely to be directed from the middle section 44-129 to the end sections 44-130 and 44-132 via the intermediate sections 44-131 and 44-133, respectively. According to the configuration, in the second end row 43, the sufficient amount of light is supplied to the end sections 43-130 and 43-132 in which the amount of light tends to be insufficient and thus the evenness of the brightness distribution is improved.

The brightness distributions in a total of nine sections, that is, the sections 124-130, 124-129, 124-132, 41-130, 41-129, 41-132, 43-130, 43-129, and 43-132 are equalized. According to the configuration, images are displayed on the display panel of the liquid crystal panel with very high quality using the light from the light guide plate 119. It has been known that equalization of the brightness distributions in the above nine sections improves the image display quality from experience in quality evaluation. Evaluation standards for objectively evaluating display quality of images such as the THX (registered trademark) standards include an evaluation for evenness of brightness distributions in the above nine sections as an evaluation item.

Figure 15:
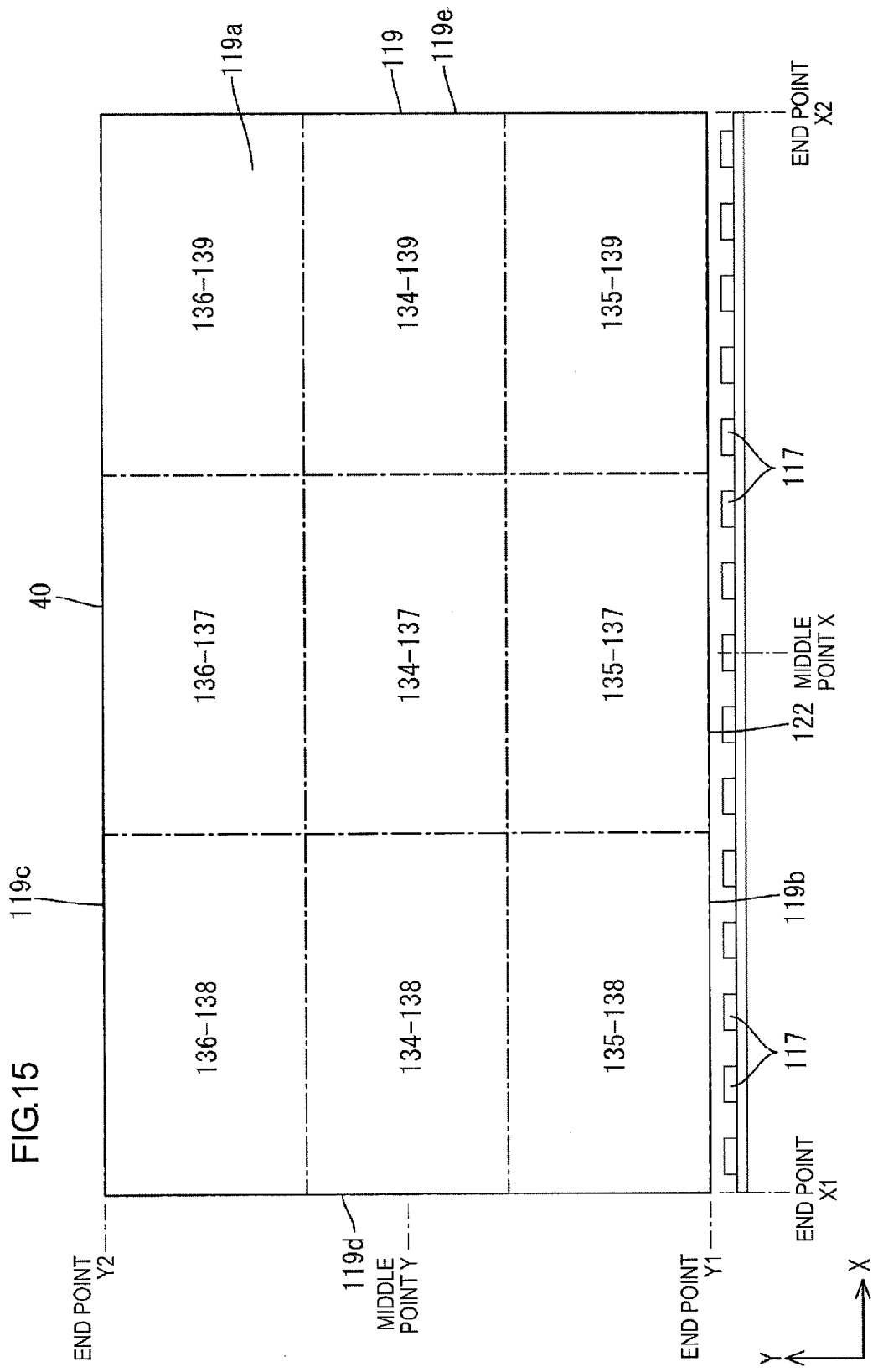
FIG. 15 is a plan view of the LED board and the light guide plate including the opposite plate surface that includes nine sections.

According to inequations (12) to (19) and equations (20) and (21), the light reflection patterns LRP in sections defined as illustrated in FIG. 15 have the following distributions. The opposite plate surface 119f of the light guide plate 119 may be divided into three rows and three columns. The three rows include a middle row 134, a first end row 135, and a second end row 136. The middle row 134 is located in the middle of the first dimension of the light guide plate 119. The first end row 135 is located at an end of the first dimension (on the lower side in FIG. 15) and close to the light entrance surface 122. The second end row 136 is located at the other end of the first dimension (on the upper side in FIG. 15) and close to the opposite peripheral surface 40. The three columns include a middle column 137, a first end column 138, and a second end column 139. The middle column 137 is located in the middle of the second dimension of the opposite plate surface 119f of the light guide plate 119. The first end column 138 is located at an end of the second dimension (on the left in FIG. 15). The second end column 139 is located at the other end of the second dimension (on the right in FIG. 15). Namely, the opposite plate surface 119f includes nine sections defined by the rows and the columns, that is, sections 134-137, 134-138, and 134-139 in the middle row 134, sections 135-137, 135-138, and 135-139 in the first end row 135, and sections 136-137, 136-138, and 136-139 in the second end row 136. The distribution density of the light reflection portions 123 of the light reflection patterns LRP is larger in the middle row 134 and the second end row 136 than in the first end row 135. The distribution density in the middle row 134 and the distribution density in the second end row 136 are equal. A difference between the distribution density in the middle section 134-137 and the distribution density in each of the end sections 134-138 and 134-139 in the middle row 134 and a difference between the distribution density in the middle section 136-137 and the distribution density in each of the end sections 136-138 and 136-139 in the second end row 136 are equal. The above differences are larger than the difference between the distribution density in the middle section 135-137 and the distribution density in each of the end sections 135-138 and 135-139 in the first end row 135. The distribution densities in the first end row 135, the middle row 134, and the second end row 136 are defined so as to increase in this sequence. According to the configuration, the amount of light is increased, that is, the evenness of the brightness distribution is improved. In the first end row 135, the rays of light are less likely to be directed from the middle section 135-137 to the end sections 135-138 and 135-139 in comparison to the middle column 137 and the second end row 136. The amount of light inside the light guide plate 119 is larger in the end sections 135-138 and 135-139 in the first end row 135 than in the middle row 134 and the second end row 136. As described above, the rays of light are less likely to be directed from the middle section 135-137 to the end sections 135-138 and 135-139. Therefore, the rays of light reflected by the light reflection portions 123 of the light reflection patterns LRP in the end sections 135-138 and 135-139 are less likely to exit from the third peripheral surface 119d or the fourth peripheral surface 119e that is not the light exit surface 119a of the light guide plate 119. According to the configuration, the high light use efficiency is achieved. In the middle row 134, the rays of light are more likely to be directed from the middle section 134-137 to the end sections 134-138 and 134-139, respectively, in comparison to the first end row 135. In the second end row 136, the rays of light are more likely to be directed from the middle section 136-137 to the end sections 136-138 and 136-139, respectively, in comparison to the first end row 135. Therefore, the sufficient amount of light is supplied to the end sections 134-138, 134-139, 136-138, and 136-139 in which the amount of light tends to be insufficient. According to the configuration, the evenness of the brightness distribution is improved.

In the second end row 136, an amount of light directed from the middle section 136-137 to the end sections 136-138 and 136-139 is about the same as that in the middle row 134. The end sections 136-138 and 136-189 in the second end row 136 include the portions of the opposite peripheral surface 40, the third peripheral surface 119d, and the fourth peripheral surface 119e. Therefore, the rays of light reflected by the light reflection portions 123 are more likely to leak to the outside. If the difference between the distribution density of the light reflection portions 123 in the middle section 136-137 and each of the end sections 136-138 and 136-139 in the second end row 136 is larger than the difference between the distribution density in the middle section 134-137 and each of the end sections 134-138 and 134-139 in the middle row 134, the light use efficiency may significantly decrease. According to the configuration described earlier, the difference between the distribution density in the middle section 136-137 and the distribution density in each of the end sections 136-138 and 136-139 in the second end row 136 is equal to the difference between the distribution density in the middle section 134-137 and the distribution density in the corresponding end section 134-138 or 134-139 in the middle row 134. Therefore, the rays of light are less likely to leak from the end sections 136-138 and 136-139 in the second end row 136. Namely, the evenness of brightness distribution is maintained at the proper level while the light use efficiency is maintained at the proper level.

As described above, a pair of the peripheral surfaces includes the light entrance surface 122 and the opposite peripheral surface 40. The rays of light from the LEDs 17 do not directly enter the opposite peripheral surface 40. The opposite plate surface 119f includes the middle row 134, the first end row 135, and the second end row 136. The middle row 134 is located in the middle of the first dimension of the opposite plate surface 119f. The first end row 135 is located at the end of the first dimension and close to the light entrance surface 122. The second end row 136 is located at the other end of the first dimension and close to the opposite peripheral surface 40. The distribution densities in the first end row 135, the middle row 134, and the second end row 136 are defined so as to increase in this sequence. The difference between the distribution density in the middle section 134-137 and the distribution density in each of the end sections 134-138 and 134-139 in the middle row 134 is larger than the difference between the distribution density in the middle section 135-137 and the distribution density in the corresponding end section 135-138 or 136-139 in the first end row 135. Furthermore, the difference between the distribution density in the middle section 134-137 and the distribution density in each of the end sections 134-138 and 134-139 in the middle row 134 is equal to the difference between the distribution density in the middle section 136-137 and the corresponding end section 136-138 or 136-139 in the second end row 136.

The distribution densities of the light reflection portions 123 of the light reflection patterns LRP in the first end row 135, the middle row 134, and the second end row 136 are defined so as to increase in this sequence. According to the configuration, the amounts of emitted light are equalized with respect to the first dimension, that is, the evenness of brightness distribution is improved. In the first end row 135, the rays of light are less likely to be directed from the middle section 135-137 to the end sections 135-138 and 135-139 in comparison to the middle row 134 and the second end row 136. The amounts of light inside the light guide plate 119 are larger in the end sections 135-138 and 135-139 in comparison to the middle row 134 and the second end row 136. Because the rays of light are less likely to be directed from the middle to the ends of the second dimension in the first end row 135, the rays of light reflected by the light reflection portions 123 are less likely to exit from the peripheral surface that is not the light exit surface 119a. According to the configuration, the light use efficiency is improved. In the middle row 134 and the second end row 136, the rays of light are more likely to be directed from the middle to the ends of the second dimension in comparison to the first end row 135. According to the configuration, the sufficient amount of light is supplied to the end sections 134-138, 134-139, 136-138, and 136-139 in which the amounts of light tend to be insufficient and thus the evenness of the brightness distribution is improved.

In the second end row 136, the amounts of light directed from the middle to the ends of the second dimension are about the same as those in the middle row 134. The portions of the light guide plate 119 including the end sections 136-138 and 136-139 in the second end row 136 include not only the portions of the peripheral surfaces along the first dimension but also the portions of the opposite peripheral surface 40. Therefore, the rays of light reflected by the light reflection portions 123 are more likely to leak to the outside. If the difference between the distribution density in the middle section 136-137 and the distribution density in each of the end sections 136-138 and 136-139 in the second end row 136 is larger than the difference in the middle row 134, the light use efficiency may significantly decrease. According to the configuration described above, the difference between the distribution density in the middle section 136-137 and the distribution density in each of the end sections 136-138 and 136-139 in the second end row 136 is equal to the difference in the middle row 134. Therefore, the rays of light are less likely to leak from the peripheral surfaces at the ends of the second dimension in the second end row 136. Namely, the evenness of brightness distribution is maintained at the proper level while the light use efficiency is maintained at the proper level.

The opposite plate surface 119*f* is divided into five rows including the middle row 124, the first end row 41, the first intermediate row 42, the second end row 43, and the second intermediate row 44. The middle row 124 is located in the middle of the first dimension of the opposite plate surface 119*f*. The first end row 41 is located at the end of the first dimension closer to the light entrance surface 122. The first intermediate row 42 is located between the middle row 124 and the first end row 41. The second end row 43 is located at the other end of the first dimension closer to the opposite peripheral surface 40. The second intermediate row 44 is located between the middle row 124 and the second end row 43. The opposite plate surface 119*f* is further divided into five columns including the middle column 129, the first end column 130, the first intermediate column 131, the second end column 132, and the second intermediate column 133. The middle column 129 is located in the middle of the second dimension of the opposite plate surface 119*f*. The first end column 130 is located at the end of the second dimension. The first intermediate column 131 is located between the middle column 129 and the first end column 130. The second end column 132 is located at the other end of the second dimension. The second intermediate column is located between the middle column 129 and the second end column 132. The difference between the distribution density in the middle section 124-129 and the distribution density in each of the end sections 124-130 and 124-132 in the middle row 124 is larger than the difference between the distribution density in the middle section 41-129 and the distribution density in the corresponding end section 41-130 or 41-132 in the first end row 41 and the difference between the distribution density in the middle section 42-129 and the distribution density in the corresponding end section 42-130 or 42-132 in the first intermediate row 42. The difference between the distribution density in the middle section 43-129 and the distribution density in each of the end sections 43-130 and 43-132 in the second end row 43 is larger than the distribution density in the middle section 44-129 and the distribution density in the corresponding end section 44-130 or 44-132 in the second intermediate row 44 and equal to the difference between the distribution density in the middle section 124-129 and the distribution density in the corresponding end section 124-130 or 124-132 in the middle row 124. According to the configuration, the rays of light are less likely to be directed from the middle to the ends of the second dimension in the first end row 41 and the first intermediate row 42 in comparison to the middle row 124 and the second end row 43. The amounts of light inside the light guide plate 119 are larger in the end sections 41-130 and 41-132 in the first end row 41 and in the end sections 42-130 and 42-132 in the first intermediate row 42 in comparison to the middle row 124 and the second end row 43. Because the rays of light are less likely to be directed from the middle to the ends of the second dimension in the first end row 41 and the first intermediate row 42, the rays of light reflected by the light reflection portions 123 in those sections are less likely to exit from the peripheral surfaces that are not the light exit surface 119*a* of the light guide plate 119. According to the configuration, the light use efficiency is improved. In the middle row 124 and the second end row 43, the rays of light are more likely to be directed from the middle to the ends of the second dimension in comparison to the first end row 41, the first intermediate row 42, and the second intermediate row 44. According to the configuration, the sufficient amount of light is supplied to the end sections 124-130, 124-132, 43-130, and 43-132 in which the amounts of light tend to be insufficient and thus the evenness of brightness distribution is improved.

In the second intermediate row 44, the rays of light are less likely to be directed from the middle to the ends of the second dimension in comparison to the middle row 124 and the second end row 43. In the second end row 43, the amounts of light directed from the middle to the ends of the second dimension are about the same as those in the middle row 124. The portions of the light guide plate 119 including the second end row 43 include not only the portions of the peripheral surfaces along the first dimension but also the portions of the opposite peripheral surface 40. Therefore, the rays of light reflected by the light reflection portions 123 are more likely to leak to the outside. If the difference between the distribution density of the light reflection portions 123 in the middle section 43-129 and the distribution density in each of the end sections 43-130 and 43-132 in the second end row 43 is larger than that in the middle row 124 or the second intermediate row 44, the light use efficiency may significantly decrease. According to the configuration in which the light reflection patterns LRP are formed such that the difference between the distribution density in each of the end sections 43-130 and 43-132 and the distribution density in the middle section 43-129 in the second end row 43 is about equal to the difference between the distribution density in each of the end sections 124-130 and 124-132 in the middle row 124, the rays of light are less likely to leak from the end sections 43-130 and 43-132 in the second end row 43. Namely, the evenness of brightness distribution is maintained at the proper level while the light use efficiency is maintained at the proper level. In the second intermediate row 44, the rays of light are less likely to be directed from the middle to the ends of the second dimension. According to the configuration, the sufficient amount of light is supplied to the end sections 43-130 and 43-132 in the second end row 43 in which the amounts of light tend to be insufficient and the evenness of the brightness distribution is improved.

The opposite plate surface 119*f* is divided into five columns including the middle column 129, the first end column 130, the first intermediate column 131, the second end column 132, and the second intermediate column 133. The middle column 129 is located in the middle of the second dimension of the opposite plate surface 119*f*. The first end column 130 is located at one of the ends of the second dimension. The first intermediate column 131 is located between the middle column 129 and the first end column 130. The second end column 132 is located at the other end of the second dimension. The second intermediate column 133 is located between the middle column 129 and the second end column 132. The sections of the opposite plate surface 119f are defined by the rows 124 and 41 to 44 and the columns 129 and 130 to 133. The difference between the distribution density in each of the end sections 124-130 and 124-132 and the distribution density in the corresponding intermediate section 124-131 or 124-133 in the middle row 124 is referred to as the first difference. The difference between the distribution density in each of the intermediate sections 124-131 and 124-133 and the distribution density in the middle section 124-129 is referred to as the second difference. The difference between the distribution density in each of the end sections 42-130 and 42-132 and the distribution density in the corresponding intermediate section 42-131 or 42-133 is referred to as the third difference. The difference between the distribution density in each of the intermediate sections 42-131 and 42-133 and the distribution density in the middle section 42-129 is referred to as the fourth difference. The difference between the distribution density in each of the end sections 41-130 and 41-132 and the distribution density in the corresponding intermediate section 41-131 or 41-133 is referred to as the fifth difference. The difference between the distribution density in each of the intermediate sections 41-131 and 411-133 and the distribution density in the middle section 41-129 is referred to as the sixth difference. The difference between the distribution density in each of the end sections 43-130 and 43-132 and the distribution density in the corresponding intermediate section 43-131 or 43-133 is referred to as the ninth difference. The difference between the distribution density in each of the intermediate sections 43-131 and 43-133 and the distribution density in the middle section 43-129 is referred to as the tenth difference. The difference between the distribution density in each of the end sections 44-130 and 44-132 and the distribution density in the corresponding intermediate section 44-131 or 44-133 is referred to as the seventh difference. The difference between the distribution density in each of the intermediate sections 44-131 and 44-133 and the distribution density in the middle section 44-129 is referred to as the eighth difference. The difference between the first difference and the second difference is larger than the difference between the third difference and the fourth difference and the difference between the fifth difference and the sixth difference. The difference between the ninth difference and the tenth difference is larger than the difference between the seventh difference and the eighth difference. The difference between the ninth difference and the tenth difference is equal to the difference between the first difference and the second difference. In the first end row 41 and the first intermediate row 42, the difference between the first end column 130 (or the second end column 132) and the first intermediate column 131 (or the second intermediate column 133) and the difference between the first intermediate column 131 (or the second intermediate column 133) and the middle column 129 are smaller than those in the middle row 124 and the second end row 43. Therefore, the rays of light are less likely to be directed from the middle column 129 to the first end column 130 (or the second end column 132) via the first intermediate column 131 (or the second intermediate column 133) in the first end row 41 and the first intermediate row 42. In the portions of the light guide plate 119 including the end sections 41-130 and 42-130 (or 41-132 and 42-132), the rays of light reflected by the light reflection portions 123 of the light reflection patterns LRP are less likely to exit from the peripheral surface that is not the light exit surface 119a of the light guide plate 119. According to the configuration, the light use efficiency id improved. In the middle row 124 and the second end row 43, the difference between the distribution density in the first end column 130 (or the second end column 132) and the distribution density in the first intermediate column 131 (or the second intermediate column 133) and the difference between the distribution density in the first intermediate column 131 (or the second intermediate column 133) and the distribution density in the middle column 129 are larger than those in the first end row 41, the first intermediate row 42, and the second intermediate row 44. Therefore, in the middle row 124 and the second end row 43, the rays of light are more likely to be directed from the middle column 129 to the first end column 130 (or the second end column 132) via the first intermediate column 131 (or the second intermediate column 133). In the end sections 124-130 and 43-130 (or 43-132), the rays of light reflected by the light reflection portions 123 of the light reflection patterns LRP efficiently exit from the light exit surface 119a. According to the configuration, the differences in brightness amount the first end row 41, the first intermediate row 42, and the second intermediate row 44 are compensated and thus the evenness of the brightness distribution is improved.

In the second intermediate row 44, the rays of light are less likely to be directed from the middle column 129 to the first end column 130 (or the second end column 132) via the first intermediate column 131 (or the second intermediate column 133) in comparison to the middle row 124 and the second end row 43. The amount of light directed from the middle section 43-129 to the first end section 43-130 (or the second end section 43-132) via the first intermediate section 43-131 (or the second intermediate column 133) in the second end row 43 is about the same as that in the middle row 124. The portion of the light guide plate 119 including the first end section 43-130 (or the second end section 43-132) includes not only the portion of the peripheral surface along the first dimension but also the portion of the opposite peripheral surface 40. Therefore, the rays of light reflected by the light reflection portions 123 are more likely to leak to the outside. If the difference between the ninth difference and the tenth difference is larger than the difference between the first difference and the second difference or the difference between the seventh difference and the eighth difference, the light use efficiency may significantly decrease. According to the configuration in which the light reflection patterns LRP are formed such that the difference between the ninth difference and the tenth difference are about equal to the difference between the first difference and the second difference, the rays of light are less likely to leak from the portions of the light guide plate 119 including the end sections 43-130 and 43-132. Namely, the evenness of brightness distribution is maintained at the proper level while the light use efficiency is maintained at the proper level. Because the rays of light are less likely to be directed from the middle section 44-129 to the first end section 44-130 (or the second end section 44-132) via the first intermediate section 44-131 (or the second intermediate section 44-133) in the second intermediate row 44, the sufficient amount of light is supplied to the first end section 43-130 (or the second end section 43-132) in the second end row 43 in which the amount of light tends to be insufficient. According to the configuration, the evenness of brightness distribution is improved. The brightness distributions are equalized in the total of nine sections including the first end section 124-130, the middle section 124-129, and the second end section 124-132 in the middle row 124, the first end section 41-130, the middle section 41-129, and the second end section 41-132 in the first end row 41, and the first end section 43-130, the middle section 43-129, and the second end section 43-132 in the second end row 43. Therefore, when the light guide plate 119 is included in the backlight unit 112 for a liquid crystal display device, very high display quality is achieved.

Third Embodiment

A third embodiment of this invention will be described with reference to FIGS. 16 to 18. The third embodiment includes a light guide plate 219 with light entrance surfaces 222 on short sides. Structures, functions, and effects similar to those of the second embodiment will not be described.

Figure 16:
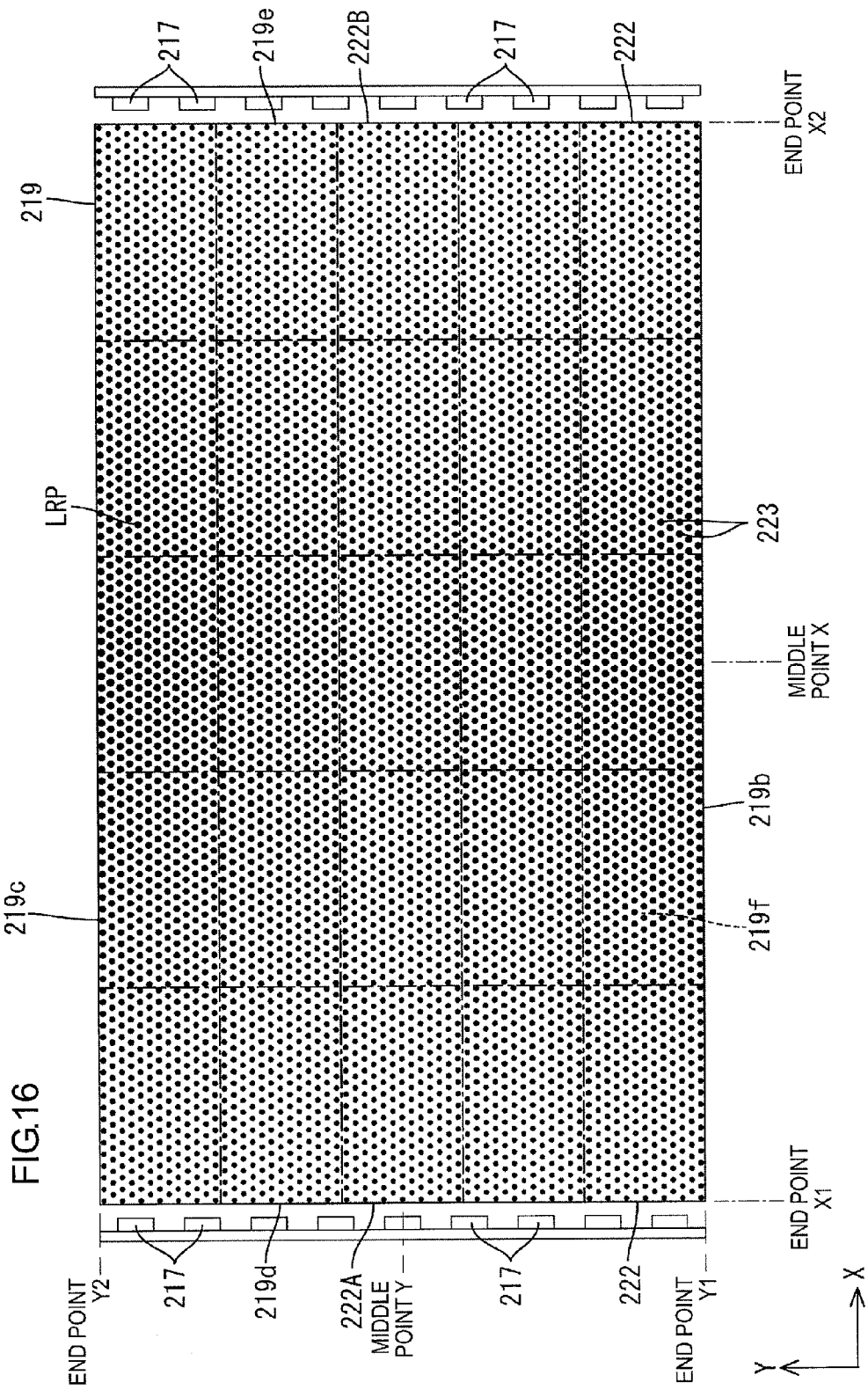
FIG. 16 is a plan view of an LED board and a light guide plate in a backlight unit in a liquid crystal display device according to a third embodiment.

As illustrated in FIG. 16, the light guide plate 219 includes a third peripheral surface 219d and a fourth peripheral surface 129e that are short peripheral surfaces opposite to each other and configured as the light entrance surfaces 222 through which rays of light from LEDs 217 enter. Long peripheral surfaces of the light guide plate 219 opposite to each other are a first peripheral surface 219b and a second peripheral surface 129c that are configured as non-LED-opposed surfaces through which the rays of light from the LEDs 217 do not directly enter. In this embodiment, a dimension of the light guide plate 219 along the first peripheral surface 219b and the second peripheral surface 219c that do not include the light entrance surfaces 222, that is, the X-axis direction is defined as a first dimension and a dimension along the third peripheral surface 219d and the fourth peripheral surface 219e that include the light entrance surfaces 222, that is, the Y-axis direction is defined as a second dimension. In the following description, one of the light entrance surfaces 222 on the left in FIG. 16 may be referred to as a first light entrance surface 222A and the other one of the light entrance surfaces 222 on the right in FIG. 16 may be referred to as a second light entrance surface 222B. In descriptions of configurations shared by the first light entrance surface 222A and the light entrance surface 222B, numeral 222 without A and B will be used.

Figure 17:
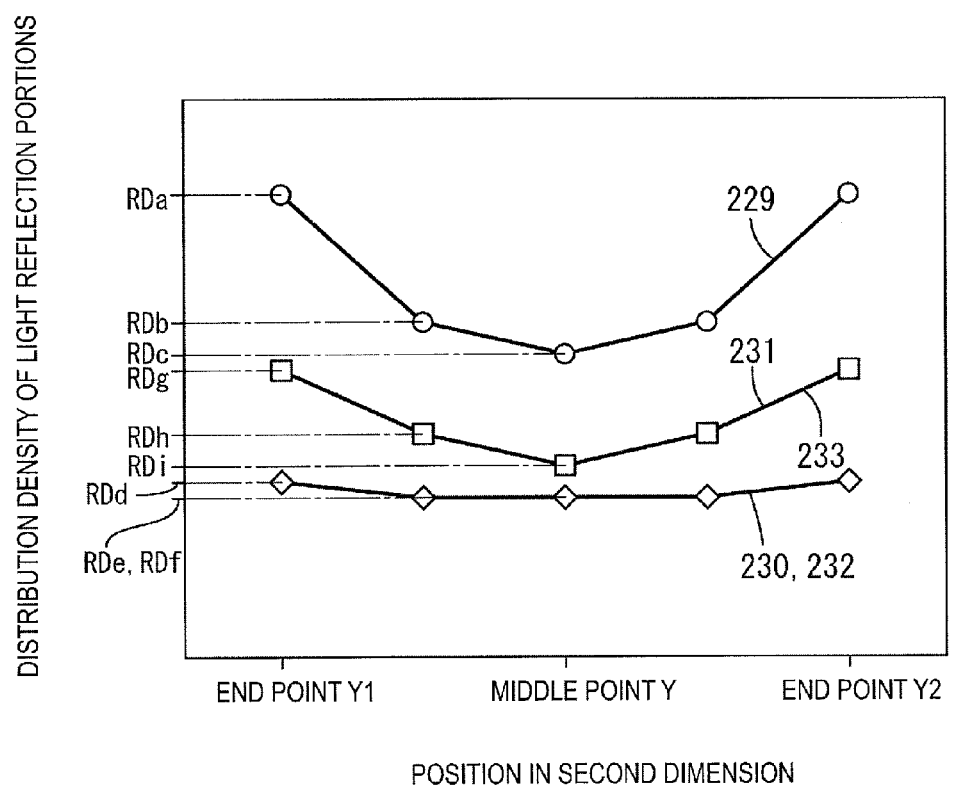
FIG. 17 is a graph illustrating variations in distribution density of the light reflection portions between end point Y1 and end point Y2 on the opposite plate surface of the light guide plate.
Figure 18:
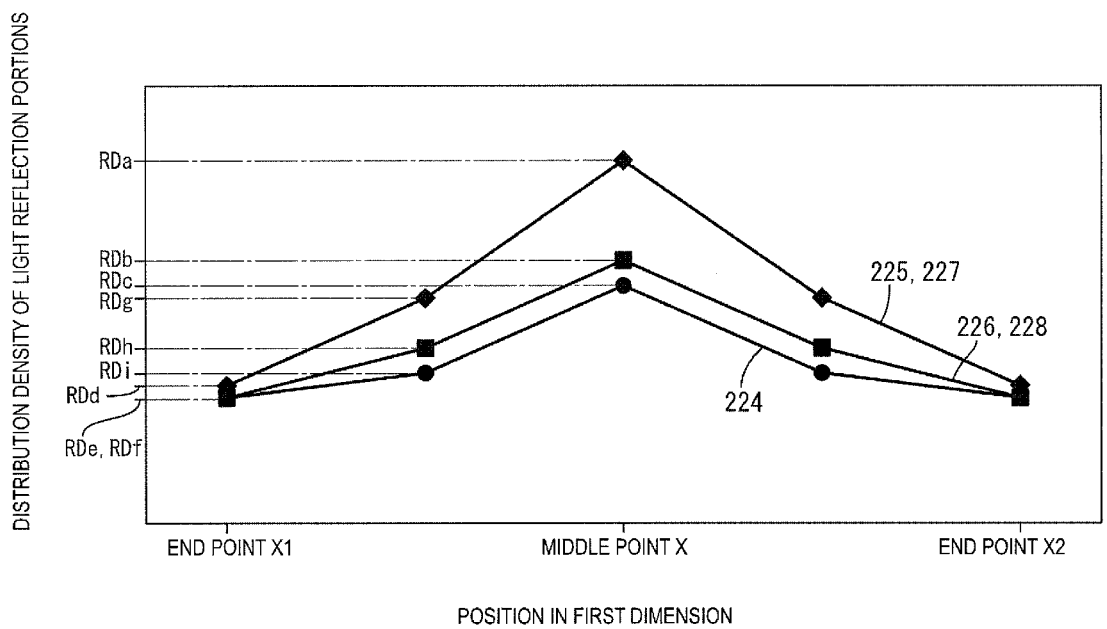
FIG. 18 is a graph illustrating variations in distribution density of the light reflection portions between end point X1 and end point X2 on the opposite plate surface of the light guide plate.

Distributions of light reflection portions 223 of the light reflection patterns LRP on an opposite plate surface 219f of the light guide plate 219 are illustrated in FIGS. 17 and 18. The distributions of the light reflection portions 223 are similar to those in the first embodiment. Distribution densities RDa to RDi in the respective sections 224 to 233 of the opposite plate surface 219f are similar (or have similar characteristics) to those of the first embodiment (FIGS. 8 and 9) except for the X axis and the Y axis that are the other way around. Configurations and functions of this embodiment similar to the first embodiment will not be described.

Fourth Embodiment

A fourth embodiment of this invention will be described with reference to FIGS. 19 to 21. The fourth embodiment includes a light guide plate 319 with a light entrance surface 322. The light guide plate 319 has a similar configuration as the light guide plate 119 in the second embodiment except for the light entrance surface 322 that is at a short side of the light guide plate 319. Structures, functions, and effects similar to those of the second embodiment will not be described.

Figure 19:
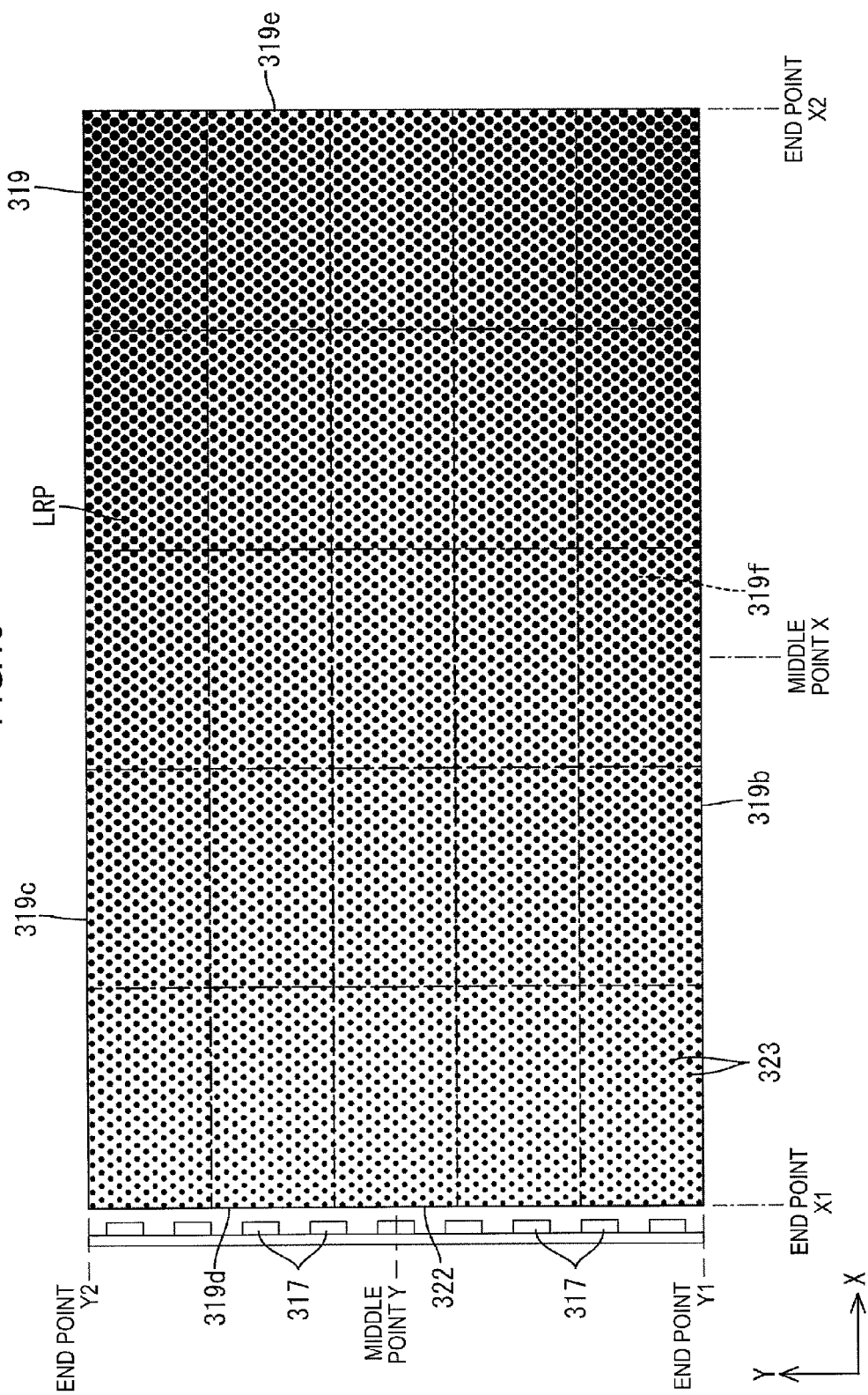
FIG. 19 is a plan view of an LED board and a light guide plate in a backlight unit in a liquid crystal display device according to a fourth embodiment.

As illustrated in FIG. 19, the light guide plate 319 includes a first peripheral surface 319b, a second peripheral surface 319c, a third peripheral surface 319d, and a fourth peripheral surface 319e. The third peripheral surface 319d and the fourth peripheral surface 319e are short peripheral surfaces opposite to each other. The third peripheral surface 319d is configured as the light entrance surface 322 through which rays of light from LEDs 317 enter. The rest of the peripheral surfaces, that is, the first peripheral surface 319b, the second peripheral surface 319c, and the fourth peripheral surface 319e are non-LED-opposed surfaces through which the rays of light from the LEDs 317 do not directly enter. The fourth peripheral surface 319e opposite from the light entrance surface 322 is defined as an opposite peripheral surface 340. In this embodiment, a dimension along the first peripheral surface 319b and the second peripheral surface 319c that do not include the light entrance surface 322, that is, the X-axis direction is referred to as a first dimension and a dimension along the third peripheral surface 319d and the fourth peripheral surface 319e, that is, the Y-axis direction is referred to as a second dimension.

Figure 20:
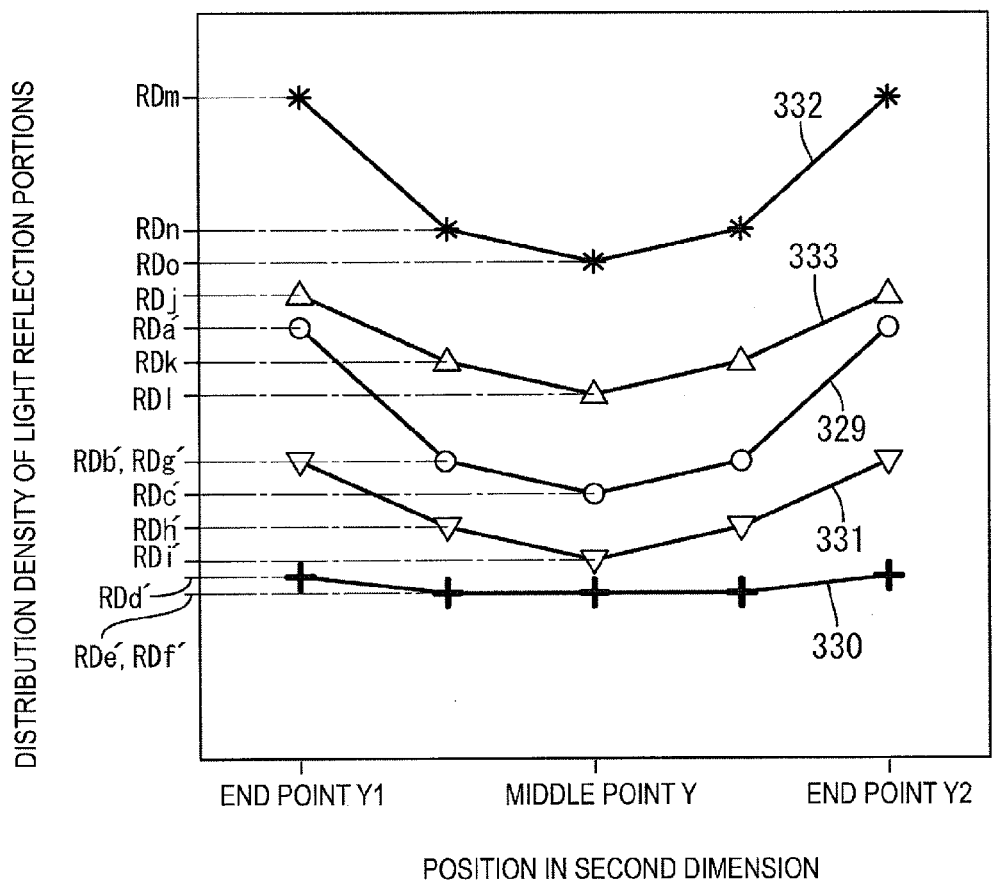
FIG. 20 is a graph illustrating variations in distribution density of the light reflection portions between end point Y1 and end point Y2 on the opposite plate surface of the light guide plate.
Figure 21:
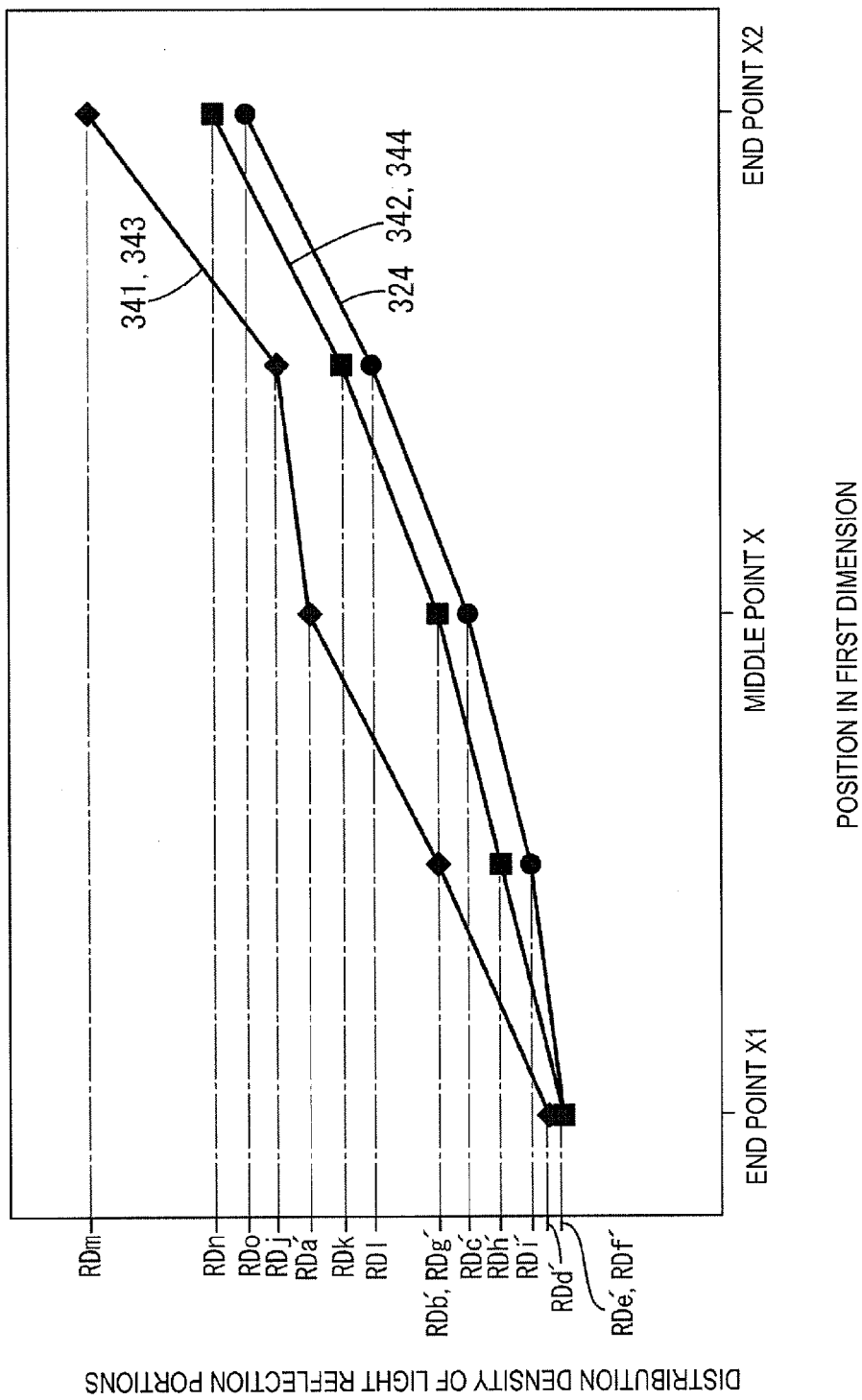
FIG. 21 is a graph illustrating variations in distribution density of the light reflection portions between end point X1 and end point X2 on the opposite plate surface of the light guide plate.

Distributions of light reflection portions 323 of the light reflection patterns LRP on an opposite plate surface 319f of the light guide plate 319 are illustrated in FIGS. 20 and 21. The distributions of the light reflection portions 323 are similar to those in the second embodiment. Distribution densities RDa' to RDi' and RDj to RDo in the respective sections 324, 329 to 333, and 314 to 344 of the opposite plate surface 319f are similar (or have similar characteristics) to those of the second embodiment (FIGS. 13 and 14) except for the X axis and the Y axis that are the other way around. Configurations and functions of this embodiment similar to the first embodiment will not be described.

Fifth Embodiment

A fifth embodiment of this invention will be described with reference to FIGS. 22 and 23. The fifth embodiment includes light reflection patterns LRP including light reflection portions 423 that are different from those in the above embodiments. Structures, functions, and effects similar to as those of the first embodiment will not be described.

Figure 22:
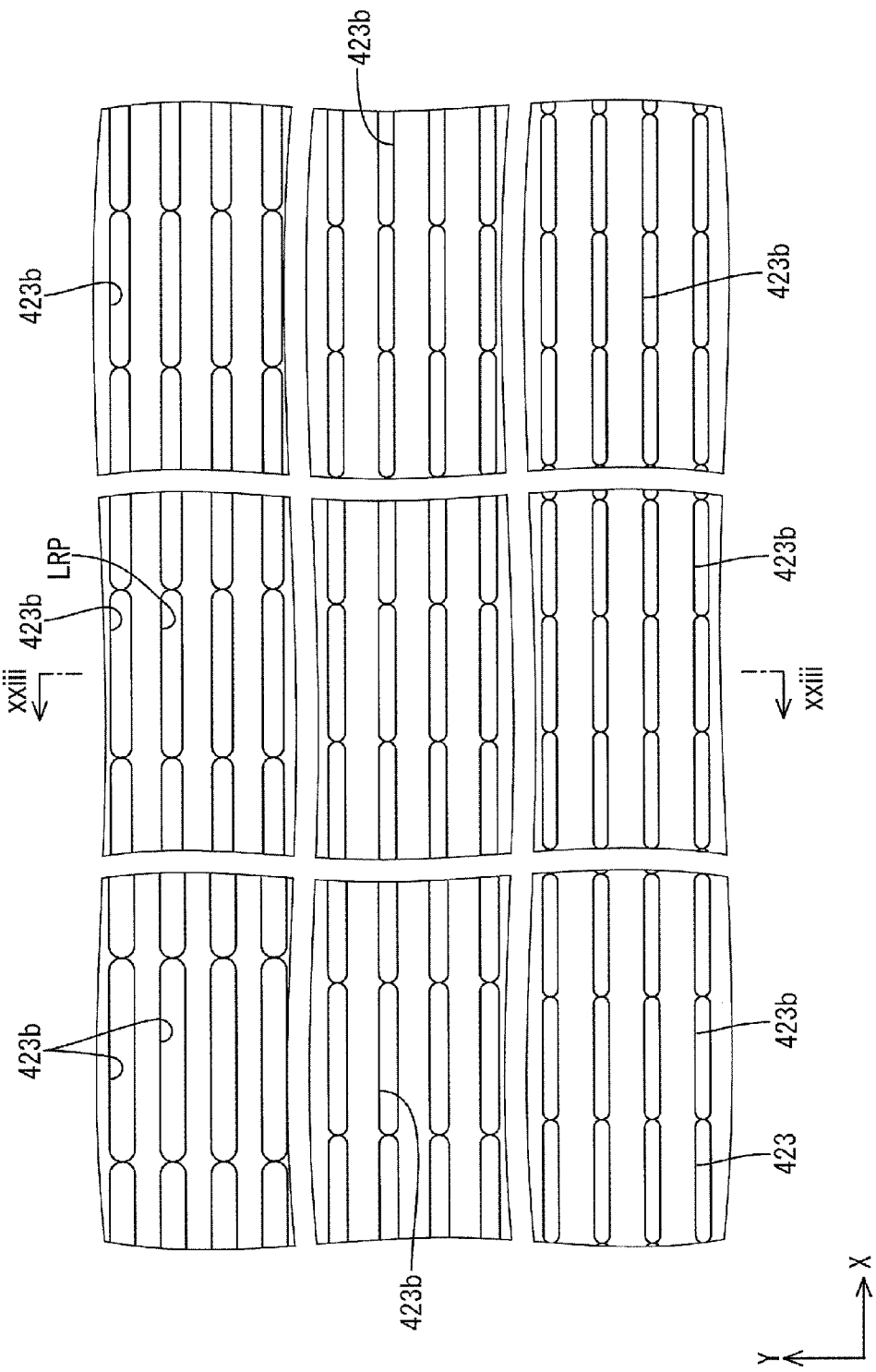
FIG. 22 is a plan view of the opposite plate surface illustrating reflection grooves of the light reflection portions of the light reflection patterns in the sections of the opposite plate surface according to the fifth embodiment.
Figure 23:
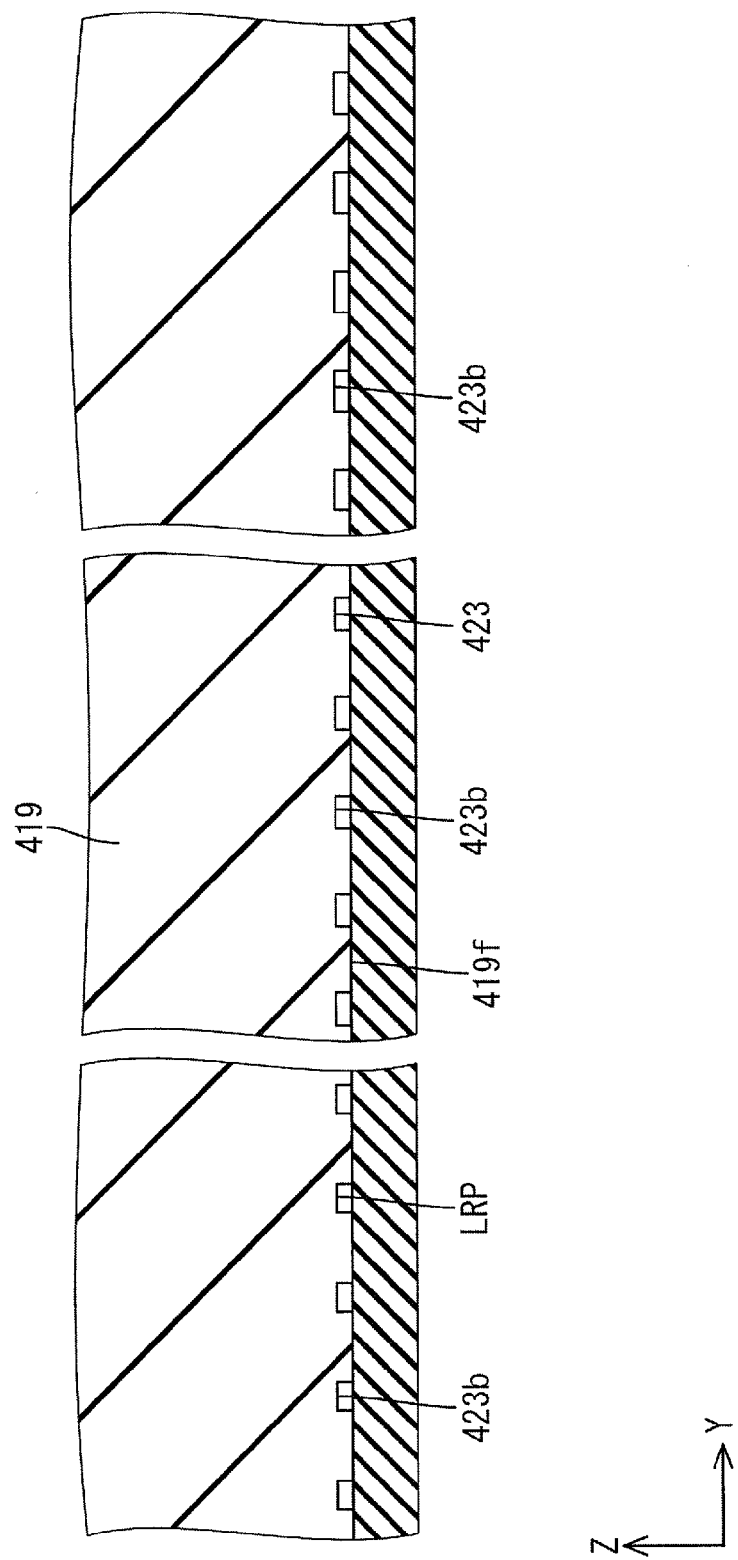
FIG. 23 is a cross-sectional view taken along line xxiii-xxiii in FIG. 22.

As illustrated in FIGS. 22 and 23, the light reflection portions 423 of the light reflection patterns LRP include a number of reflection grooves 423b. The reflection grooves 423b are formed in an opposite plate surface 419f by applying a laser beam to the opposite plate surface 419f of a light guide plate 419. Each reflection groove 423b is a groove that extends along the first dimension. A number of the reflection grooves 423b are arranged along the first dimension so as to be connected to one another at ends thereof. When the reflection grooves 423b are formed with a laser beam applied by a laser machine (not illustrated) placed opposite the opposite plate surface 419f, the laser machine is moved along the first dimension of the opposite plate surface 419f while the laser beams are continuously applied to the opposite plate surface 419f. As a result, the reflection grooves 423b are connected to each other at the ends thereof. A width and a length of each reflection groove 423b can be set as appropriate by adjusting an output and a duration of time that the laser beam is applied. Although the width and the length of the reflection grooves 423b may be different from area to area of the opposite plate surface 419f, depths and intervals are constant. An amount of light scattered by each reflection groove 423b increases as an area (i.e., the width and the length) of the reflection groove 423b increases. Namely, an amount of light exiting from the light exit surface increases as the area of the reflection groove 423b increases. The amount of light scattered by each reflection groove 423b decreases as the area of the reflection groove 423b decreases and the amount of light exiting from the light exit surface decreases. Namely, an amount of light exiting from the light exit surface decreases as the area of the reflection groove 423*b* decreases.

Sixth Embodiment

A sixth embodiment of this invention will be described with reference to FIGS. 24 and 25. The sixth embodiment includes light reflection patterns LRP including light reflection portions 523 that are different from those in the above embodiments. Structures, functions, and effects similar to those of the first embodiment will not be described.

Figure 24:
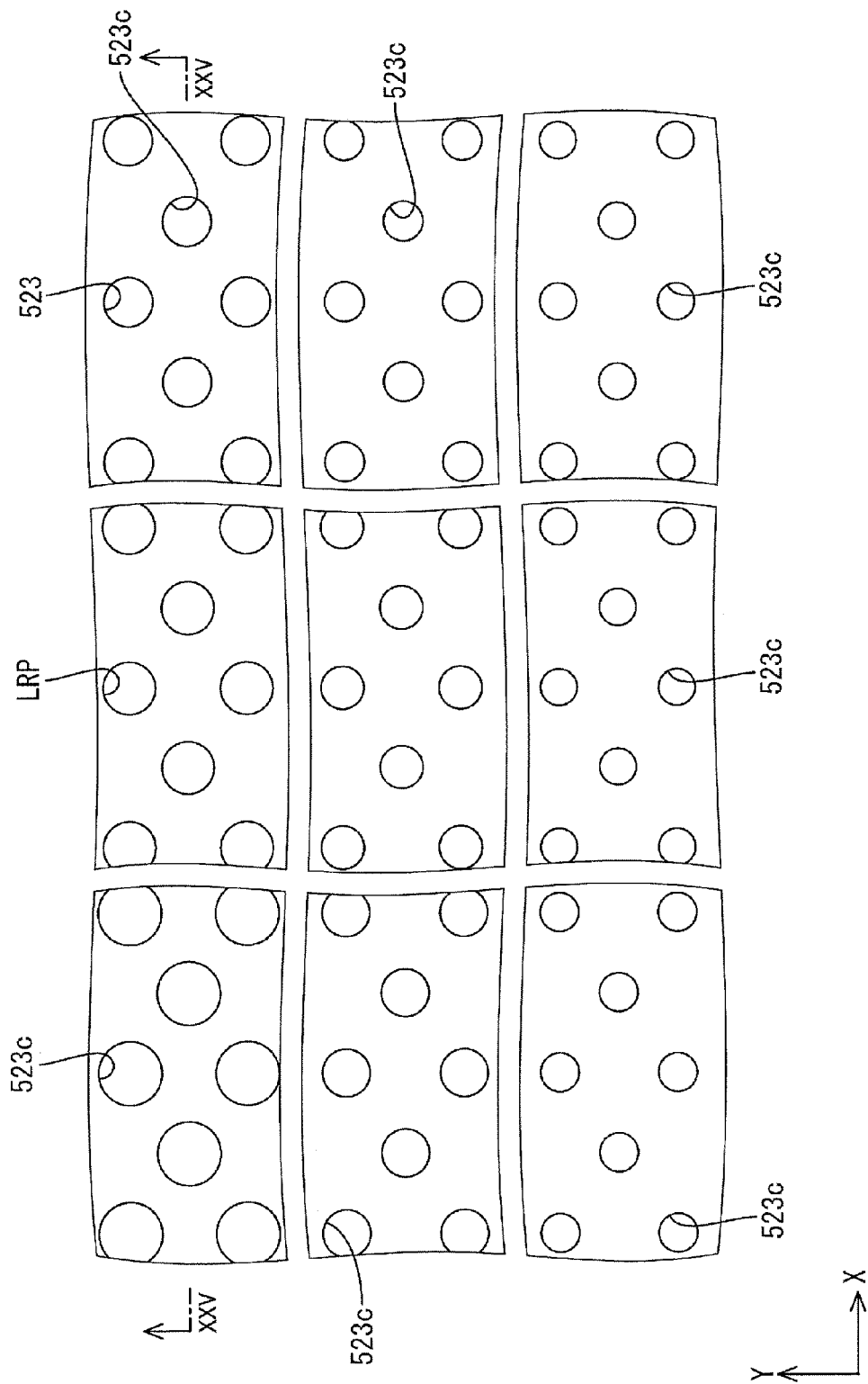
FIG. 24 is a plan view of an opposite plate surface illustrating reflection recesses of light reflection portions of light reflection patterns in sections of the opposite plate surface according to a sixth embodiment.
Figure 25:
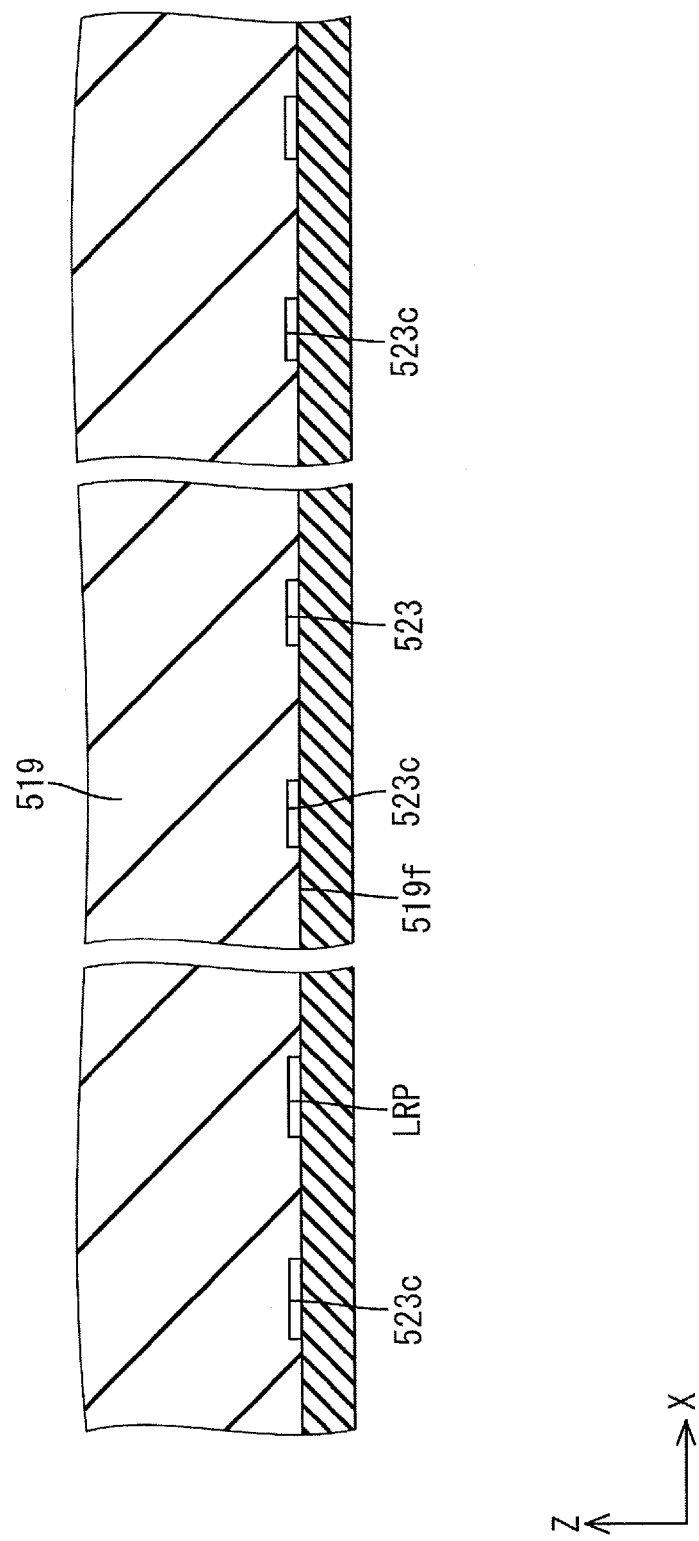
FIG. 25 is a cross-sectional view taken along line xxv-xxv in FIG. 24.

As illustrated in FIGS. 24 and 25, the light reflection portions 523 of the light reflection patterns LRP include reflection recesses 523*c*. The reflection recesses 523*c* are formed in an opposite surface 519*f* of a light guide plate 519 by recessing portions of the opposite plate surface 519*f* such that features on a face of a die are transferred to the opposite plate surface 519*f*. Each reflection recess 523*c* has a round shape in a plan view. The reflection recesses 523*c* are arranged in zigzag patterns (staggered arrangement) within the opposite plate surface 519*f*. Although diameters (areas) of the reflection recesses 523*c* may be different depending on X and Y positions thereof within the opposite plate surface 519*f*, intervals are substantially constant. The shapes and the arrangement of the reflection recesses 523*c* in a plan view are similar to those of the dots 23*a* in the first embodiment. To form the reflection recesses 523*c*, the die including protrusions having reversed shapes of the reflection recesses 523*c* on the face thereof (not illustrated) is prepared. The die is pressed against the opposite plate surface 519*f* that is a flat surface at this time while a pressure is applied to the light guide plate 519 under high temperature (e.g., melting-point temperature of the material of the light guide plate 519). The features on the face of the die formed by the protrusions are transferred to the opposite plate surface 519*f* of the light guide plate 519 and the reflection recesses 523*c* are formed. Although diameters of the reflection recesses 523*c* may be different depending of their positions within the opposite plate surface 519*f*, depths and intervals are constant. An amount of light scattered by each reflection recess 523*c* increases as an area (i.e., the diameter and the depth) of the reflection recess 523*c* increases. Namely, an amount of light exiting from the light exit surface increases as the area of the reflection recess 523*c* increases. The amount of light scattered by each reflection recess 523*c* decreases as the area of the reflection recess 523*c* decreases. Namely, the amount of light exiting from the light exit surface decreases as the area of the reflection recess 523*c* decreases.

Seventh Embodiment

A seventh embodiment of the technology will be described with reference to FIG. 26. The seventh embodiment includes reflection recesses 623*c* that have shapes different from the reflection recesses 523*c* in the sixth embodiment. Structures, functions, and effects similar to those in the sixth embodiment will not be described.

Figure 26:
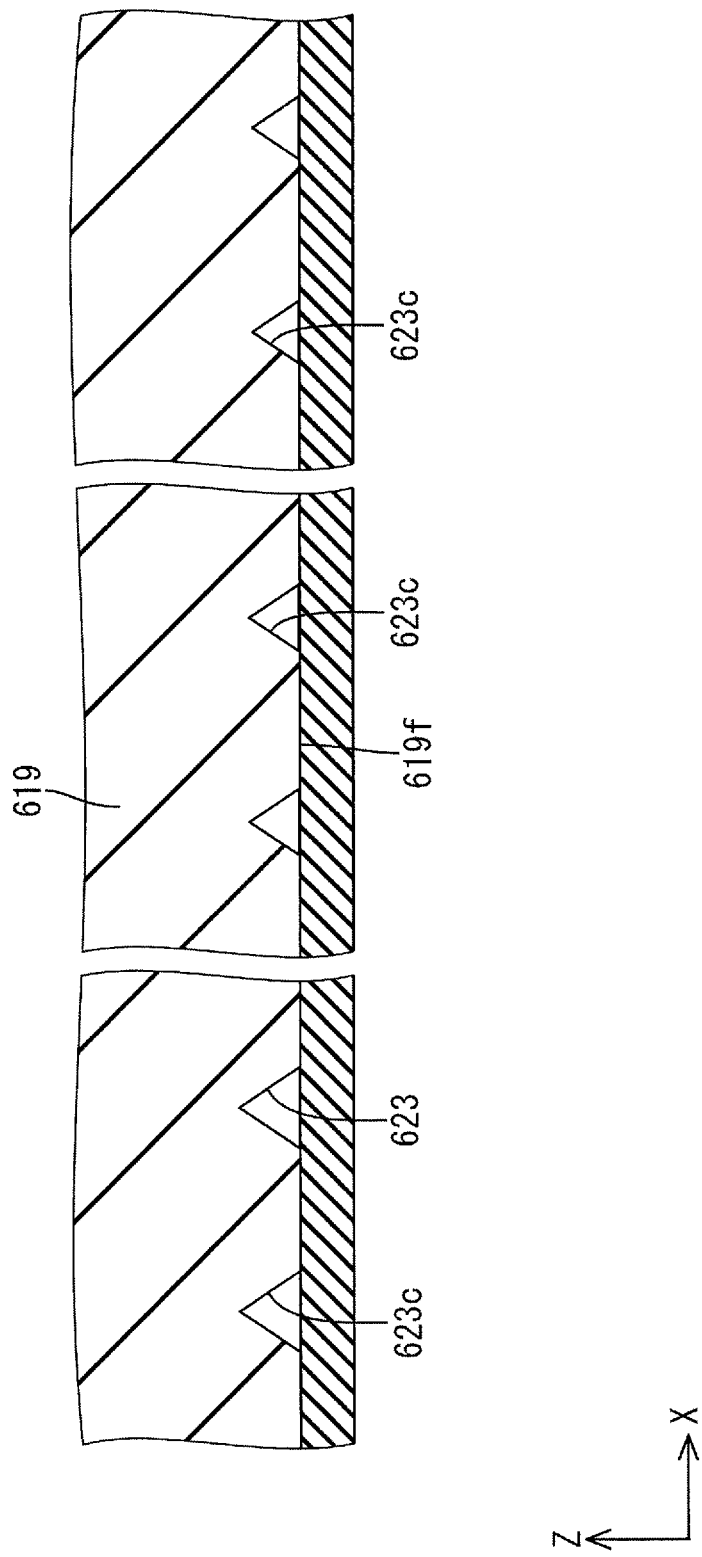
FIG. 26 is a cross-sectional view illustrating reflection recesses of light reflection portions according to a seventh embodiment.

As illustrated in FIG. 26, each reflection recess 623*c* of light reflection portions 623 has a conical overall shape and an isosceles triangle cross-sectional shape. Shapes and arrangement of the reflection recesses 623*c* in a plan view are similar to those in the sixth embodiment. Although diameters and depths of the reflection recesses 623*c* may be different depending on positions thereof within the opposite plate surface 619*f*, intervals are constant. An amount of light scattered by each reflection recess 623*c* increases as an area (i.e., the diameter and the depth) of the reflection recess 623*c* increases. Namely, an amount of light exiting from the light exit surface increases as the area of the reflection recess 623*c* increases. The amount of light scattered by each reflection recess 623*c* decreases as the area of the reflection recess 623*c* decreases. Namely, the amount of light exiting from the light exit surface decreases as the area of the reflection recess 623*c* decreases.

Eighth Embodiment

An eighth embodiment of this invention will be described with reference to FIGS. 27 to 29. The eighth embodiment includes a pair of LED boards 718 and LEDs 717 that are arranged differently from those in the first embodiment. Structures, functions, and effects similar to those of the first embodiment will not be described.

Figure 27:
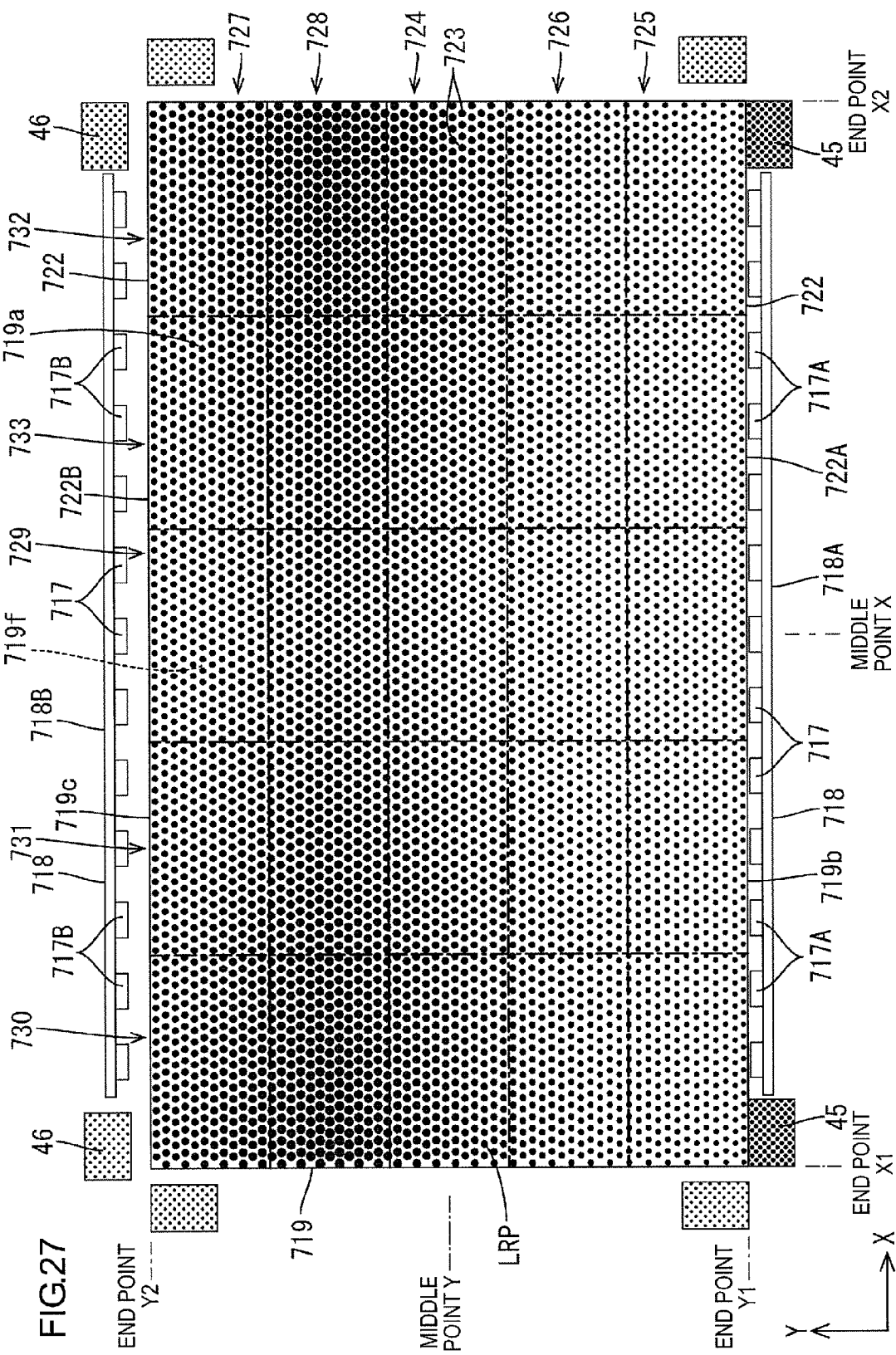
FIG. 27 is a plan view of an LED board and a light guide plate in a backlight unit in a liquid crystal display device according to an eighth embodiment.

As illustrated in FIG. 27, the LED boards 718 and the LEDs 717 mounted on the LED boards 718 are arranged such that a distance between one of the LED boards 718 and a light entrance surface 722 of a light guide plate 719 is different from a distance between the other Led board 718 and another light entrance surface 722 of the light guide plate 719. In the following description, the LED board 718 and the LEDs 717 on the lower side in FIG. 27 may be referred to as a first LED board (a first light source board) 718A and first LEDs (first light sources) 717A, respectively. The LED board 718 and the LEDs 717 on the upper side in FIG. 27 may be referred to as a second LED board (a second light source board) 718B and second LEDs (second light sources) 717B, respectively. In descriptions of configurations shared by the first LED board 718A and the second LED board 718B and configurations shared by the first LEDs 717A and the second LEDs 717B, numeral 718 and numeral 717 without A and B will be used.

As illustrated in FIG. 27, the first LED board 718A and the first LEDs 717A are disposed adjacent to the first light entrance surface 722A while the second LED board 718B and the second LEDs 717B are disposed with a relatively large gap between the second LEDs 717B and the second light entrance surface 722B. First light entrance efficiency of light emitted by the first LEDs 717A and entering the light guide plate 719 through the first light entrance surface 722A is higher than second light entrance efficiency of light emitted by the second LEDs 717B and entering the light guide plate 719 through the second light entrance surface 722*b*. The second light entrance efficiency is lower than the first light entrance efficiency. According to research conducted by the Applicant, a decrease in light entrance efficiency due to an increase in distance from the LEDs 717 slows down at a certain distance and the light entrance efficiency becomes steady. Although the second light entrance efficiency is lower than the first light entrance efficiency, the second light entrance efficiency does not decrease further than a predetermined value because the decrease due to the distance from the LEDs 717B slows down at the certain distance. If the distance between the first LEDs 717A and the first light entrance surface 722A is equal to the distance between the second LEDs 717E and the second light entrance surface 722A and the light entrance efficiency at that time is defined as a reference, a difference between the first light entrance efficiency and the reference is larger than a difference between the second light entrance efficiency and the reference. According to the configuration of this embodiment, overall light use efficiency is improved in comparison to the configuration in which the distances between the LEDs 717 and the respective light entrance surfaces 722 are equal.

The backlight unit further includes first holding members 45 and second holding members 46. The first holding members 45 are disposed on the same side as the first LEDs 717A relative to the light guide plate 719. The first holding members 45 are in contact with the first light entrance surface 722A and hold the light guide plate 719 from the first LED 717A side. The second holding members 46 are disposed on the same side as the second LEDs 717B relative to the light guide plate 719 with a gap between the second holding members 46 and the light guide plate 719. If the light guide plate 719 is thermally expanded, a second peripheral surface 719c of the light guide plate 719 including the second light entrance surface 722B is in contact with the second holding members 46 and the light guide plate 719 is held by the second holding members 46 from the second LED 717B side. The second holding members 46 are made of elastic material that is softer than a material of the first holding members 45. According to the configuration, the light guide plate 719 is held by the first holding members 45 made of the material harder than the material of the second holding member 46 from the first LED 717A side. The light guide plate 719 is stably held and thus a positional relationships between the first LEDs 717A and the first light entrance surface 722A is stably maintained. Therefore, the distance between the first LEDs 717A and the first light entrance surface 722A is set as short as possible, that is, the first light entrance efficiency is improved to a very high level. If the light guide plate 719 is thermally expanded, the second peripheral surface 719c is in contact with the second holding members 46. Namely, the light guide plate 719 is held by the second holding members 46 from the second LED 717B side. Because the second holding members 46 are made of the elastic material softer than the material of the first holding members 45, the gap between the second peripheral surface 719c and the second holding members 46 can be set smaller in comparison to a configuration in which the materials of the first holding members 45 and the second holding members 46 have the same hardness. In the configuration in which the materials of the first holding members 45 and the second holding members 46 have the same hardness, the gap between second holding members 46 and the second peripheral surface 719c requires a margin for a dimensional error of the light guide plate 719. With the second holding members 46 that is made of the elastic material softer than the material of the first holding members 45, the second holding members 46 elastically deform when the second peripheral surface 719c contact the second holding members 46. According to the configuration, even if the light guide plate 719 is larger than a predefined size, the error is accommodated by the second holding members 46. Therefore, the second holding member 46 can be disposed further closer to the light guide plate 719 and thus the thermally expanded light guide plate 719 is stably held.

Figure 28:
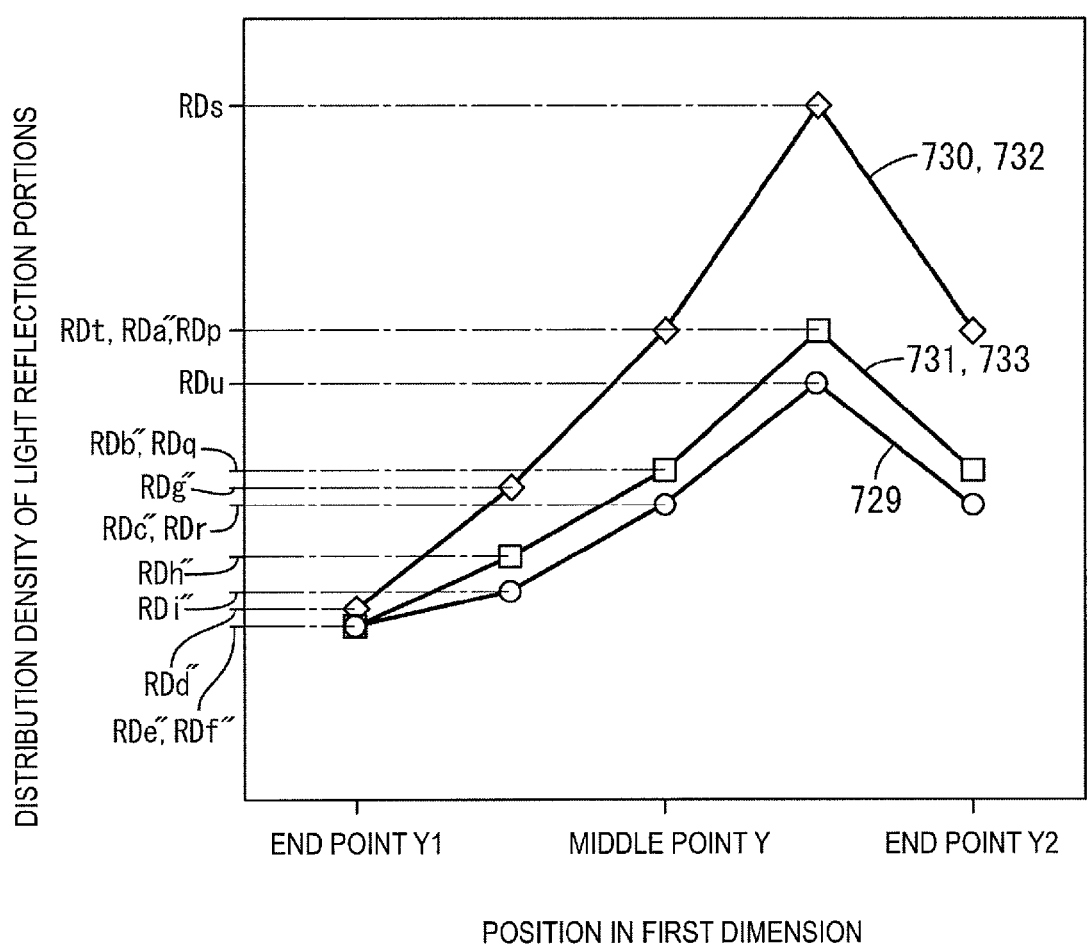
FIG. 28 is a graph illustrating variations in distribution density of the light reflection portions between end point Y1 and end point Y2 on the opposite plate surface of the light guide plate.
Figure 29:
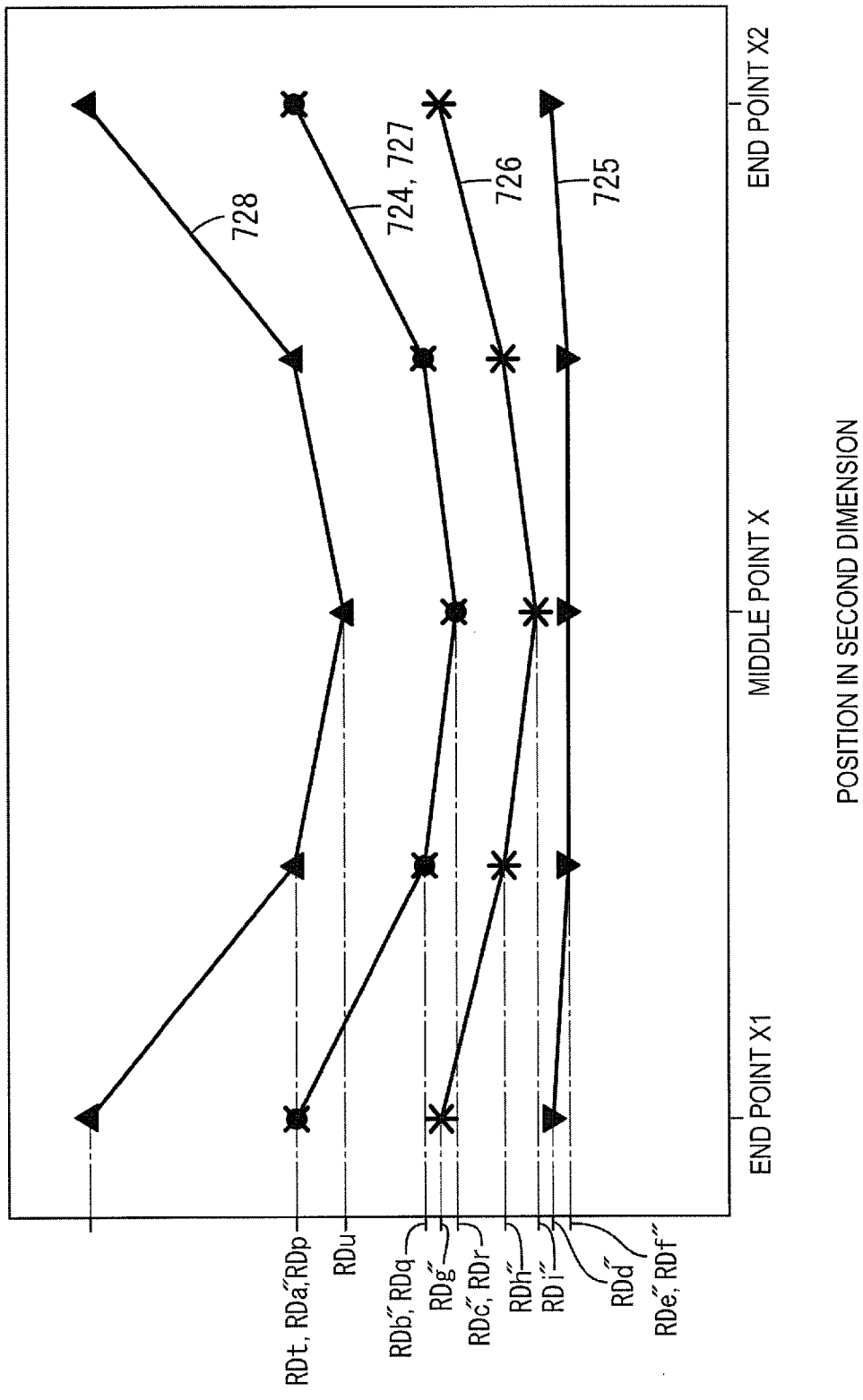
FIG. 29 is a graph illustrating variations in distribution density of the light reflection portions between end point X1 and end point X2 on the opposite plate surface of the light guide plate.

In the configuration in which the distance between the first LEDs 717A and the first light entrance surface 722A is different from the distance between the second LEDs 717B and the second light entrance surface 722B, the distributions of the light reflection portions 723 of the light reflection patterns LRP are illustrated in FIGS. 28 and 29. The light guide plate 719 includes a light exit surface 719a and an opposite plate surface 719f that is opposite from the light exit surface 719a. The opposite plate surface 719f is divided into rows and columns. The rows along the X-axis direction or a second dimension of the opposite plate surface 719f include a middle row 724, a first end row 725, a first intermediate row 726, a second end row 727, and a second intermediate row 728. The columns along the Y=axis direction or a first dimension of the opposite plate surface 719f include a middle column 728, a first end column 730, a first intermediate column 731, a second end column 732, and a second intermediate column 733. As illustrated in FIG. 28, the distribution density of the light reflection portions 723 of the light reflection pattern LRP in each of the columns 729 to 733 along the first dimension is the highest in the second intermediate row 728. The distribution densities in the middle row 724, the second end row 727, the first intermediate row 726, and the first end row 725 decease in this sequence from that in the second intermediated row 728. The distribution density in the middle row 724 is equal to the distribution density in the second end row 727. Namely, the light reflection patterns are asymmetric with respect to the first dimension. Variations in distribution density of the light reflection portions 723 along the first dimension (gradients of curves in FIG. 28, differences in distribution density of the light reflection portions 723 among adjacent rows 724 to 728) are as follows. The variations in the first end column 730 and the second end column 732 are larger than the variations in the middle column 729, the first intermediate column 731, and the second intermediate column 733. The variation from the first end row 725 to the first intermediate row 726 in the middle column 729 is the smallest. The variation from the first end row 725 to the first intermediate row 726 in the intermediate column 731 or 733 is the second smallest. The variation from the middle row 724 to the second intermediate row 728 in the middle column 729, the variation from the second intermediate row 728 to the second end row 727 in the middle column 729, the variation from the middle row 724 to the second intermediate row 728 in the intermediate column 731 or 733, and the variation from the second intermediate row 728 to the second end row 727 in the intermediate column 731 or 733 are equal to one another and the third smallest. The variation from the first intermediate row 726 to the middle row 724 in the middle column 729, the variation from the first intermediate row 726 to the middle row 724 in the intermediate column 731 or 733, and the variation from the first end row 725 to the first intermediate row 726 in the end column 730 or 732 are equal to one another and the fourth smallest. The variation from the first intermediate row 726 to the middle row 724 in the end column 730 or 732 is the fifth smallest. The variation from the middle row to the second intermediate row 728 in the end column 730 or 732 and the variation from the second intermediate row 728 to the second end row 727 are equal to each other and the largest.

The distributions of the light reflection patterns LRP along the second dimension will be described. In each of the rows 724 to 728, as illustrated in FIG. 29, the distribution density of the light reflection portions 723 is the lowest in the middle column 729. The distribution density in the intermediate columns 731 and 733 is larger than that in the middle column 729. The distribution density in the end columns 730 and 732 is larger than that in the intermediate columns 731 and 733. In each of the rows 724 to 728, the distribution density in the first end column 730 is equal to the distribution density in the second end column 732. The distribution density in the first intermediate column 731 is equal to the distribution density in the second intermediate column 733. Namely, the light reflection portions 732 of the light reflection patterns LRP are symmetric with respect to the second dimension. Variations in distribution density of the light reflection portions 723 along the second dimension (gradients of curves in FIG. 29, differences in distribution density of the light reflection portions 723 among adjacent columns 729 to 733) are as follows. The variation in the second intermediate row 728 is larger than the variations in the middle row 724, the first intermediate row 726, the first end row 725, and the second end row 727. The variation from the middle column 729 to the intermediate column 731 or 733 in the first end row 725 is the smallest. The variation from the intermediate column 731 or 733 to the end column 730 or 732 in the first end row 725 is the second smallest. The variation from the middle column 729 to the intermediate column 731 or 733 in the first intermediate row 726, the variation from the middle column 729 to the intermediate column 731 or 733 in the middle row 724 or the second end row 727, and the variation from the middle column 729 to the intermediate column 731 or 733 in the second intermediate row 728 are equal to one another and the third smallest. The variation from the intermediate column 731 or 733 to the end column 730 or 732 in the first intermediate row 726 is the fourth smallest. The variation from the intermediate column 731 or 733 to the end column 730 or 732 in the middle row 724 or the second end row 727 is the fifth smallest. The variation from the intermediate column 731 or 733 to the end column 730 or 732 in the second intermediate row 728 is the largest.

The distributions of the light reflection patterns LRP illustrated in FIGS. 28 and 29 satisfy the following inequations (22) to (28). RDa", RDb", and RDc" are the distribution densities of the light reflection portions 723 in sections in the middle row 724 defined by the end columns 730 and 732, the intermediate columns 731 and 733, and the middle column 729, respectively. RDd", RDe", and RDf" are the distribution densities in sections in the first end row 725 defined by the end columns 730 and 732, the intermediate columns 731 and 733, and the middle column 729, respectively. RDg", RDh", and RDi" are the distribution densities in sections in the first intermediate row 726 defined by the end columns 730 and 732, the intermediate columns 731 and 733, and the middle column 729, respectively. RDp, RDq, and RDr are the distribution densities in sections in the second end row 727 defined by the end columns 730 and 732, the intermediate columns 731 and 733, and the middle column 729, respectively. RDs, RDt, and RDu are the distribution densities in sections in the second intermediate row 728 defined by the end columns 730 and 732, the intermediate columns 731 and 733, and the middle column 729, respectively.

$$(RDb''-RDc'')<(RDa''-RDb'') \quad (22)$$

$$(RDe''-RDf'')<(RDd''-RDe'') \quad (23)$$

$$(RDh''-RDi'')<(RDg''-RDh'') \quad (22)$$

$$(RDp-RDq)<(RDq-RDr) \quad (25)$$

$$(RDt-RDu)<(RDs-RDt) \quad (26)$$

$$(RDa''-RDb'')-(RDb''-RDc''))<((RDs-RDt)-(RDt-RDu)) \quad (27)$$

$$((RDp-RDq)-(RDq-RDr))<((RDs-RDt)-(RDt-RDu)) \quad (28)$$

A difference between the distribution density RDa" in each of the end columns 730 and 732 and the distribution density RDb" in the corresponding intermediate column 731 or 733 in the middle row 724 is referred to as a first difference. A difference between the distribution density RDb" in each of the intermediate columns 731 and 733 and the distribution density RDc" in the middle column 729 in the middle row 724 is referred to as a second difference. A difference between the distribution density RDg" in each of the end columns 730 and 732 and the distribution density RDh" in the corresponding intermediate column 731 or 733 in the first intermediate row 726 is referred to as a third difference. A difference between the distribution density RDh" in each of the intermediate columns 731 and 733 and the distribution density RDi" in the middle column 729 in the first intermediate row 726 is referred to as a fourth difference. A difference between the distribution density RDd" in each of the end columns 730 and 732 and the distribution density RDe" in the corresponding intermediate column 731 or 733 in the first end row 725 is referred to as a fifth difference. A difference between the distribution density RDe" in each of the intermediate columns 731 and 733 and the distribution density RDf" in the middle column 729 in the first end row 725 is referred to as a sixth difference. A difference between the distribution density RDs in each of the end columns 730 and 732 and the distribution density RDt in the corresponding intermediate column 731 or 733 in the second intermediate row 728 is referred to as a seventh difference. A difference between the distribution density RDt in each of the intermediate columns 731 and 733 and the distribution density RDu in the middle column 729 in the second intermediate row 728 is referred to as an eighth difference. A difference between the distribution density RDp in each of the end columns 730 and 732 and the distribution density RDq in the corresponding intermediate column 731 or 733 in the second end row 727 is referred to as a ninth difference. A difference between the distribution density RDq in each of the intermediate columns 731 and 733 and the distribution density RDr in the middle column 729 in the second end row 727 is referred to as a tenth difference. Inequations (22) to (26) express relationships of differences in distribution density of the light reflection portions 723 among the sections of the opposite plate surface 719f of the light guide plate 719 below. The first difference is larger than the second difference. The third difference is larger than the fourth difference. The fifth difference is larger than the sixth difference. The seventh difference is larger than the eighth difference. The ninth difference is larger than the tenth difference. Inequations (27) and (28) express relationships of differences in distribution density of the light reflection portions 723 among the sections of the opposite plate surface 719f of the light guide plate 719 below. A difference between the seventh difference and the eighth difference (the right sides of inequations (27) and (28)) is larger than a difference between the first difference and the second difference (the left side of inequation (27)) and a difference between the ninth difference and the tenth difference (the left side of inequation (28)). The difference between the seventh difference and the eighth difference is the largest. According to the configuration, the same functions and the same effects as those of the first embodiment are achieved.

Other Embodiments

The technology is not limited to the above embodiments described in the above description and the drawings. For example, the following embodiments may be included in technical scopes of the present invention.

Figure 30:
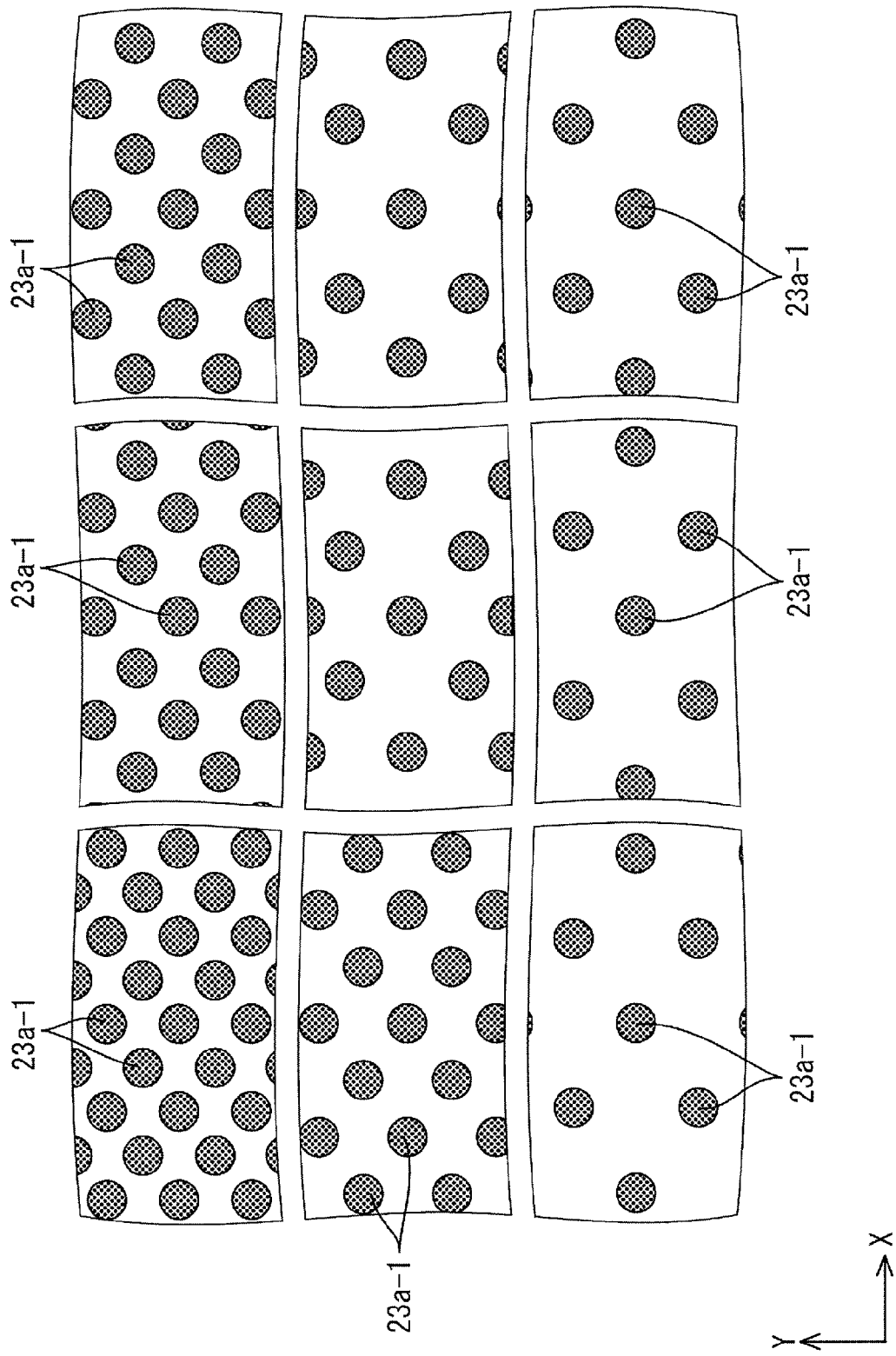
FIG. 30 is a plan view of an opposite plate surface illustrating dots of light reflection portions of light reflection patterns in sections of the opposite plate surface according to other embodiment (1).

(1) In each of the above embodiments (except for the fifth to the seventh embodiment), the distributions of the light reflection patterns are controlled by adjusting the diameters of the dots in the light reflection portions. However, the light reflection portions may include dots 23*a*-1 having the same diameters as illustrated in FIG. 30 and the distributions of the light reflection patterns may be adjusted through modification of intervals of the dots 23*a*-1.

(2) The light reflection portions my include dots 23*a*-2 having different diameters as illustrated in FIG. 31. The distributions of the light reflection patterns may be adjusted through modification of intervals of the dots 23*a*-2. Namely, the distributions of the light reflection patterns may be adjusted through modification of both diameter and interval.

(3) The above embodiments (1) and (2) may be applied to the fifth to the eighth embodiments.

(4) In the second embodiment, the difference in distribution density of the light reflection portions between the end column and the middle column in the second intermediate row may be larger or smaller than the difference in distribution density between the end column and the middle column in the first intermediate row.

(5) In each of the above embodiments, the distribution densities of the light reflection portions in the sections of the opposite plate surface may be altered as appropriate. The differences in the distribution densities of the light reflection portions among the adjacent sections along the second dimension may be altered as appropriate. The differences in the distribution densities of the light reflection portions among the adjacent sections along the first dimension may be altered as appropriate.

(6) The distribution density of the light reflection portions in each section of the opposite plate surface or the difference in distribution density of the light reflection portions between the adjacent sections may be defined as appropriate according to a distance between the LEDs and the light entrance surface, optical properties of the LEDs (e.g., brightness), or other factors.

(7) In each of the above embodiments, the opposite plate surface of the light guide plate is divided into twenty five sections or nine sections. However, the number of sections of the opposite plate surface may be altered as appropriate.

(8) In each of the above embodiments, the dots, the reflection grooves, or the reflection recesses of the light reflection portions are dispersedly arranged in zigzag patterns within the opposite plate surface. However, the dots, the reflection grooves, or the reflection recesses may be dispersedly arranged in a grid.

(9) In each of the above embodiments, each of the dots or the reflection recesses of the light reflection portions has a round shape in a plan view. However, each of the dots or the reflection recesses may have an oval shape, a triangular shape, a rectangular shape, a square shape, a polygonal shape including a pentagonal shape, or a trapezoidal shape.

(10) The depths of the reflection grooves and the reflection recesses in the fifth and the sixth embodiments may be defined differently according to locations within the opposite plate surface.

(11) The reflection grooves of the light reflection portions in the fifth embodiment extend along the second dimension. The direction in which the reflection grooves extend may be altered. The reflection groove may extend along the first dimension or diagonal to the first and the second dimension.

(12) The reflection grooves in the fifth embodiment are connected to one another. However, the reflection grooves may not be connected to one another and separated from one another.

(13) Each of the reflection grooves in the fifth embodiment has an elongated shape in a plan view. The shape of each reflection groove is not limited to the elongated shape. The reflection groove may be formed in a round shape in a plan view.

(14) The method of forming the light reflection portions of the light reflection patterns or the configurations of the light reflection portions are not limited to those described above. Other method may be used to form the light reflection portions or the light reflection portions may be configured differently from the configurations described above.

(15) In each of the above embodiments, one LED board is arranged opposite each peripheral surface of the light guide plate. However, two or more LED boards may be arranged opposite each peripheral surface of the light guide plate.

(16) In each of the above embodiments, the LEDs are used as light sources. However, other types of light sources such as organic ELs, cold cathode fluorescent tubes, and hot cathode fluorescent tubes may be used.

(17) In each of the above embodiments, the color portions of the color filtered in the liquid crystal panel are in three colors of R, G, and B. However, the color portions may be provided in four or more colors.

(18) In each of the above embodiments, the TFTs are used as switching components of the liquid crystal display device. Technologies described herein may be applied to a liquid crystal display device including switching components other than TFTs (e.g., thin film diodes (TFDs)). Technologies described herein may be applied to a black-and-white liquid crystal display device other than the color liquid crystal display device.

(19) In each of the above embodiments, the liquid crystal display device including the liquid crystal panel as a display panel is used. However, technologies described herein may be applied to a display device including other type of display panel.

(20) In each of the above embodiments, the television device including the tuner is used. However, technologies described herein may be applied to a display device including other type of display panel. Specifically, Technologies described herein may be applied to liquid crystal display devices used for digital signage or electric blackboards.

EXPLANATION OF SYMBOLS

10: liquid crystal display device (display device), 11: liquid crystal panel (display panel), 12, 112, backlight unit (lighting device), 17, 117, 217, 317, 717: LED (light source), 19, 119, 219, 319, 419, 519, 619, 719: light guide plate, 19*a*, 119*a*: light exit surface, 19*b*, 119*b*, 219*b*, 319*b*, 719*b*: first peripheral surface (a pair of peripheral surfaces including light entrance surfaces), 19*c*, 119*c*, 219*c*, 319*c*, 719*c*: second peripheral surface (a pair of peripheral surfaces including light entrance surfaces), 19*d*, 119*d*, 219*d*, 319*d*: third peripheral surface (a pair of peripheral surfaces without light entrance surfaces), 19*e*, 119*e*, 219*e*, 319*e*: fourth peripheral surface (a pair of peripheral surfaces without light entrance surfaces), 19*f*, 119*f*, 219*f*, 319*f*, 419*f*, 519*f*, 619*f*: opposite plate surface, 22, 122, 222, 322, 422, 722: light entrance surface, 22A, 122A, 222A, 722A: first light entrance surface, 22B, 122B, 222B, 722B: second light entrance surface, 23, 123, 223, 323, 423, 523, 623, 723: light reflection portion, 23*a*, 123*a*: dot, 24, 124, 224, 324, 724: first middle area, 25, 225, 725: first light entrance surface-side area, 26, 226, 726: first light entrance surface-side intermediate area, 27, 227, 727: second light entrance-side area, 28, 228, 728:

second light entrance surface-side intermediate area, 29, 129, 229, 329, 729: second middle area, 30, 130, 230, 330, 730: first end column, 31, 131, 231, 331, 731: first intermediate column, 32, 132, 232, 332, 732: second end column, 33, 133, 233, 333, 733: second intermediate column, 34, 134: middle row, 35, 135: first end row, 36, 136: second end row 40: opposite peripheral surface, 41, 341: first end row, 42, 342: first intermediate row, 43, 343: second end row, 44, 344: second intermediate row, LRP: light reflection pattern, TV: television device.

The invention claimed is:

1. A light guide plate having a rectangular plate-like shape comprising:
    a light entrance surface that is one of peripheral surfaces and through which light from a light source enters;
    a light exit surface that is a plate surface through which the light exits;
    an opposite plate surface that is a plate surface opposite from the light exit surface; and
    a light reflection pattern formed on the opposite plate surface for directing the light to exit from the light guide plate through the light exit surface, the light reflection pattern including light reflection portions having distribution densities different from section to section of the opposite plate surface, wherein
    the sections are defined by at least three columns along a first dimension of the opposite plate surface that is not parallel to the light entrance surface and at least three rows along a second dimension of the opposite plate surface that is parallel to the light entrance surface,
    the distribution densities in a middle column are higher than the distribution densities in end columns,
    the distribution densities in a middle row are higher than the distribution densities in the sections in an end low closer to the light entrance surface, and
    the distribution densities are defined such that a difference between the distribution density in the section in the middle row and each of the end columns and the distribution density in the section in the middle row and the middle column is larger than a difference between the distribution density in the section in the end row and each of the end column and the distribution density in the section in the end row and the middle column, wherein
    the at least three columns include five columns including a middle column, end columns, and intermediate columns, each of the intermediate rows being located between the middle column and the corresponding end column,
    the at least three rows include five rows including a middle row, end rows, and intermediate rows, each of the intermediate rows being located between the middle row and the corresponding end row, and
    the distribution densities are defined such that a difference between the distribution density in each of the sections in each of the end columns and the distribution density in the corresponding section in each of the intermediate column is larger than a difference between the distribution density in each of the sections in the middle column and the distribution density in the corresponding section in each of the intermediate column.

2. The light guide plate according to claim 1, wherein the distribution densities are defined such that the differences in distribution density among the sections satisfy inequations (1) and (2)

$$((RDd-RDe)-(RDe-RDf))<((RDa-RDb)-(RDb-RDc)) \quad (1)$$

$$((RDg-RDh)-(RDh-RDi))<((RDa-RDb)-(RDb-RDc)) \quad (2)$$

where
RDa, RDb, and RDc are the distribution densities in the sections in each of the end columns, each of the intermediate columns, and the middle column in the middle row, respectively,
RDd, RDe, and RDf are the distribution densities in the sections in each of the end columns, each of the intermediate columns, and the middle column in the end row closer to the light entrance surface, respectively, and
RDg, RDh, and RDi are the distribution densities in the sections in each of the end columns, each of the intermediate columns, and the middle column in each of the intermediate rows, respectively.

3. The light guide plate according to claim 1, wherein the light reflection portions of the light reflection pattern include dots that are reflective films printed on the opposite plate surface, and
the distribution densities of the light reflection portions are adjustable through modification of at least one of areas and intervals of the dots.

4. A lighting device comprising:
the light guide plate according to claim 1; and
a light source configured to emit light toward the light entrance surface of the light guide plate.

5. A display device comprising:
the lighting device according to claim 4; and
a display panel configured to provide a display using light from the lighting device.

6. A television device comprising the display device according to claim 5.

7. A light guide plate having a rectangular plate-like shape comprising:
    a light entrance surface that is one of peripheral surfaces and through which light from a light source enters;
    a light exit surface that is a plate surface through which the light exits;
    an opposite plate surface that is a plate surface opposite from the light exit surface; and
    a light reflection pattern formed on the opposite plate surface for directing the light to exit from the light guide plate through the light exit surface, the light reflection pattern including light reflection portions having distribution densities different from section to section of the opposite plate surface, wherein
    the sections are defined by at least three columns along a first dimension of the opposite plate surface that is not parallel to the light entrance surface and at least three rows along a second dimension of the opposite plate surface that is parallel to the light entrance surface,
    the distribution densities in a middle column are higher than the distribution densities in end columns,
    the distribution densities in a middle row are higher than the distribution densities in the sections in an end low closer to the light entrance surface, and
    the distribution densities are defined such that a difference between the distribution density in the section in the middle row and each of the end columns and the distribution density in the section in the middle row and the middle column is larger than a difference between the distribution density in the section in the end row and each of the end column and the distribution density in the section in the end row and the middle column, wherein the light entrance surface is defined as a first light entrance surface, one of the peripheral surfaces opposite from the first light entrance surface through which light from another light source enters is defined as a second light entrance surface, and the distribution densities are defined such that
- the distribution density in each of the sections in the middle row is higher than the distribution density in the corresponding section in a first end row of the rows closer to the first light entrance surface and the distribution density in the corresponding section in a second end row of the rows closer to the second light entrance surface,
- a difference between the distribution density in the section in the middle row and each of the end columns and the distribution density in the section in the middle row and the middle column is larger than a difference between the distribution density in the section in the first end row and each of the end columns and the distribution density in the section in the first end row and the middle column, and
- the difference between the distribution density in the section in the middle row and each of the end columns and the distribution density in the section in the middle row and the middle column is larger than a difference between the distribution density in the section in the second end row and each of the end columns and the distribution density in the section in the second end row and the middle column.

8. The light guide plate according to claim 7, wherein the at least three rows include five rows including a middle row, a first end row closer to the first light entrance surface, a first intermediate row between the middle row and the first end row, a second end row closer to the second light entrance surface, and a second intermediate row between the middle row and the second end row, and the distribution densities are defined such that a difference between the distribution density in the section in the middle row and each of the end columns and the distribution density in the section in the middle row and the middle column is larger than:
- a difference between the distribution density in the section in the first end row and each of the end column and the distribution density in the section in the first end row and the middle column;
- a difference between the distribution density in the section in the first intermediate row and each of the end column and the distribution density in the section in the first intermediate row and the middle column;
- a difference between the distribution density in the section in the second end row and each of the end column and the distribution density in the section in the second end row and the middle column; and
- a difference between the distribution density in the section in the second intermediate row and each of the end column and the distribution density in the section in the second intermediate row and the middle column.

9. The light guide plate according to claim 8, wherein the distribution densities are defined such that:
- a difference between the distribution density in the section in the first intermediate row and in each of the end columns and the distribution density in the section in the first intermediate row and in the middle column is larger than a difference between the distribution density in the section in the first end row and in each of the end columns and the distribution density in the section in the first end row and the middle column; and
- a difference between the distribution density in the section in the second intermediate row and each of the end columns and the distribution density in the section in the second intermediate row and the middle column is larger than a difference between the distribution density in the section in the second end row and each of the end columns and the distribution density in the section in the second end row and the middle column.

10. The light guide plate according to claim 8, wherein the at least three columns include five column including a middle column, a first end column, a first intermediate column between the middle column and the first end column, a second end column, and a second intermediate column between the middle column and the second end column, the distribution density in the section in the middle row and each of the first and the second end columns is different from the distribution density in the section in the middle row and corresponding one of the first and the second intermediate columns, a difference in distribution density between the sections being referred to as a first difference, the distribution density in the section in the middle row and each of the first and the second intermediate columns is different from the distribution density in the section in the middle row and the middle columns, a difference in distribution density between the sections being referred to as a second difference, the distribution density in the section in the first intermediate row and each of the first and the second end columns is different from the distribution density in the section in the first intermediate row and corresponding one of the first and the second intermediate columns, a difference in distribution density between the sections being referred to as a third difference, the distribution density in the section in the first intermediate row and each of the first and the second intermediate columns is different from the distribution density in the section in the first intermediate row and the middle column, a difference in distribution density between the sections being referred to as a fourth difference, the distribution density in the section in the first end row and each of the first and the second end columns is different from the distribution density in the section in the first end row and corresponding one of the first and the second intermediate columns, a difference in distribution density between the sections being referred to as a fifth difference, the distribution density in the section in the first end row and each of the first and the second intermediate columns is different from the distribution density in the section in the first end row and the middle column, a difference in distribution density between the sections being referred to as a sixth difference, the distribution density in the section in the second intermediate row and each of the first and the second end columns is different from the distribution density in the section in the first intermediate row and corresponding one of the first and the second intermediate columns, a difference in distribution density between the sections being referred to as a seventh difference, the distribution density in the section in the second intermediate row and each of the first and the second intermediate columns is different from the distribution density in the section in the second intermediate row and the middle column, a difference in distribution density between the sections being referred to as an eighth difference, the distribution density in the section in the second end row and each of the first and the second end columns is different from the distribution density in the section in the second end row and corresponding one of the first and the second intermediate columns, a difference in distribution density between the sections being referred to as a ninth difference, the distribution density in the section in the second end row and each of the first and the second intermediate columns is different from the distribution density in the section in the second end row and the middle column, a difference in distribution density between the sections being referred to as a tenth difference, and the distribution densities are defined such that a difference between the first difference and the second difference is larger than a difference between the third difference and the fourth difference, a difference between the fifth difference and the sixth difference, a difference between the seventh difference and the eighth difference, and a difference between the ninth difference and the tenth difference.

11. The light guide plate according to claim 7, wherein the light reflection portions of the light reflection pattern are symmetric with respect to the first dimension of the opposite plate surface.

12. A light guide plate having a rectangular plate-like shape comprising:
a light entrance surface that is one of peripheral surfaces and through which light from a light source enters;
a light exit surface that is a plate surface through which the light exits;
an opposite plate surface that is a plate surface opposite from the light exit surface; and
a light reflection pattern formed on the opposite plate surface for directing the light to exit from the light guide plate through the light exit surface, the light reflection pattern including light reflection portions having distribution densities different from section to section of the opposite plate surface, wherein
the sections are defined by at least three columns along a first dimension of the opposite plate surface that is not parallel to the light entrance surface and at least three rows along a second dimension of the opposite plate surface that is parallel to the light entrance surface,
the distribution densities in a middle column are higher than the distribution densities in end columns,
the distribution densities in a middle row are higher than the distribution densities in the sections in an end low closer to the light entrance surface, and
the distribution densities are defined such that a difference between the distribution density in the section in the middle row and each of the end columns and the distribution density in the section in the middle row and the middle column is larger than a difference between the distribution density in the section in the end row and each of the end column and the distribution density in the section in the end row and the middle column, wherein one of the peripheral surfaces opposite from the light entrance surface is an opposite peripheral surface through which the light does not directly enter,
the end low closer to the light entrance surface is defined as a first end low,
the end low closer to the opposite peripheral surface is defined as a second end low, and
the distribution densities are defined such that:
the distribution densities in the first end row, the middle row, and the second end row increase in this sequence;
a difference between the distribution density in the section in the middle row and each of the end columns and the distribution density in the section in the middle row and the middle column is larger than a difference between the distribution density in the section in the first end row and each of the end columns and a difference between the distribution density in the section in the first end row and the middle column; and
the difference between the distribution density in the section in the middle row and each of the end columns and the distribution density in the section in the middle row and the middle column is equal to a difference between the distribution density in the section in the second end row and each of the end columns and a difference between the distribution density in the section in the second end row and the middle column.

13. The light guide plate according to claim 12, wherein the at least three rows include five rows including a middle row, a first end row closer to the light entrance surface, a first intermediate row between the middle row and the first end row, a second end row closer to the opposite peripheral surface, and a second intermediate row between the middle row and the second end row, and
the distribution densities are defined such that:
a difference between the distribution density in the section in the middle row and each of the end columns and the distribution density in the section in the middle row and the middle column is larger than a difference between the distribution density in the section in the first end row and each of the end columns and the distribution density in the section in the first end row and the middle column;
the difference between the distribution density in the section in the middle row and each of the end columns and the distribution density in the section in the middle row and the middle column is larger than a difference between the distribution density in the section in the first intermediate row and each of the end columns and the distribution density in the section in the first intermediate row and the middle column;
a difference between the distribution density in the section in the second end row and each of the end columns and the distribution density in the section in the second end row and the middle column is larger than a difference between the distribution density in the section in the second intermediate row and each of the end columns and the distribution density in the section in the second intermediate row and the middle column; and the difference between the distribution density in the section in the second end row and each of the end columns and the distribution density in the section in the second end row and the middle column is equal to a difference between the distribution density in the section in the middle row and each of the end columns and the distribution density in the section in the middle row and the middle column.

14. The light guide plate according to claim 13, wherein the at least three columns include five columns including a middle column, a first end column, a first intermediate column between the middle column and the first end column, a second end column, and a second intermediate column between the middle column and the second end column, the distribution density in the section in the middle row and each of the first and the second end columns is different from the distribution density in the section in the middle row and corresponding one of the first and the second intermediate columns, a difference in distribution density between the sections being referred to as a first difference, the distribution density in the section in the middle row and each of the first and the second intermediate columns is different from the distribution density in the section in the middle row and the middle columns, a difference in distribution density between the sections being referred to as a second difference, the distribution density in the section in the first intermediate row and each of the first and the second end columns is different from the distribution density in the section in the first intermediate row and corresponding one of the first and the second intermediate columns, a difference in distribution density between the sections being referred to as a third difference, the distribution density in the section in the first intermediate row and each of the first and the second intermediate columns is different from the distribution density in the section in the first intermediate row and the middle column, a difference in distribution density between the sections being referred to as a fourth difference, the distribution density in the section in the first end row and each of the first and the second end columns is different from the distribution density in the section in the first end row and corresponding one of the first and the second intermediate columns, a difference in distribution density between the sections being referred to as a fifth difference, the distribution density in the section in the first end row and each of the first and the second intermediate columns is different from the distribution density in the section in the first end row and the middle column, a difference in distribution density between the sections being referred to as a sixth difference, the distribution density in the section in the second intermediate row and each of the first and the second end columns is different from the distribution density in the section in the first intermediate row and corresponding one of the first and the second intermediate columns, a difference in distribution density between the sections being referred to as a seventh difference, the distribution density in the section in the second intermediate row and each of the first and the second intermediate columns is different from the distribution density in the section in the second intermediate row and the middle column, a difference in distribution density between the sections being referred to as an eighth difference, the distribution density in the section in the second end row and each of the first and the second end columns is different from the distribution density in the section in the second end row and corresponding one of the first and the second intermediate columns, a difference in distribution density between the sections being referred to as a ninth difference, the distribution density in the section in the second end row and each of the first and the second intermediate columns is different from the distribution density in the section in the second end row and the middle column, a difference in distribution density between the sections being referred to as a tenth difference, and the distribution densities are defined such that:
  a difference between the first difference and the second difference is larger than a difference between the third difference and the fourth difference and a difference between the fifth difference and the sixth difference;
  a difference between the ninth difference and the tenth difference is larger than a difference between the seventh difference and the eighth difference; and
  the difference between the ninth difference and the tenth difference is equal to the difference between the first difference and the second difference.

* * * * *